United States Patent
Salem et al.

(10) Patent No.: US 11,375,484 B2
(45) Date of Patent: *Jun. 28, 2022

(54) SYSTEMS AND METHODS FOR SUPPORTING ASYNCHRONOUS UPLINK HARQ AND MULTIPLE SIMULTANEOUS TRANSMISSIONS

(71) Applicant: Huawei Technologies Co., Ltd., Shenzhen (CN)

(72) Inventors: Mohamed Adel Salem, Kanata (CA); Toufiqul Islam, Sunnyvale, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,829

(22) Filed: May 1, 2020

(65) Prior Publication Data

US 2020/0260439 A1   Aug. 13, 2020

Related U.S. Application Data

(63) Continuation of application No. 15/852,089, filed on Dec. 22, 2017, now Pat. No. 10,652,866.

(Continued)

(51) Int. Cl.
   *H04W 72/04*   (2009.01)
   *H04L 1/18*   (2006.01)
   (Continued)

(52) U.S. Cl.
   CPC ....... *H04W 72/0413* (2013.01); *H04L 1/1812* (2013.01); *H04L 1/1822* (2013.01);
   (Continued)

(58) Field of Classification Search
   CPC ......... H04W 72/0413; H04W 72/0446; H04W 72/1268; H04W 72/1284; H04W 74/004;
   (Continued)

(56) References Cited

U.S. PATENT DOCUMENTS 8,582,538 B2   11/2013   Love et al.
8,687,541 B2   4/2014   Lohr et al.
(Continued)

FOREIGN PATENT DOCUMENTS

CN   101296061 A   10/2008
CN   105429738 A   3/2016
(Continued)

OTHER PUBLICATIONS

3GPP TSG RAN WG1 Meeting #87, "Grant-free transmission scheme for UL URLLC," R1-1611689, Huawei, HiSilicon, Reno, Nevada, US, Nov. 14-18, 2016, 9 pages.
(Continued)

*Primary Examiner* — Warner Wong
(74) *Attorney, Agent, or Firm* — Slater Matsil, LLP

(57) ABSTRACT

Current HARQ procedures for grant-based uplink transmissions may not be suitable for implementations in which a UE can simultaneously transmit multiple transport blocks (TBs) to a base station. However, in some scenarios, such as in some grant-free uplink transmission schemes, a UE may simultaneously transmit multiple TBs. Systems and methods are disclosed herein for performing HARQ for situations in which a UE simultaneously transmits multiple TBs to a base station. By using the systems and methods described herein, HARQ may therefore be performed in such situations.

20 Claims, 19 Drawing Sheets

Related U.S. Application Data

(60) Provisional application No. 62/473,809, filed on Mar. 20, 2017.

(51) Int. Cl.
   *H04L 5/00*   (2006.01)
   *H04W 88/08*  (2009.01)
   *H04W 88/02*  (2009.01)

(52) U.S. Cl.
   CPC .......... *H04L 1/1896* (2013.01); *H04L 5/0016* (2013.01); *H04L 5/0048* (2013.01); *H04L 5/0055* (2013.01); *H04L 5/0091* (2013.01); *H04W 72/0446* (2013.01); *H04L 5/0026* (2013.01); *H04L 5/0035* (2013.01); *H04W 88/02* (2013.01); *H04W 88/08* (2013.01)

(58) Field of Classification Search
   CPC ........ H04W 88/02; H04L 1/18; H04L 1/1812; H04L 1/1822; H04L 1/1861; H04L 1/1864; H04L 1/1896; H04L 5/0055; H04L 5/0048
   See application file for complete search history.

(56) References Cited

U.S. PATENT DOCUMENTS

| | | | |
|---|---|---|---|
| 9,380,490 | B2 | 6/2016 | Akkarakaran et al. |
| 2006/0092972 | A1* | 5/2006 | Petrovic ............... H04L 1/0083 370/469 |
| 2009/0109907 | A1 | 4/2009 | Tsai et al. |
| 2010/0037114 | A1 | 2/2010 | Huang et al. |
| 2010/0085927 | A1 | 4/2010 | Torsner et al. |
| 2012/0300616 | A1 | 11/2012 | Zeng et al. |
| 2013/0028213 | A1 | 1/2013 | Ko et al. |
| 2013/0201940 | A1 | 8/2013 | Zhang et al. |
| 2015/0085797 | A1 | 3/2015 | Ji et al. |
| 2018/0015298 | A1* | 1/2018 | Iguchi ................ A61N 5/06 |
| 2018/0234881 | A1* | 8/2018 | Hosseini ............. H04W 28/04 |
| 2018/0288795 | A1 | 10/2018 | Zhang et al. |
| 2019/0199483 | A1* | 6/2019 | Zhang ................. H04L 1/0003 |
| 2019/0334670 | A1* | 10/2019 | Shao .................. H04L 5/0092 |
| 2020/0154400 | A1* | 5/2020 | Byun .................. H04W 72/04 |
| 2021/0136729 | A1* | 5/2021 | Yasukawa .......... H04L 1/1874 |

FOREIGN PATENT DOCUMENTS

| | | |
|---|---|---|
| EP | 3300440 A1 | 3/2018 |
| EP | 3301984 A1 | 4/2018 |
| WO | 2014182009 A1 | 11/2014 |
| WO | 2016105978 A1 | 6/2016 |
| WO | 2016205988 A1 | 12/2016 |
| WO | 2016206083 A1 | 12/2016 |
| WO | 2017000143 A1 | 1/2017 |
| WO | 2017000291 A1 | 1/2017 |
| WO | 2018107944 A1 | 6/2018 |

OTHER PUBLICATIONS

3GPP TSG RAN WG1 Meeting #86bis, "Discussion on retransmission design for grant-free based UL transmission," R1-1609400, Lenovo, Lisbon, Portugal, Oct. 10-14, 2016, 3 pages.

3GPP TSG RAN WG1 Meeting #86 R1-167206, "HARQ timing relationships for grant-free transmission", Huawei, HiSilicon, Aug. 22-26, 2016, total 2 pages.

3Gpp, "3rd Generation Partnership Project; Technical Specification Group Radio Access Network; Evolved Universal Terrestrial Radio Access (E-UTRA); Physical Channels and Modulation (Release 9)", 3GPP TS 36.211, V9.1.0, Published Mar. 2010, 85 pages.

Huawei et al., "Reference signal design for UL grant-free transmission", 3GPP TSG RAN WG1 Meeting #86bis, R1-1609446, Oct. 10-14, 2016, 4 Pages, Lisbon, Portugal.

Samsung, "Discussion on grant-free/contention-based- non-orthogonal multiple access", 3GPP TSG RAN WG1 Meeting #86, R1-166752, Aug. 22-26, 2016, 6 Pages, Gothenburg, Sweden.

Guangdong Oppo Mobile Telecom, "Discussions on uplink grant-free transmission", 3GPP TSG RAN WG1 Meeting #88, R1-1701962, Feb. 13-17, 2017, 6 Pages, Athens, Greece.

Sharetechnote, "LTE Quick Reference", published at least as early as Feb. 27, 2016 (initially accessed on that day at http://www.sharetechnote.com/html/Handbook_LTE_PHICH_PHICHGroup.html), but enclosed printed copy of website is from Sep. 12, 2017, 5 pages.

\* cited by examiner

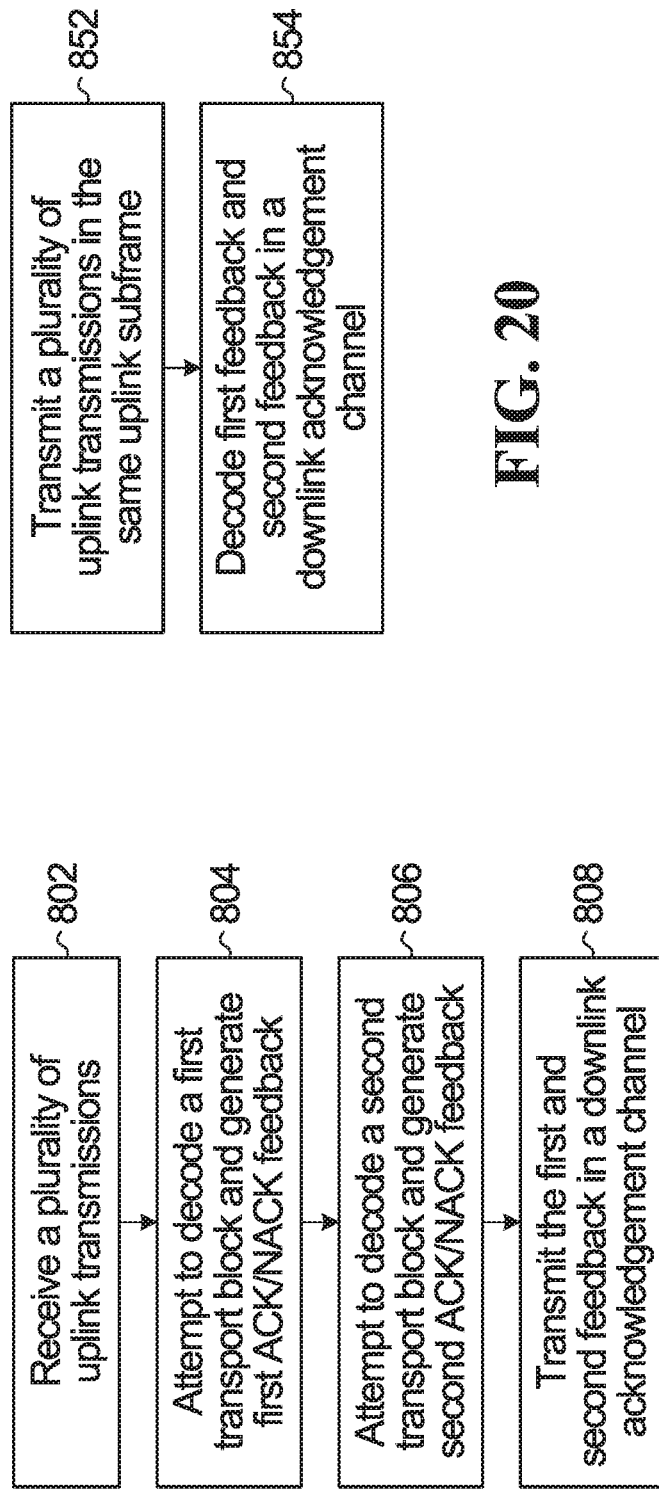

SYSTEMS AND METHODS FOR SUPPORTING ASYNCHRONOUS UPLINK HARQ AND MULTIPLE SIMULTANEOUS TRANSMISSIONS

CROSS-REFERENCE TO RELATED APPLICATIONS

The present application is a continuation of U.S. patent application Ser. No. 15/852,089, entitled "Systems and Methods for Supporting Asynchronous Uplink HARQ and Multiple Simultaneous Transmissions", filed on Dec. 22, 2017, which claims priority to U.S. Provisional Patent Application No. 62/473,809, entitled "Systems and Methods for Supporting Asynchronous Uplink HARQ and Multiple Simultaneous Transmissions", which was filed on Mar. 20, 2017, and which is incorporated herein by reference.

TECHNICAL FIELD

The present application relates to hybrid automatic repeat request (HARQ) for uplink transmissions in a wireless communication system.

BACKGROUND

In some wireless communication systems, a user equipment (UE) wirelessly communicates with a base station to send data to the base station and/or receive data from the base station. A wireless communication from a UE to a base station is referred to as an uplink communication. A wireless communication from a base station to a UE is referred to as a downlink communication.

Resources are required to perform uplink and downlink communications. For example, a UE may wirelessly transmit data, such as a transport block (TB), to a base station in an uplink transmission at a particular frequency and during a particular slot in time. The frequency and time slot used are examples of resources.

Some wireless communication systems may support grant-based uplink transmissions. That is, if a UE wants to transmit data to a base station, the UE requests uplink resources from the base station. The base station grants the uplink resources, and then the UE sends the uplink transmission using the granted uplink resources. An example of uplink resources that may be granted by the base station is a set of time-frequency locations in an uplink orthogonal frequency-division multiple access (OFDMA) frame.

Some wireless communication systems may also or instead support grant-free uplink transmissions. That is, a UE may send uplink transmissions using certain uplink resources possibly shared with other UEs, without specifically requesting use of the resources. A grant-free uplink transmission does not need a dynamic and explicit scheduling grant from the base station.

In some cases, when a UE sends an uplink transmission, the base station may not be able to decode the data in the uplink transmission.

SUMMARY

Hybrid automatic repeat request (HARQ) is a method in which data to be transmitted is encoded using an error correction code. If the encoded data is corrupted during transmission and the receiver is unable to correct the errors, a retransmission is performed.

Current HARQ procedures for grant-based uplink transmissions may not be suitable for implementations in which a UE can simultaneously transmit multiple transport blocks (TBs) to a base station. However, in some scenarios, such as in some grant-free uplink transmission schemes, a UE may simultaneously transmit multiple TBs. Furthermore, in some uplink transmission schemes, grant-free NACK-less retransmissions of a TB occur and may be interrupted in some other schemes by a grant from the base station, thus resulting in asynchronous HARQ processes that are not suitable for current uplink HARQ procedures.

Systems and methods are disclosed herein for performing HARQ for situations in which a UE simultaneously transmits multiple TBs to a base station and/or handles asynchronous HARQ processes. By using the systems and methods described herein, HARQ retransmissions/repetitions, combining, and feedback indication may therefore be performed in such situations.

In one embodiment, there is provided a method performed by a UE. The method includes transmitting, to a base station, a first uplink data transmission including a first transport block. The first transport block is associated with a first HARQ process. The first uplink data transmission includes a first reference signal sequence. The first uplink data transmission is sent using first time-frequency resources in an uplink subframe. The method further includes transmitting, to the base station, a second uplink data transmission including a second transport block. The second transport block is associated with a second HARQ process. The second uplink data transmission includes a second reference signal sequence. The second uplink data transmission is sent using second time-frequency resources in the uplink subframe. The method further includes decoding first feedback and second feedback received from the base station in a downlink acknowledgement channel. The first feedback represents a first ACK or first NACK for the first transport block, and the second feedback represents a second ACK or a second NACK for the second transport block. At least one of the first time-frequency resources and first reference signal sequence identifies the first UE and the first HARQ process, and at least one of the second time-frequency resources and the second reference signal sequence identifies the second UE and the second HARQ process. A UE configured to perform the method is also disclosed.

In another embodiment, there is provided a method performed by a base station. The method includes receiving, from a UE, a first uplink data transmission including a first transport block. The first transport block is associated with a first HARQ process. The first uplink data transmission includes a first reference signal sequence. The first uplink data transmission is received using first time-frequency resources in an uplink subframe. The method further includes receiving, from the UE, a second uplink data transmission including a second transport block. The second transport block is associated with a second HARQ process. The second uplink data transmission includes a second reference signal sequence. The second uplink data transmission is received using second time-frequency resources in the uplink subframe. The method further includes decoding the first transport block and generating first feedback representing a first ACK or first NACK for the first transport block, decoding the second transport block and generating second feedback representing a second ACK or second NACK for the second transport block. The method further includes transmitting, to the UE, the first feedback and the second feedback in a downlink acknowledgement channel. At least one of the first time-frequency resources and first reference signal sequence identifies the first UE and the first HARQ process, and at least one of the second time-frequency resources and the second reference signal sequence identifies the second UE and the second HARQ process. A base station configured to perform the method is also disclosed.

BRIEF DESCRIPTION OF THE DRAWINGS

Embodiments will be described, by way of example only, with reference to the accompanying figures wherein:

FIG. 19 is a flowchart of a method performed by a base station, according to one embodiment; and FIG. 20 is a flowchart of a method performed by a UE, according to one embodiment.

DETAILED DESCRIPTION OF ILLUSTRATIVE EMBODIMENTS

For illustrative purposes, specific example embodiments will now be explained in greater detail below in conjunction with the figures.

Figure 1:
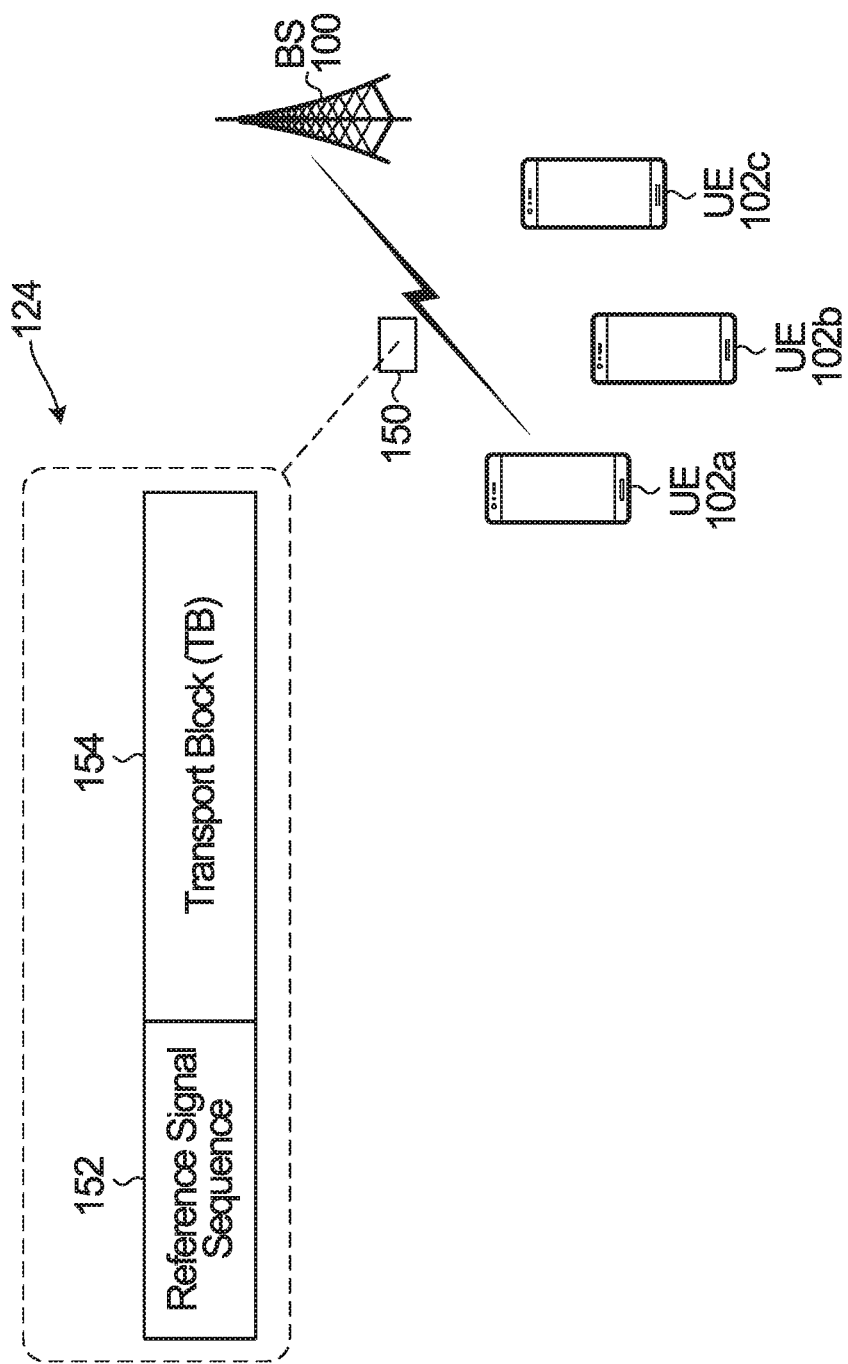
FIG. 1 is a block diagram of a base station and a plurality of UEs, according to one embodiment.

FIG. 1 is a block diagram of a base station 100 and a plurality of UEs 102a-c, according to one embodiment.

The word "base station" encompasses any device that wirelessly receives data in the uplink from UEs. Therefore, in some implementations, the base station 100 may be called other names, such as a transmit and receive point (TRP), a base transceiver station, a radio base station, a network node, a transmit/receive node, a Node B, an eNodeB (eNB), a gNB (sometimes called a "gigabit" Node B), a relay station, or a remote radio head. Also, in some embodiments, the parts of the base station 100 may be distributed. For example, some of the modules of the base station 100 may be located remote from the equipment housing the antennas of the base station 100, and may be coupled to the equipment housing the antennas over a communication link (not shown). Therefore, in some embodiments, the term base station 100 may also refer to modules on the network side that perform processing operations, such as scheduling and message generation, and that are not necessarily part of the equipment housing the antennas of the base station 100. The modules may also be coupled to other base stations. In some embodiments, the base station 100 may actually be a plurality of base stations that are operating together to serve the UEs 102a-c, e.g. through coordinated multipoint transmissions.

In operation, UEs 102a-c may each send uplink transmissions to the base station 100. In some embodiments the uplink transmissions are grant-based, and in other embodiments the uplink transmissions are grant-free.

An example uplink message 150 sent by UE 102a is shown in stippled bubble 124. The message 150 includes a reference signal (RS) sequence 152 used by the base station 100 for channel estimation. In embodiments herein, the reference signal sequence may be a demodulation reference signal (DMRS) sequence. The message 150 further includes a transport block (TB) 154 of data to be transmitted to the base station 100. Message 150 is only an example, and may include other components not shown, e.g. a cyclic redundancy check (CRC). Also, more generally RS sequence 152 may be replaced with a multiple access (MA) signature. Therefore, for example, when reference signal sequence is mentioned in embodiments below, an MA signature may be used instead. For example, the MA signature used may be mapped to the orthogonal spreading sequence for the ACK/NACK feedback. An MA signature may include (but is not limited to) at least one of the following: a codebook/codeword, a sequence, an interleaver and/or mapping pattern, a pilot, a demodulation reference signal (e.g. a reference signal for channel estimation), a preamble, a spatial-dimension, and a power-dimension.

Figure 2:
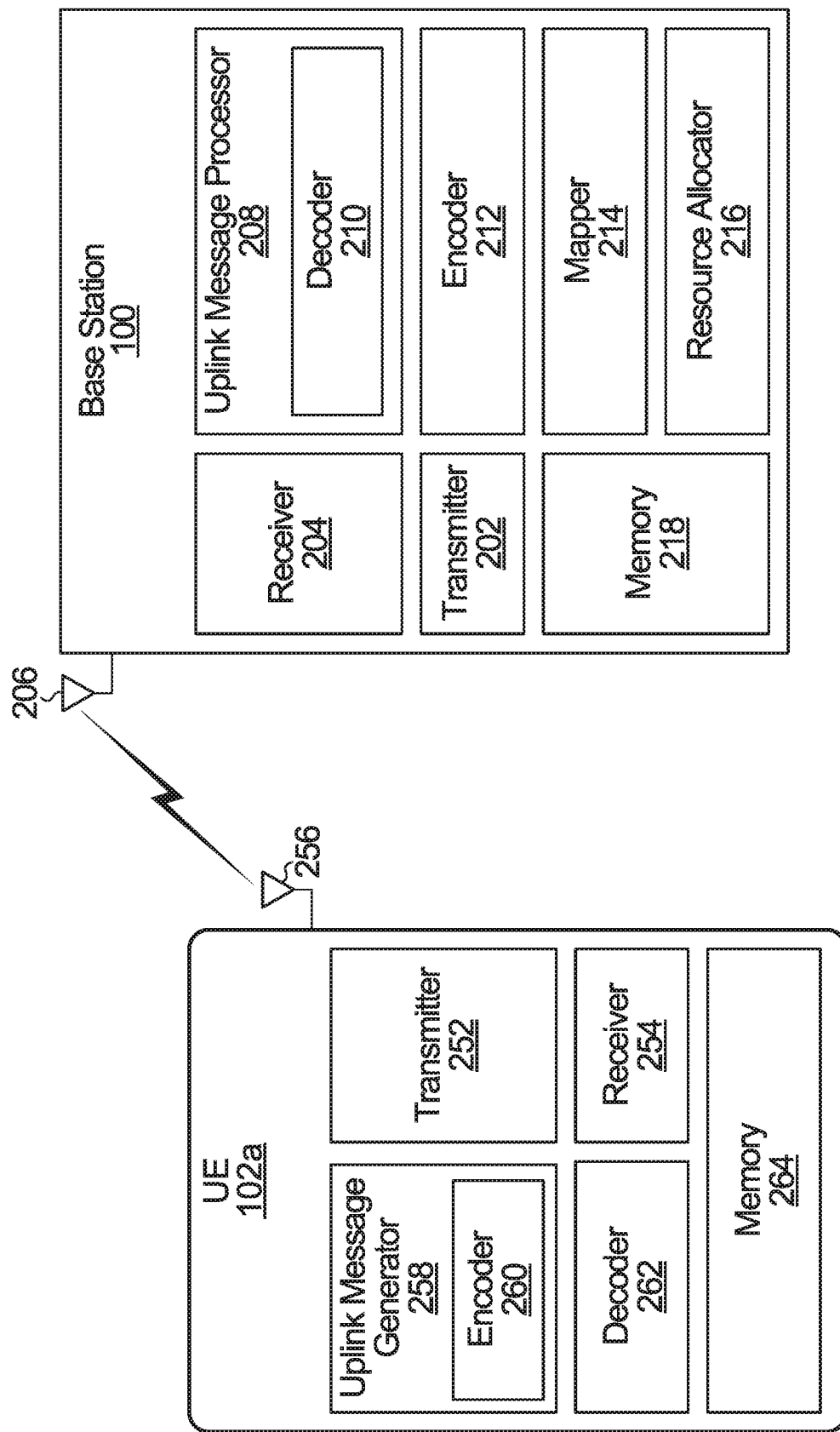
FIG. 2 is a block diagram showing a base station and UE in more detail, according to one embodiment.

FIG. 2 is a block diagram showing the base station 100 and UE 102a of FIG. 1 in more detail. The base station 100 includes a transmitter 202 and a receiver 204 coupled to one or more antennas 206. Only one antenna 206 is illustrated. The transmitter 202 and the receiver 204 may be integrated as a transceiver. The base station 100 further includes an uplink message processor 208, including a decoder 210. The uplink message processor 208 and decoder 210 perform operations relating to processing the received uplink message, such as activity detection, decoding of the TB, and the base station HARQ operations described herein, e.g. generating acknowledgements (ACKs) and/or negative acknowledgements (NACKs). The uplink message processor 208 may be part of the receiver 204.

The base station 100 further includes an encoder 212 for encoding messages to be sent to the UE 102a. The encoder 212 performs the operations described below relating to preparing an ACK or NACK for transmission to the UE, e.g. generating an ACK/NACK codeword and applying an orthogonal spreading sequence to the ACK/NACK codeword. The base station 100 further includes a mapper 214 for mapping ACK/NACK feedback to downlink resources, e.g. on a dedicated downlink acknowledgement channel, such as a physical HARQ indicator channel (PHICH). The encoder 212 and mapper 214 may be part of the transmitter 202.

The base station 100 further includes a resource allocator 216, which may determine which uplink resources are allocated to UEs 102a-c for uplink transmissions. For example, the resource allocator 216 may assign a particular partition of time-frequency resources to be used by UEs 102a-c for sending any grant-free uplink transmissions the UEs 102a-e may have to send.

The base station 100 further includes a memory 218 for storing information and data.

The uplink message processor 208, the decoder 210, the encoder 212, the mapper 214, the resource allocator 216, and/or any signal processing components of the transmitter 202 and receiver 204, may be implemented in the form of circuitry configured to perform the functions of the uplink message processor 208, the decoder 210, the encoder 212, the mapper 214, the resource allocator 216, and/or the transmitter 202 and receiver 204. In some implementations the circuitry includes a memory and one or more processors that execute instructions that cause the one or more processors to perform the operations of the uplink message processor 208, the decoder 210, the encoder 212, the mapper 214, the resource allocator 216, and/or any signal processing components of the transmitter 202 and receiver 204. Alternatively, the uplink message processor 208, the decoder 210, the encoder 212, the mapper 214, the resource allocator 216, and/or any signal processing components of the transmitter 202 and receiver 204, may be implemented using dedicated integrated circuitry, such as an application specific integrated circuit (ASIC), a graphics processing unit (GPU), or a programmed field programmable gate array (FPGA) for performing the operations of the uplink message processor 208, the decoder 210, the encoder 212, the mapper 214, the resource allocator 216, and/or any signal processing components of the transmitter 202 and receiver 204. In yet other implementations, the functionality of the base station 100 described herein may be fully or partially implemented in software or modules stored in the memory 218 and executed by the one or more processors.

The UE 102a also includes a transmitter 252 and a receiver 254 coupled to one or more antennas 256. Only one antenna 256 is illustrated. The transmitter 252 and the receiver 254 may be integrated as a transceiver. The UE 102a further includes an uplink message generator 258 for generating messages to be transmitted in uplink transmissions. Generating an uplink message may include encoding data to be transmitted in the message in an encoder 260, and modulating the encoded data. The UE 102a further includes a decoder 262 for decoding downlink messages sent from the base station 100. For example, the decoder 262 applies an orthogonal spreading sequence to decode ACK/NACK feedback from the base station 100, as described later. The base station 100 further includes a memory 264 for storing information and data.

The uplink message generator 258, the encoder 260, the decoder 262, and/or any signal processing components of the transmitter 252 and receiver 254, may be implemented in the form of circuitry configured to perform the functions of the uplink message generator 258, the encoder 260, the decoder 262, and/or the transmitter 252 and receiver 254. In some implementations the circuitry includes a memory and one or more processors that execute instructions that cause the one or more processors to perform the operations of the uplink message generator 258, the encoder 260, the decoder 262, and/or the transmitter 252 and receiver 254. Alternatively, the uplink message generator 258, the encoder 260, the decoder 262, and/or the transmitter 252 and receiver 254, may be implemented using dedicated integrated circuitry, such as an ASIC, a GPU, or an FPGA for performing the operations of the uplink message generator 258, the encoder 260, the decoder 262, and/or the transmitter 252 and receiver 254. In yet other implementations, the functionality of the UE 102a described herein may be fully or partially implemented in software or modules stored in the memory 218 and executed by the one or more processors.

The base station 100 and the UE 102a may include other components, but these have been omitted for the sake of clarity. Also, the UEs 102b and 102c are not shown in detail in the figures, but UEs 102b and 102c have the same components as UE 102a illustrated in FIG. 2.

HARQ for Uplink Transmissions

HARQ may be performed for the uplink transmissions. For example, if the TB 154 in an initial uplink transmission is not successfully decoded by the base station 100, then a retransmission may be performed by the UE. The word "transmission" as used herein, may refer to an initial transmission or a retransmission. A retransmission may include a retransmission of the TB and/or further information for decoding the TB. For example, the retransmission data may include some or all of the original data and/or parity information. The base station 100 may perform HARQ combining as follows: instead of discarding unsuccessfully decoded initial data, the unsuccessfully decoded initial data may be stored at the base station 100 in memory and combined with received retransmission data to try to successfully decode the TB. When HARQ combining is performed, the retransmission data from the UE may not need to be a complete retransmission of the initial data. The retransmission may carry less data, such as some or all of the parity bits associated with the initial data. One type of HARQ combining that may be used is soft combining, such as chase combining or incremental redundancy.

Initial transmissions and retransmissions may use different redundancy versions (RVs). Different RVs may also be referred to as different revisions. When data is encoded in the message generator 258, the encoded bits may be partitioned into different sets that possibly overlap with each other. Each set is a different RV. For example, some RVs may have more parity bits than other RVs. Each RV is identified by an RV index (e.g. RV 0, RV 1, RV 2, . . . etc.). When an uplink transmission is sent using a particular RV, then only the encoded bits corresponding to that RV are transmitted. Different channel codes may be used to generate the encoded bits, e.g. turbo codes, low-density parity-check (LDPC) codes, polar codes, etc. An error control coder (not illustrated) in the message generator 258 in the UE 102a may perform the channel coding. In one embodiment, the channel coding results in an encoded bit stream comprising three bit streams: a systematic bit stream and two parity bit streams. Rate matching may be performed, and a circular buffer (not illustrated) may store the systematic and parity bits. The bits may be read from the circular buffer and modulated for transmission in the uplink message. The circular buffer has different RVs associated with it, e.g. four redundancy versions (RVs): RV0, RV1, RV2, and RV3. Each RV indicates a starting location from which the coded bits are to be read from the circular buffer. Therefore, each RV transmits a different set of the encoded bits. Data may initially be transmitted using RV 0, but a retransmission may sometimes use a higher RV, e.g., RV 2 for the first retransmission, RV 3 for a second retransmission, etc.

The base station 100 uses knowledge of the RV to perform decoding. For chase combining, the RV of the initial and retransmissions may be the same, e.g. RV 0. For incremental redundancy, the retransmissions may use a higher RV that may follow a predetermined pattern, e.g. RV 0 for the initial transmission, RV 2 for the first retransmission, RV 3 for the second retransmission, and RV 1 for the third retransmission. Therefore, in order to decode the data, it may be necessary for the base station 100 to know the RV index of the data being received in a grant-free uplink transmission, unless there is only one predefined RV.

As part of the HARQ procedure for an uplink transmission, an ACK may be sent by the base station 100 when the base station 100 successfully decodes the data of the uplink transmission. In some embodiments, a NACK may be sent by the base station 100 when the data is not successfully decoded.

In some embodiments, autonomous grant-free re-transmissions may be performed by a UE, which means that the UE automatically sends one or more retransmissions of a TB without waiting a set period of time for an ACK or a NACK for a previous transmission of the TB. In such embodiments, NACKs are typically not sent by the base station for the TB. In some embodiments, the UE terminates the autonomous retransmissions when an ACK is received from the base station for the TB, or when the maximum number of retransmissions has occurred.

A UE may transmit multiple TBs and therefore there may be multiple HARQ processes ongoing at any one time for a UE. The different HARQ processes may be identified using different HARQ process IDs. For example, when a UE sends an initial transmission of a first TB and any retransmissions of that first TB, then the UE may associate such initial transmissions/retransmissions with an HARQ process ID #1. When the UE sends an initial transmission of another TB and any retransmissions of that other TB, then the UE may associate such initial transmissions/retransmissions with an HARQ process ID #2. Multiple HARQ processes may be ongoing in parallel. In some embodiments, the HARQ process ID for an uplink transmission and/or an ACK/NACK may be explicitly or implicitly signaled.

An HARQ process may be synchronous, in which case retransmissions are scheduled at predetermined time intervals and based on a systematic timing derived from the system information, as in LTE grant-based uplink HARQ. The HARQ process ID does not need to be explicitly identified in the uplink transmission or the ACK/NACK feedback. If an HARQ process is not synchronous, it is asynchronous, in which case the HARQ process ID may need to be explicitly signaled in some embodiments.

An HARQ transmission may be adaptive or non-adaptive. An adaptive HARQ transmission means that the resources and/or modulation and coding (MCS) scheme may change from the previous uplink transmission in the HARQ process. A non-adaptive HARQ transmission means that the resources and MCS are the same as the previous uplink transmission in the HARQ process.

Mapping to Resources

Figure 3:
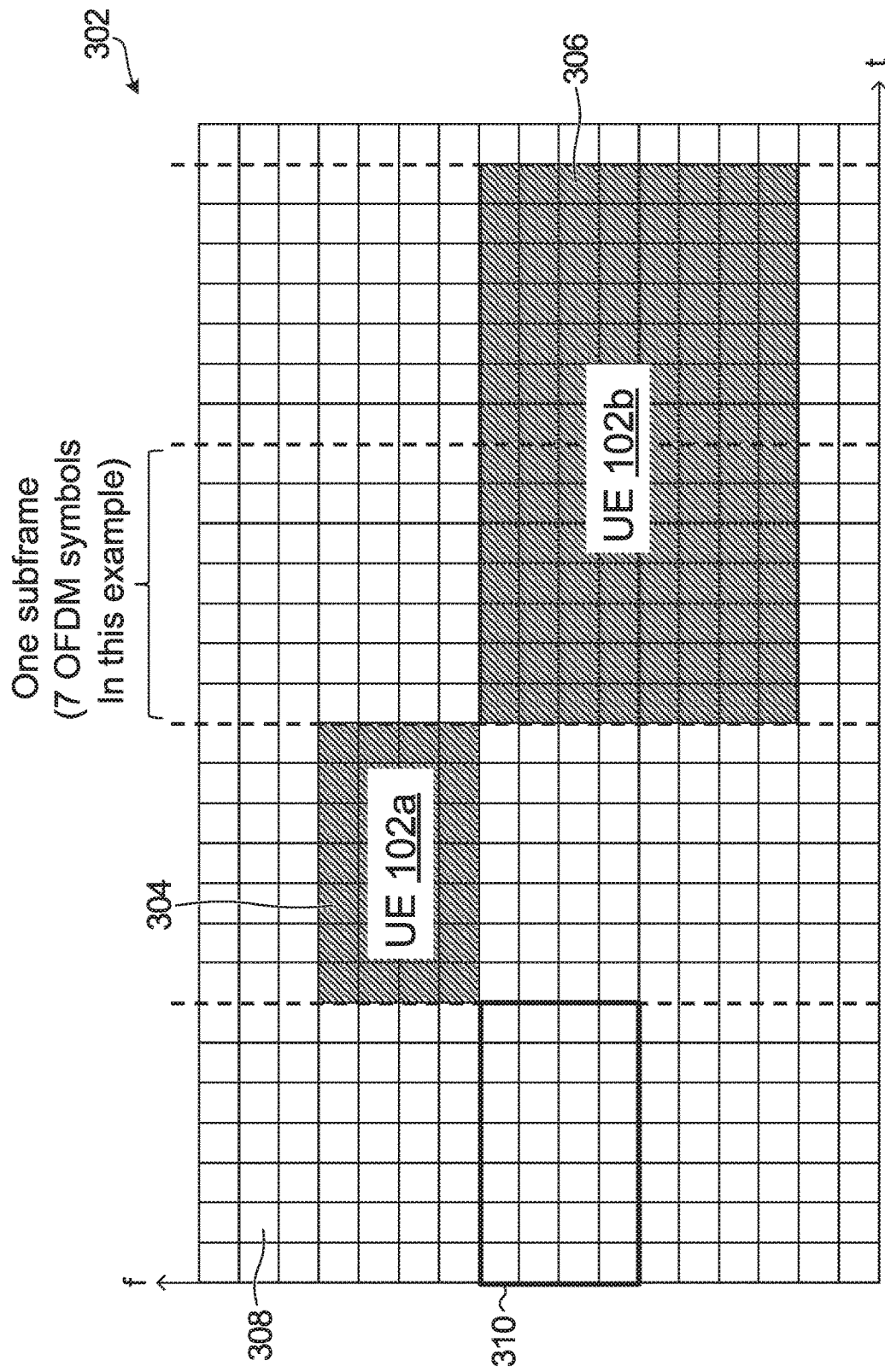
FIG. 3 is an example of uplink time-frequency resources, according to one embodiment.

Transmissions between the base station 100 and the UEs 102a-c are performed using resources. FIG. 3 is an example of uplink time-frequency resources 302, according to one embodiment. The time-frequency resources 302 may be part of an uplink data channel, e.g. a physical uplink shared channel (PUSCH).

The time-frequency resources 302 are partitioned into subframes, which are separated by stippled lines. The word "subframe", as used herein, refers to the minimum duration of time that can be allotted to an uplink transmission of a UE. For example, at partition 304, UE 102a uses time-frequency resources of one subframe in duration to send an uplink transmission. At partition 306, UE 102b uses time-frequency resources of two subframes in duration to send an uplink transmission. Although "subframe" is used herein, it may encompass or be interchangeable with other terms in some implementations, such as scheduling interval, transmission time interval (TTI), transmission time unit (TTU), etc.

A subframe may have a subframe number/index corresponding to the position of the subframe in the frame. The frame the subframe is part of may also have a number, e.g. a system frame number (SFN). In the example time-frequency resources of FIG. 3, each subframe comprises 7 OFDM symbols. However, this is only an example. In some embodiments, there may be more or fewer OFDM symbols in a subframe, and the number of OFDM symbols in a subframe may depend upon the subcarrier spacing. For example, in LTE, a subframe may have 14 OFDM symbols. The time-frequency resources 302 include a plurality of resource elements (REs). Each RE is 1 subcarrier by 1 symbol, and an example of an RE is shown at 308. A resource block (RB) is the smallest unit of resources that can be allocated for an uplink transmission of a UE. An example of a resource block (RB) is shown at 310. RB 310 happens to be one subfame in time by four subcarriers in frequency, but this is only an example. For example, in LTE, an RB may span 12 subcarriers and may have a duration in time equal to half a subframe. Also, the RB 310 may be distributed over time-frequency in actual implementation, i.e. the 28 REs of the RB 310 may not necessarily be adjacent to each other. Each RB may be associated with an index, which identifies the time-frequency location of the RB. For example, RB 310 may be RB index 14.

Figure 4:
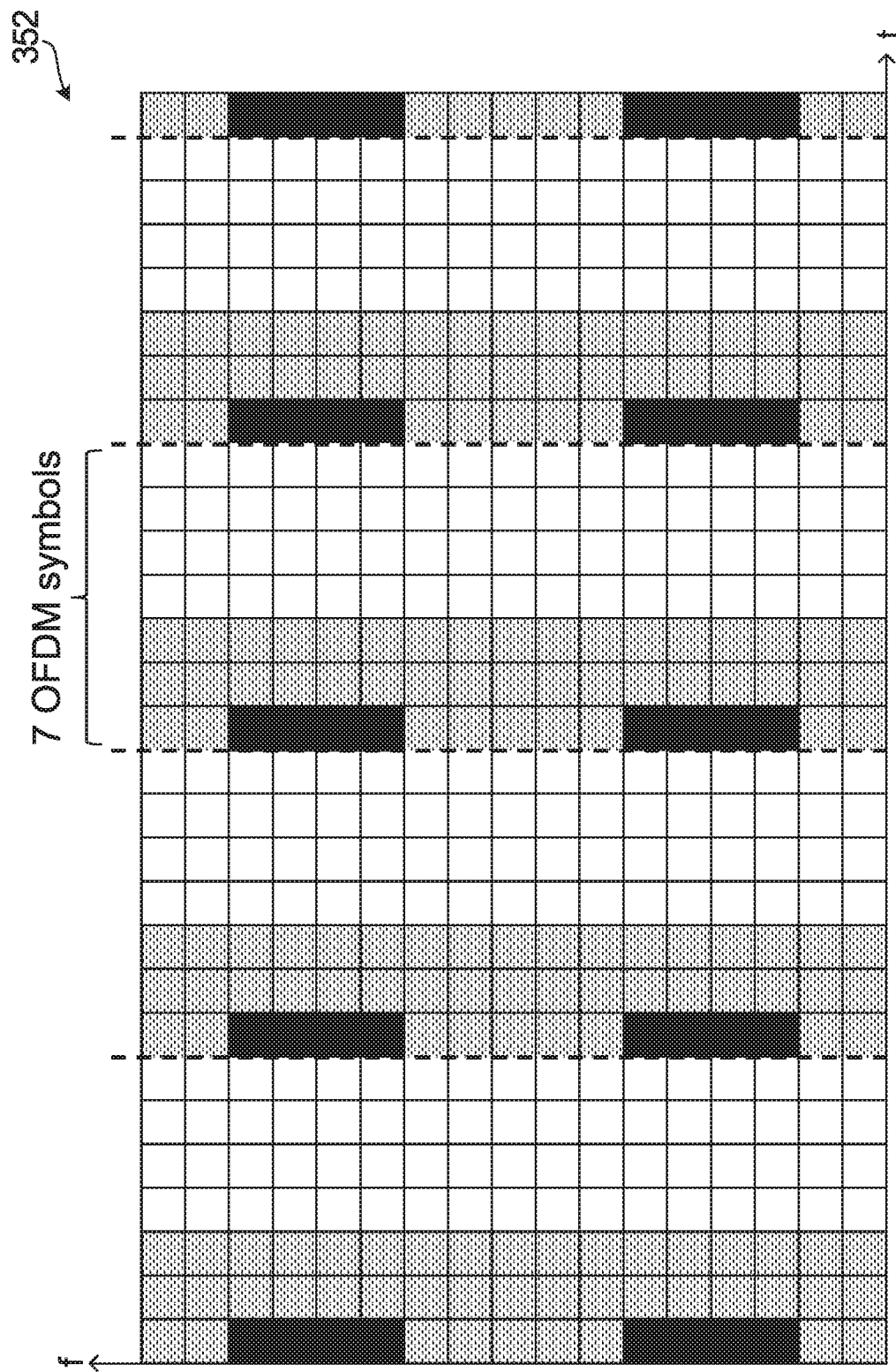
FIG. 4 is an example of downlink time-frequency resources, according to one embodiment.

FIG. 4 is an example of downlink time-frequency resources 352, according to one embodiment. A partition of the downlink time-frequency resources, shown in hatching, is used for sending control information to the UEs. In FIG. 4, every subframe has its first three OFDM symbols used for sending control information. This is only an example. The control information may include a dedicated downlink acknowledgement channel, e.g. a PHICH. The dedicated downlink acknowledgement channel may carry ACK/NACK feedback.

The dedicated downlink acknowledgement channel may comprise a plurality of resource element groups (REGs). A few example REGs in the downlink control channel are shown using black boxes in FIG. 4. Each REG comprises four REs, although this is only an example. In general, a REG may be defined as having more or fewer REs. Also, the REs in a REG do not have to be adjacent to each other.

In some embodiments, more than one REG may be needed to send the ACK/NACK for a particular uplink HARQ process. For example, in LTE, three REGs are used to carry an ACK/NACK for a particular uplink HARQ process. The same three REGs may be used to also transmit ACK/NACKs for other uplink HARQ processes for other UEs, e.g. by using orthogonal spreading sequences to distinguish the different HARQ processes, as described in more detail later. For example, in LTE, a PHICH channel comprises multiple PHICH groups. Each PHICH group is associated with a group number identifying the location of the PHICH group in the time-frequency resources. Each PHICH group consists of 3 REGs. Each ACK/NACK is mapped to a particular PHICH group based on the frequency location of the uplink transmission being ACK/NACK'd, e.g. based on the starting RB index of the uplink transmission. The orthogonal spreading sequence used to encode and decode the ACK/NACK in that PHICH group may be based on the reference signal sequence used when transmitting the uplink transmission being ACK/NACK'd. For example, the orthogonal spreading sequence may be mapped to the DMRS cyclic shift.

Uplink HARQ Procedure for Grant-Based Synchronous Non-Simultaneous Uplink Transmission In some legacy systems, a UE can only transmit one TB per subframe. Uplink transmissions are granted by the base station 100, and the uplink HARQ is synchronous. Adaptive and/or non-adaptive HARQ transmissions may be supported.

Figure 5:
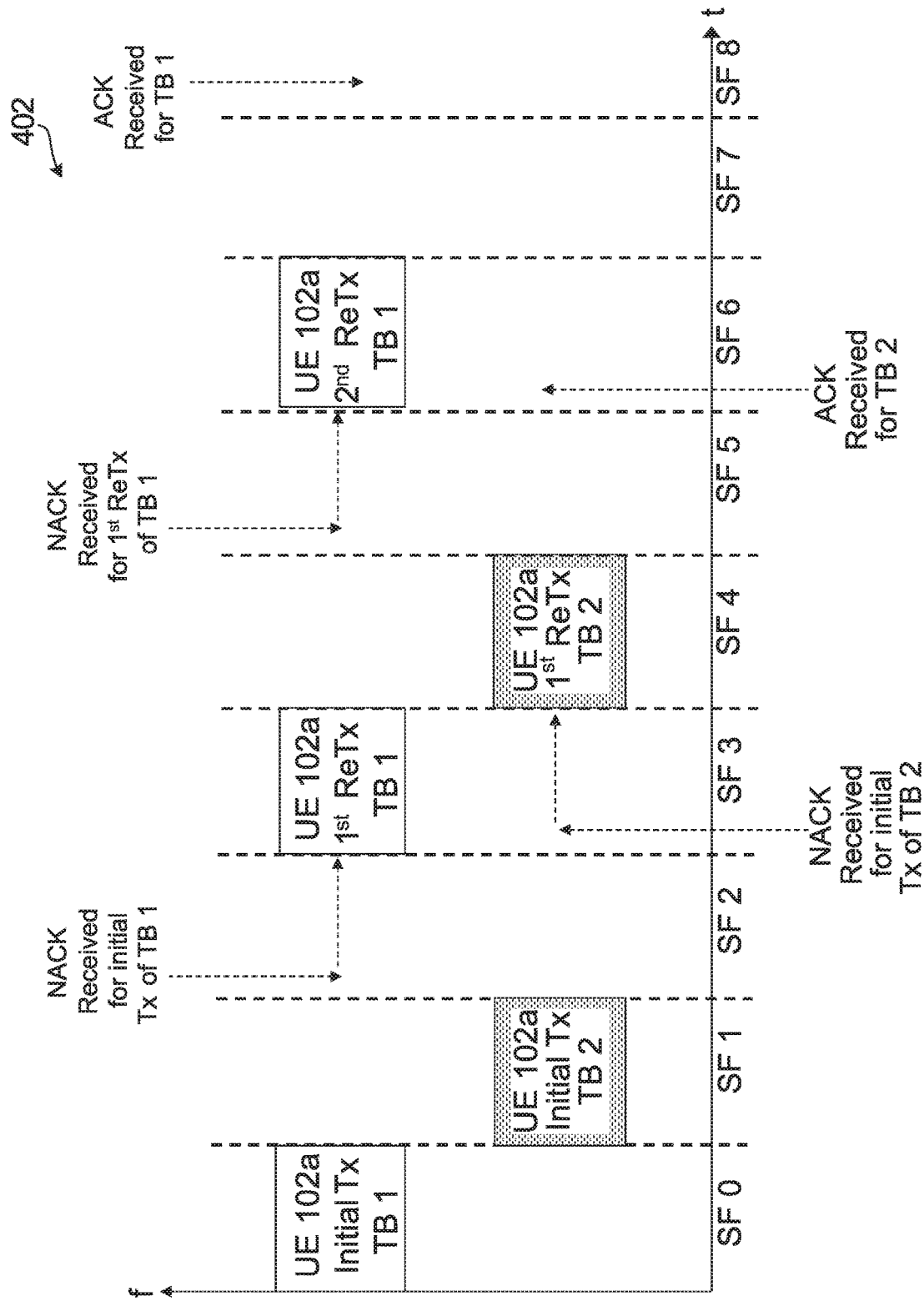
FIG. 5 illustrates a set of uplink time-frequency resources showing two different HARQ processes, according to one embodiment.

For example, FIG. 5 illustrates a set of uplink time-frequency resources 402 showing two different HARQ processes. Individual OFDM symbols and individual resource elements are not illustrated. Each subframe is still indicated using stippled vertical lines, like in FIGS. 3 and 4. The subframes are labelled SF 0 to SF 8 for ease of reference. Two uplink HARQ processes are illustrated for two different TBs (TB 1 and TB 2) sent by the same UE 102a. The uplink transmissions are granted by the base station 100. A retransmission for a TB is sent 3 subframes after the previous transmission of the TB. This is only an example, e.g. in LTE the retransmission is sent 8 subframes after the previous transmission.

An initial uplink transmission of TB 1 is sent in SF 0, and first and second retransmission of TB 1 are required, which respectively occur in SF3 and SF 6. An initial uplink transmission of TB 2 is sent at SF 1, and one retransmission of TB 2 is required, which occurs at SF 4.

No more than one TB is sent from the UE 102a per subframe, which means that uplink initial and uplink retransmissions of different TBs for the same UE do not occur at the same time. For example, in FIG. 5 the initial transmission of TB 2 is sent at SF 1 instead of also at SF 0.

The UE 102a does not need to indicate the HARQ process ID in the uplink initial or retransmissions because the base station 100 granted the uplink initial transmission and either granted the retransmissions or sent NACKs to the UE 102a at the expected instants to trigger the retransmissions of the non-adaptive type, and the base station did not grant more than one uplink transmission of a TB in the same subframe for UE 102a. Therefore, the base station 100 knows what it is to receive from the UE 102a (if anything) each subframe. The base station 100 also does not need to indicate the HARQ process ID in an ACK or NACK sent to the UE 102a because the HARQ process is synchronous and the HARQ process ID can be inferred by the UE 102a based on the transmission time, e.g. based on the system frame number (SFN) and subframe index of the uplink transmission, which has a predetermined relationship with the time of receipt of the ACK/NACK for that uplink transmission.

In some embodiments, the grant sent by the base station 100 may indicate the MCS, the reference signal sequence (e.g. via a DMRS cyclic shift) and the assigned RBs for an uplink transmission of a TB. In some embodiments, the base station 100 may terminate an uplink HARQ process for a TB by setting the new data indicator flag (NDI) in the grant. In some embodiments, the base station 100 may intentionally select a void combination of MCS and assigned RBs in the grant which disables the TB.

Although FIG. 5 illustrates a single uplink transmission/retransmission of a TB per subframe for UE 102a, the base station 100 would also schedule the uplink transmission of other TBs from other UEs in the same subframe. For example, although not shown in FIG. 5, an initial uplink transmission of a TB from UE 102b, as well as an initial uplink transmission of a TB from UE 102c, may also be sent in SF 0.

Figure 6:
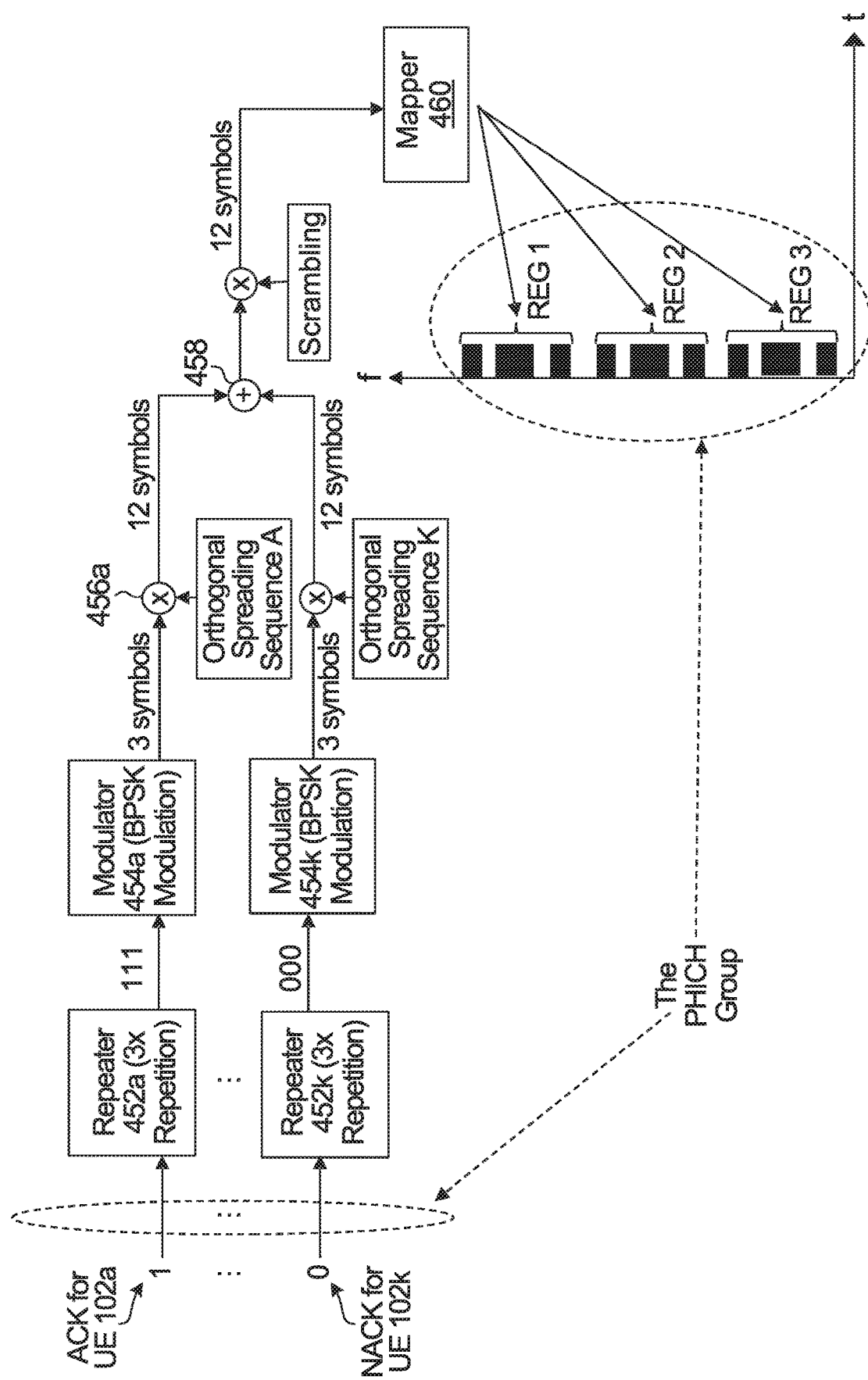
FIG. 6 illustrates one embodiment of a system for generating and sending multiple ACK/NACKs for multiple uplink transmissions sent by different UEs in the same uplink subframe.

FIG. 6 illustrates an embodiment of a system for generating and sending multiple ACK/NACKs for multiple uplink transmissions sent by different UEs in the same uplink subframe. An ACK is represented by the bit '1', and a NACK is represented by the bit '0'. In the example shown, ACK/NACKs are sent for k UEs (UE 102a to UE 102k) in a single PHICH group. In some embodiments, k is less than or equal to the number of orthogonal sequences. In LTE, the number of orthogonal sequences is eight when the normal cyclic prefix (NCP) is used and four when shorter sequences are used with the extended cyclic prefix (ECP) Other UEs sending uplink transmissions in the same uplink subframe may have their ACK/NACKs mapped to different PHICH groups, but this is not illustrated in FIG. 6 for simplicity.

In FIG. 6, an ACK is being sent to UE 102a and a NACK is being sent to UE 102k. The ACK/NACKs being sent to UEs 102b to 102k-1 are not illustrated for simplicity. In the top branch, the bit '1' representing the ACK for UE 102a is sent to a repeater 452a, which performs 3× repetition to result in '111'. The output '111" is then modulated using binary phase shift keying (BPSK) in modulator 454a to result in three symbols. The three symbols are then spread to 12 symbols using orthogonal spreading sequence A, e.g. by multiplying the 3 symbols by a 4-symbol orthogonal spreading sequence A via multiplier 456a. The 3× repetition by repeater 452a and the spreading from 3 to 12 symbols using the orthogonal spreading sequence is to try to increase the reliability of the transmission, i.e. to try to avoid an ACK being incorrectly decoded as a NACK and vice versa. Note that the orthogonal spreading sequence may instead be called a spreading sequence, an orthogonal code or an orthogonal sequence.

A similar process occurs for each other ACK/NACK in the PHICH group. For example, the bottom branch is also illustrated in FIG. 6. The bit '0' representing the NACK for UE 102k is sent to a repeater 452k, which performs 3× repetition to result in '000'. The output '000" is then modulated using BPSK in modulator 454k to result in three symbols. The three symbols are then spread to 12 symbols using the 4-symbol orthogonal spreading sequence K.

If an extended CP is used instead, then the 3 symbols in each branch are instead spread to 6 symbols by the 2-symbol orthogonal spreading sequence.

A different orthogonal spreading sequence is used for each branch. The 12 symbols corresponding to each ACK/NACK are then combined into a single sequence of 12 symbols, e.g. using adder 458. After scrambling, the 12 symbols are then mapped by mapper 460 to three REGs, each REG having four REs, and each one of the four REs of each REG used to transmit a respective one of the 12 symbols in the downlink. The three REGs are preconfigured, and may each be located at the first OFDM symbol of a downlink subframe. The three REGs may be distributed in frequency (e.g. as illustrated) to span the downlink bandwidth and exploit frequency diversity. In some embodiments, the three REGs may instead by located in the first 3 OFDM symbols of a subframe.

Each one of UEs 102a to 102k knows which downlink subframe to look for its PHICH based on the timing of the original grant for the uplink transmission. Each one of UEs 102a to 102k knows the location of the REGs in the downlink based on the PHICH group number, which is mapped to the starting RB index of the uplink transmission being ACK/NACK'd. That is, the starting RB index of the uplink transmission maps to the time-frequency location of the REGs carrying the ACK/NACK feedback for that uplink transmission. Each one of UEs 102a to 102k uses their respective orthogonal spreading sequence to decode their ACK/NACK from the group of ACK/NACKs carried on the PHICH group. The orthogonal spreading sequence is known from the reference signal sequence used in the uplink transmission being ACK/NACK'd. For example, each DMRS cyclic shift may be associated with a unique orthogonal spreading sequence. The reference signal sequence (e.g.

the DMRS cyclic shift) and the starting RB index of the uplink transmissions are granted by the base station 100, e.g. in downlink control information (DCI), such as DCI 0.

In some embodiments, the number of PHICH groups is cell-specific and varies based on system bandwidth. In some embodiments, the number of PHICH groups that are supported is determined by the system bandwidth ("$N_{RB}$") and a special parameter called $N_g$. The following table illustrates the number of PHICH groups supported for each $N_{RB}/N_g$ combination, according to one embodiment:

| $N_{RB}/N_g$ | 1/6 | 1/2 | 1 | 2 |
|---|---|---|---|---|
| 6 (1.4 Mhz) | 1 | 1 | 1 | 2 |
| 15 (3 Mhz) | 1 | 1 | 2 | 4 |
| 25 (5 Mhz) | 1 | 2 | 4 | 7 |
| 50 (10 Mhz) | 2 | 4 | 7 | 13 |
| 75 (15 Mhz) | 2 | 5 | 10 | 19 |
| 100 (20 Mhz) | 3 | 7 | 13 | 25 |

In some embodiments, the HARQ transmit buffer for an HARQ process is not cleared from a TB when an ACK is received, just in case the ACK is actually a NACK that was incorrectly decoded by the UE as an ACK. Instead, in such embodiments, the HARQ transmit buffer is not cleared until the new data indicator (NDI) is set in the physical downlink control channel corresponding to the uplink grant in DCI0.

Uplink HARQ and Simultaneous Uplink Transmission

Figure 7:
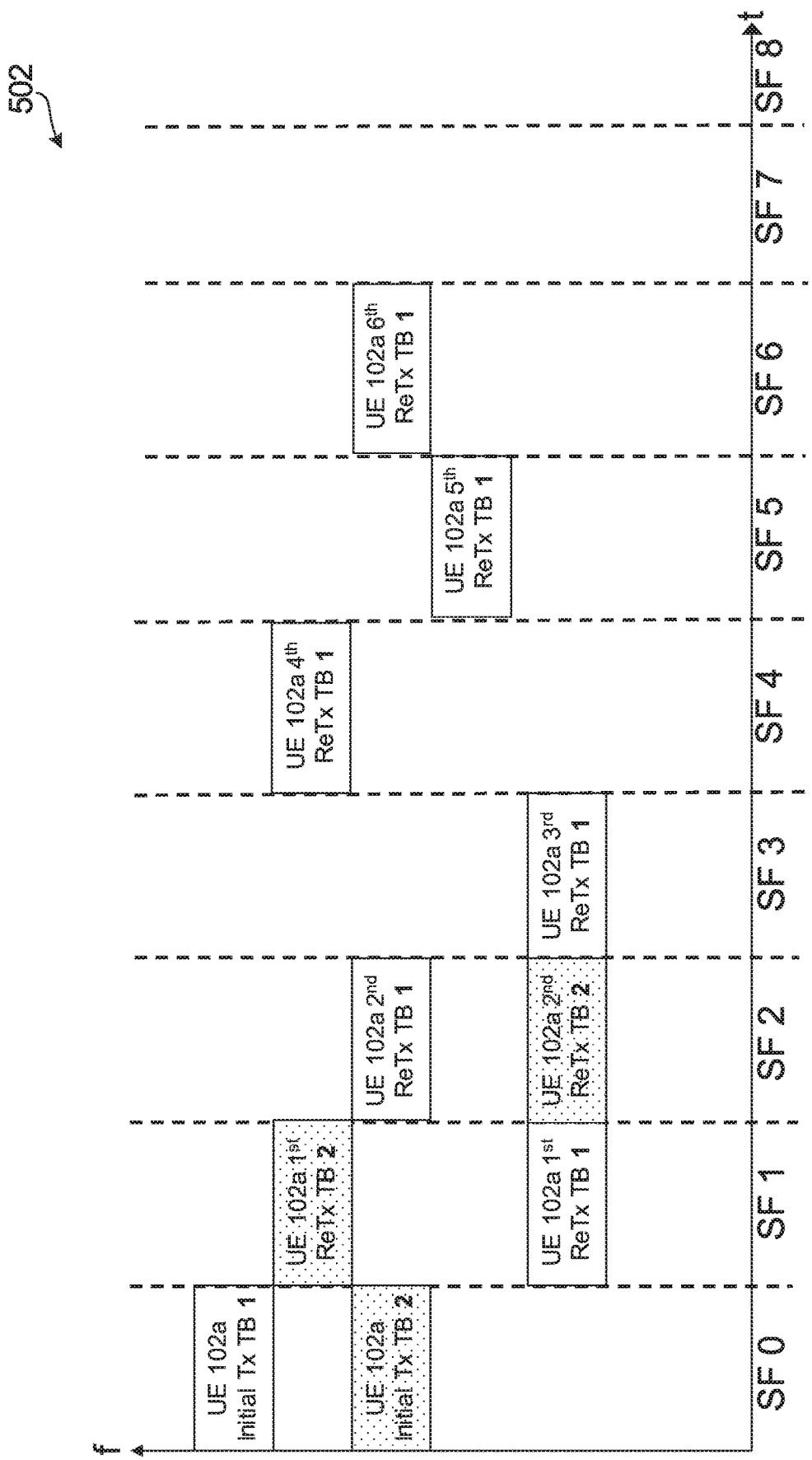
FIGS. 7 and 8 each illustrate a set of uplink time-frequency resources showing two different HARQ processes according to example embodiments.
Figure 8:
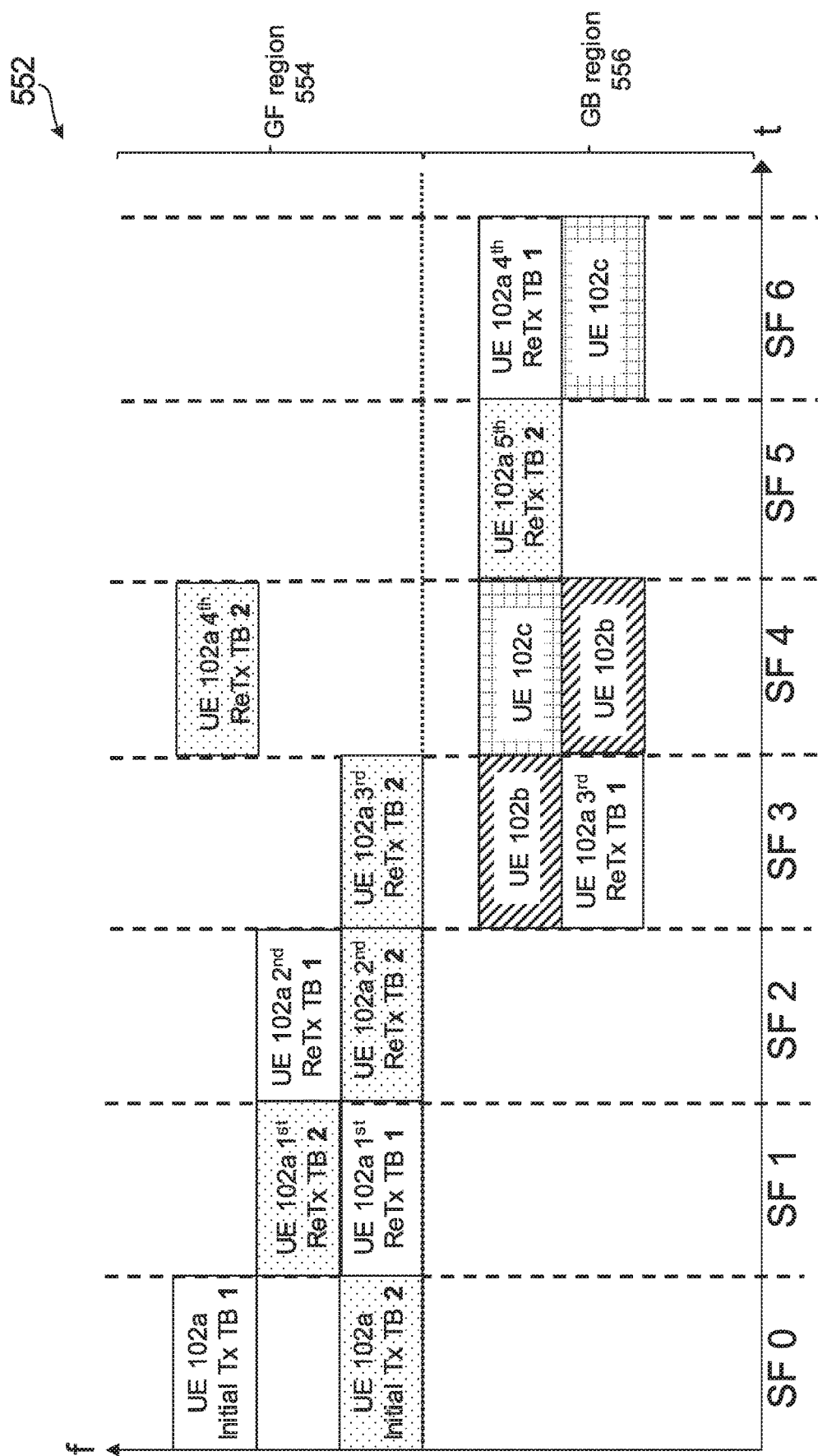

In the embodiment described above in relation to FIGS. 5 and 6, a limitation is present in that no more than one TB is sent from the same UE per subframe. However, in some applications, such as in some grant-free uplink transmission schemes, a UE may send more than one TB per subframe. For example, FIG. 7 illustrates a set of uplink time-frequency resources 502 showing two different HARQ processes. The subframes are labelled SF 0 to SF 8 for ease of reference. The uplink resources are grant-free resources, i.e. the uplink transmissions are grant-free uplink transmissions. Two uplink HARQ processes are illustrated for two different TBs (TB 1 and TB 2) sent by the same UE 102*a*. Transmissions relating to TB 1 and TB 2 may occur in the same subframe. For example, UE 102*a* sends both an initial transmission of TB 1 and an initial transmission of TB 2 in SF 0. As another example, FIG. 8 illustrates a set of uplink time-frequency resources 552 showing the two different HARQ processes according to another embodiment. The time-frequency resources 552 are partitioned into a grant-free region 554 and a grant-based region 556. Grant-free uplink transmissions occur in the grant-free region 554, and uplink transmissions in the grant-based region 556 are granted by the base station 100. UE 102*a* sends more than one TB per subframe. Even for a given grant-free HARQ process, autonomous NACK-less retransmissions may occur resulting in an asynchronous HARQ procedure. In the example of FIG. 8, a grant-free to grant-based (GF2 GB) switch occurs after the $4^{th}$ retransmission of TB 2 on the grant-free uplink resources. The $5^{th}$ retransmission of TB 2 is scheduled by the base station 100 on the grant-based resources. Similarly, a grant-free to grant-based switch also occurs after the $2^{nd}$ retransmission of TB 1. Granted uplink transmissions for UEs 102*b* and 102*c* are also illustrated for the sake of example.

In both the FIGS. 7 and 8 examples, at any given subframe a UE could be transmitting multiple TBs simultaneously and possibly in an asynchronous manner. The following items may therefore need to be resolved in some implementations to support uplink HARQ:

(1) How will an HARQ process ID be signalled to/determined by the base station 100 indicating which uplink transmission on a given subframe corresponds to which TB.
(2) How will the base station 100 identify revisions of the same TB (i.e. retransmissions) for decoding/soft combining if these revisions are transmitted asynchronously and more than one TB can be sent by the same UE in an uplink subframe.
(3) How will the base station 100 indicate the ACK/NACK feedback for multiple TBs sent in the same uplink subframe by the same UE.
(4) How will the UE extract its ACK/NACK feedback and map the feedback to corresponding TBs.
(5) If the base station 100 decides to grant a retransmission for one of the multiple TBs sent in the same uplink subframe by the same UE, then how does the base station 100 indicate to the UE which TB the grant is intended for.
(6) Further to (5), how will the UE detect that the grant is intended for a given TB of the simultaneously transmitted TBs.

At least some of items (1) to (6) relate more generally to the following two-sided problem: how does the base station know which uplink transmission from a UE relates to which HARQ process, and how does the UE know which ACK/NACK feedback or a grant from a base station corresponds to which HARQ process.

Although items (1) to (6) may be more prominent in grant-free and grant-free to grant-based schemes, items (1) to (6) may also need to be resolved in semi-persistent scheduling (SPS) or grant-based schemes in which the UE has more than one transmit opportunity in any given subframe.

Embodiments below provide systems and methods for uplink HARQ when a UE can adopt an asynchronous procedure and/or transmit more than one TB per subframe, e.g. as in FIGS. 7 and 8. Some of the embodiments described below are in the context of grant-free and grant-free to grant-based uplink transmissions. Other embodiments are in the context of a grant-based scheme.

A. Random Grant-Free

In some embodiments, the UEs may be configured to transmit in grant-free mode, which means that the UEs are able to send grant-free uplink transmissions on grant-free uplink resources. The grant-free uplink resources available to the UEs may be configured by the base station, e.g., in a semi-static manner.

When a UE has a TB to send to a base station, the UE sends an initial transmission of the TB to the base station on grant-free uplink resources, possibly followed by one or more retransmissions. In some embodiments, the base station 100 may not know in advance on which resources the UE will send the retransmissions. Such embodiments are referred to as "random grant-free" embodiments. In random grant-free, there is not a resource allocation hopping pattern for sending retransmissions that is known in advance to both the UEs and the base station. That is, resource allocation patterns are not preconfigured, and grant-free uplink transmissions with random frequency hopping patterns may be utilized. The uplink HARQ process is asynchronous.

In some embodiments, the reference signal sequence in the grant-free uplink transmission uniquely identifies both the UE sending the grant-free uplink transmission and the HARQ process ID, i.e. the TB being sent. The reference signal sequence may be a DMRS cyclic shift. For example, nine different reference signal sequences may be partitioned by the base station 100 into three mutually exclusive groups: a first group having reference signal sequences 1 to 3, a second group having reference signal sequences 4 to 6, and a third group having reference signal sequences 7 to 9. The base station assigns reference signal sequences 1 to 3 to UE 102a, assigns reference signal sequences 4 to 6 to UEs 102b, and assigns reference signal sequences 7 to 9 to UE 102c. When UE 102a sends a grant-free uplink initial transmission or retransmission for a first TB as part of a first HARQ process, the UE 102a always selects a same one of reference signal sequences 1 to 3. For example, UE 102a may use reference signal sequence 1 for any transmissions of TB 1. When UE 102a sends a grant-free uplink initial transmission or retransmission for a second TB as part of a second HARQ process, the UE 102a always selects a same one of reference signal sequences 1 to 3 that is not already being used by UE 102a in another active HARQ process. For example, UE 102a may use reference signal sequence 2 for any transmissions of TB 2. Etc. Therefore, the reference signal sequence detected by the base station in the grant-free uplink transmission reveals to the base station both which UE sent the uplink transmission and the HARQ process to which the uplink transmission belongs. The base station 100 will therefore know which previous transmissions to soft-combine with the received uplink transmission. Note that in some embodiments the HARQ process ID assigned to the uplink grant-free transmission of a TB by the UE and the base station may be different as long as no explicit indication of the HARQ process ID needs to be sent by the base station in a grant or by the UE in feedback.

The assignment of reference signal sequences to the UEs 102a-c is not performed using a dynamic grant in DCI, but is instead performed on a static or semi-static basis, e.g. using higher layer signaling, such as radio resource control (RRC) signaling. In some embodiments, assigning a reference signal sequence to a UE may be performed by assigning a DMRS sequence and a UE-specific cyclic shift to the UE, from which the UE obtains the reference signal sequence.

Whenever the UE has a new TB to send to the base station, the UE may determine a new HARQ process ID for that TB from an idle HARQ list, e.g. using the following formula to obtain the new HARQ process ID: $ID_{i+1}=(ID_i+1) \mod N_{HARQ}$, where $ID_{i+1}$ is the HARQ process ID picked for the new TB, $ID_i$ is the HARQ process ID chosen for the previous TB, and $N_{HARQ}$ is the total number of HARQ process IDs available and configured by the base station. Each HARQ process ID may be associated by the UE with a particular reference signal sequence so that the base station 100 can identify the HARQ process ID based on the reference signal sequence used in the uplink transmission. If the base station 100 detects a new TB uplink transmission, e.g. through the receipt of a new reference signal sequence from the UE, then the base station may determine the HARQ process ID using the same rule as the UE, e.g. $ID_{i+1}=(ID_{i+1}) \mod N_{HARQ}$. Otherwise, if the uplink transmission is not a new TB, but is a retransmission of a previous TB, e.g. determined through the receipt of a same reference signal sequence as a previous transmission, then the retransmission is associated with the HARQ process ID of the earlier revisions of the TB and is combined with the earlier revisions of the TB.

In some embodiments, both the base station 100 and the UE keep track of the mapping between (i) the non-idle (i.e. actively ongoing) HARQ processes of that UE, and (ii) the used uplink channel (e.g., PUSCH) parameters for those HARQ processes, i.e. the starting RB indices and the DMRS cyclic shifts, for a number of subframes greater than or equal to the ACK/NACK feedback delay.

In some embodiments, if a UE is configured to perform autonomous grant-free uplink retransmissions, then the receipt of an ACK for the TB is used for early termination of the retransmissions, rather than waiting for a NDI indication in an uplink grant.

B. Preconfigured Resource Allocation Per TB ("Preconfigured Grant-Free")

Figure 9:
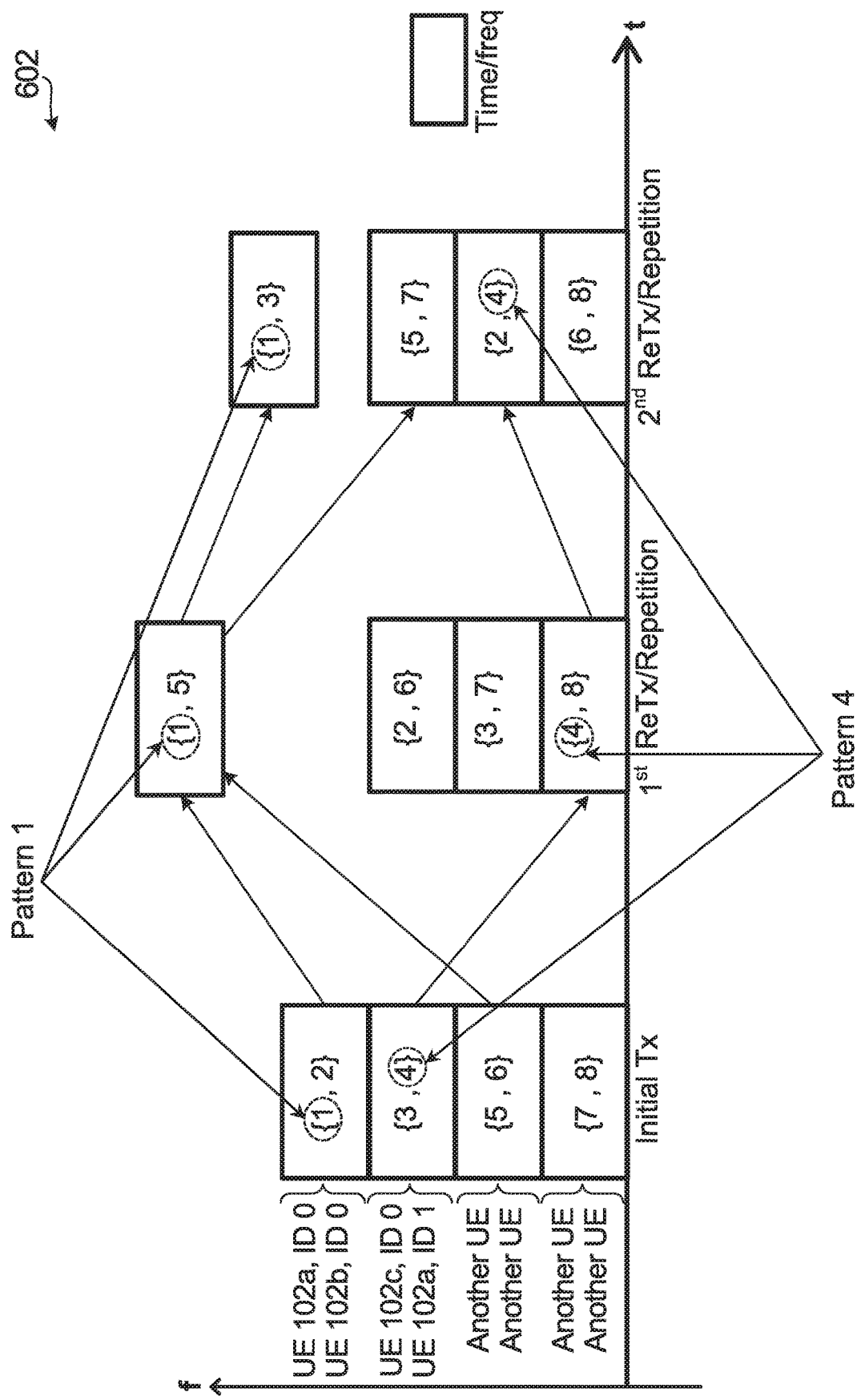
FIG. 9 illustrates a set of uplink time-frequency resources showing multiple predetermined hopping patterns, according to one embodiment.

In some embodiments, the resource allocation pattern for grant-free uplink transmissions/retransmissions is known in advance to both the UEs and the base station. Such embodiments are referred to as "preconfigured grant-free" embodiments. Each predetermined pattern may be referred to as a hopping pattern, and the starting RB index of an uplink transmission identifies which hopping pattern the uplink transmission is part of. However, the base station typically does not know in advance in which subframe a hopping pattern will be initiated. For example, FIG. 9 illustrates a set of uplink time-frequency resources 602 showing multiple predetermined hopping patterns, according to one embodiment. Each predetermined hopping pattern is identified by a number. For example, hopping patterns '1' and '4' are specifically highlighted in FIG. 9. Some hopping patterns, e.g. hopping patterns 1 and 2, partially overlap in time-frequency resources. Other hopping patterns, e.g. hopping patterns 1 and 4, do not overlap in time-frequency resources.

When a UE starts a new HARQ process, the UE selects one of the predetermined hopping patterns not already being used by the UE. For example, in FIG. 9, UE 102a selects hopping pattern 1 for its HARQ process ID '0', and selects hopping pattern '4' for its HARQ process ID '1'. UE 102b only has one HARQ process and selects pattern '2'. UE 102c also only has one HARQ process and selects pattern '3'. When a UE has more than one ongoing HARQ process, e.g. as is the case for UE 102a in FIG. 9, then the UE selects different hopping patterns for each process that do not overlap in resources. For example, UE 102a would not use hopping pattern '2' for its HARQ process ID '1' because hopping pattern '2' overlaps in time-frequency resources with hopping pattern '1'.

The hopping pattern used uniquely identifies the HARQ process to the base station. For example, based on the RB index of the uplink transmission, the base station can determine which HARQ process the uplink transmission belongs to. This is because the RB index will identify the hopping pattern, which will identify the HARQ process.

The reference signal used in the uplink transmission uniquely identifies the UE. The base station assigns different reference signal sequences to different UEs for the uplink resources so that there is a unique mapping between a reference signal sequence and a UE. As an example, nine different reference signal sequences may be partitioned by the base station 100 into three mutually exclusive groups: a first group having reference signal sequences 1 to 3, a second group having reference signal sequences 4 to 6, and a third group having reference signal sequences 7 to 9. The base station assigns reference signal sequences 1 to 3 to UE 102a, assigns reference signal sequences 4 to 6 to UEs 102b, and assigns reference signal sequences 7 to 9 to UE 102c. Then, for example, when the base station 100 receives an uplink transmission having reference signal sequence 1, 2 or 3, the base station 100 knows the uplink transmission originated from UE 102a. Unlike the random grant-free embodiments described earlier, the base station 100 does not need to rely upon the reference signal sequence to identify the HARQ process ID of the uplink transmission from the UE because the HARQ process ID is known from the hopping pattern used for the uplink transmission. Therefore, a UE may use the same reference signal sequence for two uplink transmissions for two different TBs sent in the same uplink subframe on different non-overlapping hopping patterns, as long as the UE is able to distinguish between the ACK/NACK feedback for both TBs in some other manner (e.g. through bit positions in an ACK/NACK codeword and the mapping function to physical REGs).

The assignment of reference signal sequences to the UEs 102a-c is not performed using a dynamic grant in DCI, but is instead performed on a static or semi-static basis, e.g. using higher layer signaling, such as radio resource control (RRC) signaling. In some embodiments, assigning a reference signal sequence to a UE may be performed by assigning a DMRS sequence and a UE-specific cyclic to the UE, from which the UE obtains the reference signal sequence.

Whenever the UE has a new TB to send to the base station, the UE may determine a new HARQ process ID for that TB from an idle HARQ list, e.g. using the following formula to obtain the new HARQ process ID: $ID_{i+1}=(ID_i+1) \mod N_{HARQ}$, where $ID_{i+1}$ is the HARQ process ID picked for the new TB, $ID_i$ is the HARQ process ID chosen for the previous TB, and $N_{HARQ}$ is the total number of HARQ process IDs available. Each HARQ process ID may be associated by the UE with a particular hopping pattern so that the base station 100 can identify the HARQ process ID based on the starting RB index of the uplink transmission. If the base station 100 detects a new TB uplink transmission from a UE, e.g. through the receipt of an uplink transmission from the UE on a new hopping pattern, then the base station may determine the HARQ process ID using the same rule as the UE, e.g. $ID_{i+1}=(ID_i+1) \mod N_{HARQ}$. Otherwise, if the uplink transmission from the UE is not a new TB, but is a retransmission of a previous TB, e.g. determined through the receipt of a next transmission on a currently-used hopping pattern, then the retransmission is associated with the HARQ process ID of the earlier revisions of the TB and is combined with the earlier revisions of the TB.

In some embodiments, each UE may be assigned a group of hopping patterns that is different from the hopping patterns assigned to the other UEs, in which case the hopping pattern used also uniquely identifies the UE. In such embodiments, the RB index of the uplink transmission may therefore identify both the UE and the HARQ process, and so the reference signal sequence does not have to uniquely identify the UE or TB. Such embodiments assume that there is no chance that two different UEs can start their respective hopping patterns on the same resource. Also, the base station still may not know in advance when the UE's unique hopping pattern may start.

In some embodiments, if a UE is configured to perform autonomous grant-free uplink retransmissions, then the receipt of an ACK for the TB is used for early termination of the retransmissions, rather than waiting for a NDI indication in an uplink grant. In some embodiments, the ACK may be sent on a dedicated downlink acknowledgement channel, such as a PHICH-like channel, as described below.

The uplink HARQ process for the preconfigured grant-free embodiments is asynchronous.

C. Grant-Free to Grant-Based Switch

Regardless of whether "random grant-free" and/or "preconfigured grant-free" embodiments are being implemented, sometimes the base station 100 may perform a grant-free to grant-based switch for a TB of a UE. If the base station performs a grant-free to grant-based switch, then the HARQ process ID for the grant is implicitly or explicitly indicated.

In some embodiments, rather than the base station sending a separate grant for each TB receiving a grant, a new (augmented) grant DCI format may be used, e.g. comprising fields for multiple HARQ process IDs. In some embodiments, the HARQ process ID may be implicitly indicated. For example, if the index of the subframe in which the TB was transmitted within the radio frame is indicated to address the ambiguity due to the possibly variable grant delay, then the HARQ process ID may be implicitly indicated through: (i) the order of HARQ process in the set of active HARQ processes in the subframe, or (ii) the order of the respective TB along the frequency dimension in the subframe. In other embodiments, the HARQ process ID may instead be explicitly indicated, i.e. the HARQ process ID is explicitly included in the uplink grant.

In some embodiments, the grant for a TB may instead have a previously existing grant format modified to have an HARQ process ID field.

D. Grant-Based Mode

In some embodiments, the UEs may operate in grant-based mode, i.e. the uplink transmissions of the UEs are granted by the base station in a scheduling grant. However, a UE may sometimes be scheduled to transmit to the base station multiple TBs in the same subframe. The HARQ process may be synchronous, but explicit or implicit indication of the HARQ process ID is used in a grant because the granted frequency resources may change over retransmissions. The UE is therefore informed of the HARQ process ID so that the UE knows which HARQ process the granted uplink transmission is for. As explained above, in some embodiments a new grant DCI format may be used, e.g. comprising fields for multiple HARQ process IDs, and the HARQ process ID may be implicitly or explicitly indicated. In other embodiments, the grant for a TB may instead have a previously existing grant format modified to have an HARQ process ID field.

In some embodiments, the number of bits used in the grant to identify the HARQ process may be reduced if a local index of the HARQ process within a sorted list of active processes is rather indicated. For example, if a UE only has two active HARQ processes, then the explicit indication of the HARQ process ID in the grant may only be a single bit providing a binary indication of which of the two HARQ process IDs is being scheduled. The UE and base station would need to know in advance which bit value corresponds to which HARQ process ID.

ACK/NACK Feedback for Simultaneous Uplink Transmission on a Dedicated Downlink Acknowledgement Channel In some embodiments, the base station 100 transmits ACK/NACK feedback for the grant-free uplink transmissions on a dedicated downlink acknowledgement channel. The dedicated downlink acknowledgement channel may be implemented in a similar way to PHICH in LTE, in which case the dedicated downlink acknowledgment channel may be called a "PHICH channel" or a "PHICH-like channel".

In grant-free embodiments, the ACK/NACK feedback timing on the dedicated downlink acknowledgement channel has a predetermined relationship with the grant-free resource access timing. For example, if a UE sends a grant-free uplink transmission for one or more TBs in subframe w, then the ACK/NACK for the uplink transmission of those TBs is sent in a dedicated downlink acknowledgement channel in subframe w+n. n may be equal to the ACK/NACK delay, i.e. the amount of time between when an uplink transmission is sent and when an ACK/NACK for that uplink transmission would be able to be provided by the base station 100.

In some embodiments, there is a known mapping between the reference signal sequence used by a UE to send a grant-free uplink transmission and an orthogonal spreading sequence used by the base station to send the ACK/NACK feedback.

In some embodiments, there is a known mapping between the starting RB index of the uplink transmission in the uplink subframe and the location of the one or more REGs in the downlink acknowledgement channel carrying the ACK/NACK feedback.

For example, a different reference signal sequence may be used for each TB sent in a particular uplink subframe w. The ACK/NACK feedback for the TBs is located in a PHICH-like channel in subframe w+n. The starting RB index of each uplink transmission maps to a particular PHICH group in the PHICH-like channel. The reference signal sequence of each uplink transmissions maps to a respective orthogonal spreading sequence used by the base station 100 to spread the ACK/NACK in the PHICH group. Therefore, when the UE sends an uplink transmission of a TB, the UE knows the subframe in which to find the ACK/NACK feedback (n subframes later), the PHICH group in the subframe (mapped based on the starting RB index of the uplink transmission), and the orthogonal spreading sequence used by the UE to decode the ACK/NACK feedback for that TB in the PHICH group (mapped based on the reference signal sequence used by the UE in the uplink transmission).

Some example systems are described below for the base station to provide ACK/NACK feedback for multiple TBs sent in the same uplink subframe by the same UE. A UE is able to extract its ACK/NACK feedback and map the feedback to corresponding TBs. A dedicated downlink acknowledgement channel is used, which carriers ACK/NACK feedback for UEs. The dedicated downlink acknowledgment channel will be called a PHICH channel, and the ACK/NACK feedback will be mapped to groups of resources that will be referred to as PHICH groups. The embodiments described below may be generalized, e.g. by replacing the PHICH channel with any downlink acknowledgement channel, and by replacing the PHICH groups with groups of resources in the downlink acknowledgement channel.

A. Main Augmented PHICH+Complementary Augmented PHICH

In some embodiments, a UE transmits multiple TBs in the same uplink subframe, and a single ACK/NACK codeword is used to ACK/NACK the multiple TBs. The ACK/NACK codeword indicates which TBs were decoded successfully.

In some embodiments, the ACK/NACK codeword is L bits, where L=K+P. K is the maximum number of supported simultaneously transmitted TBs per UE per subframe, and P is the number of parity bits added to the ACK/NACK codeword. Optionally, L may be selected as an integer multiple of three, e.g. 3 or 6 or 9 etc., to try to be compatible with legacy LTE PHICH length using the same or similar orthogonal spreading sequences. The ACK/NACK codeword is mapped to one or more REGs in a PHICH.

In some embodiments, the bits of the ACK/NACK codeword are ordered so that the UE is able to determine which bit of the codeword corresponds to which TB of the respective subframe. For example, the codeword may be ordered from most significant bit (MSB) to least significant bit (LSB) following the order of starting RB indices of the UE TBs in the frequency domain. As an example, in FIG. 7 UE 102a sends two TBs in SF 0. TB 1 is sent at a higher frequency location than TB 2, and so the ACK/NACK feedback for TB 1 is present before the ACK/NACK feedback for TB 2 in the codeword. If K=2, then the first bit of the codeword would carry the ACK/NACK feedback for TB 1, and the second bit of the codeword would carry the ACK/NACK feedback for TB 2. The starting RB index of TB 1 compared to TB 2 indicates which TB is sent at the higher frequency location and therefore which TB corresponds to which bit in the ACK/NACK codeword. That is, the starting RB indices of the TBs for the UE each map to a respective location in the codeword.

In some embodiments, a complement of the ACK/NACK codeword is also transmitted from the base station in order to try to increase the reliability of ACK/NACK detection. Different possibilities for spreading the ACK/NACK codeword and its complement, as well as for mapping the spread symbols to REGs are described below. Although the complement is shown as a logical inverse in the specific examples illustrated in the figures, it will be appreciated that a complement does not have to be a logical inverse, and that a complement codeword may be generated using any predefined linear block encoder or convolutional encoder.

Figure 10:
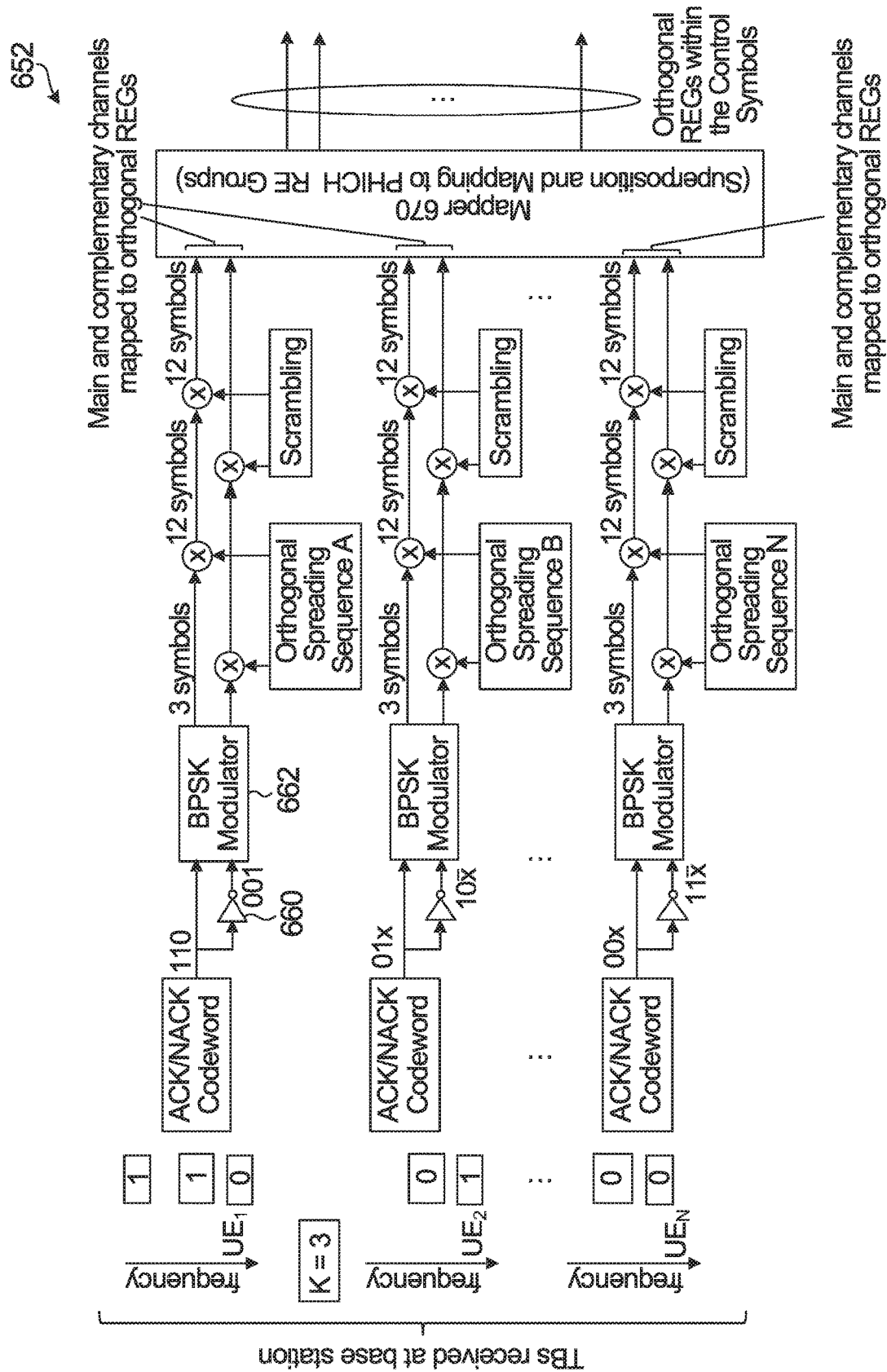
FIGS. 10 to 15 illustrate embodiments of systems for generating and sending multiple ACK/NACKs for multiple uplink transmissions.

FIG. 10 illustrates one example of a system for generating and sending multiple ACK/NACKs for multiple uplink transmissions. Each ACK/NACK codeword is 3 bits and there are no parity bits, such that L=K=3 and P=0. An ACK is identified by the bit '1', and a NACK is identified by the bit '0'.

An ACK/NACK codeword for UE 1 acknowledges three different TBs sent by UE 1 in the same uplink subframe. Each one of the three uplink transmissions may be an initial transmission of the respective TB or a retransmission of the respective TB, it does not matter. In the example illustrated, the first two TBs are ACK'd, and the third TB is NACK'd, resulting in ACK/NACK codeword 110.

An ACK/NACK codeword for UE 2 acknowledges two different TBs sent by UE 2 in the same uplink subframe. In the example illustrated, the first TB is NACK'd and the second TB is ACK'd, resulting in ACK/NACK codeword 01x, where 'x' means the bit is ignored since it is not used.

An example ACK/NACK codeword 00x for UE N is also illustrated in FIG. 10.

The ACK/NACK codeword 110 for UE 1 is inverted by inverter 660 to result in the complement ACK/NACK codeword 001. The ACK/NACK codeword 110 and its complement 001 are each modulated into 3 BPSK symbols using modulator 662. The same orthogonal spreading sequence A is then applied to both the symbols of the ACK/NACK codeword and its complement. The result is the ACK/NACK codeword 110 represented by 12 symbols, and a complement of the ACK/NACK codeword 001 also represented by 12 symbols. After scrambling, the 12 symbols of the ACK/NACK codeword 110 are mapped to a first set of REGs, and the 12 symbols of the complement is mapped to a second set of REGs that is orthogonal to the first set of REGs.

UE 1 knows the downlink subframe in which to find the ACK/NACK feedback based on a preconfigured timing relationship. For example, for grant-based embodiments, the location of the downlink acknowledgement channel in which to find the ACK/NACK feedback may be based on the timing of the original grant for the uplink transmissions, e.g. if the grant is received in downlink subframe w, then ACK/NACK feedback for the granted uplink transmission will be at downlink subframe w+x. As another example, for grant-free embodiments, the location of the downlink acknowledgement channel in which to find the ACK/NACK feedback may be based on the grant-free resource access timing, e.g, if a UE sends a grant-free uplink transmission for one or more TBs in subframe w, then the ACK/NACK for the uplink transmission of those TBs is sent in subframe w+n. UE 1 knows which REGs to find its ACK/NACK codeword 110 and its complement 001 based on the uplink resources used by UE 1 to send the three TBs being acknowledged, e.g. based on the starting RB indices of the TBs. UE 1 knows to use orthogonal spreading sequence A to decode the ACK/NACK codeword 110 and its complement 001 based on the reference signal sequence(s) used by UE 1 to send the three TBs being acknowledged. UE 1 knows which bit in the ACK/NACK codeword corresponds to which TB based on a predefined relationship between the codeword bit location and the starting RB index of each TB, e.g, the order in frequency domain. For grant-based embodiments, the starting RB indices of the TBs and the reference signal sequences are granted by the base station, e.g. in DCI. Also, for the specific example in FIG. 10, a UE may use the same reference signal sequence to transmit its different TBs in the same subframe because the bit location in the ACK/NACK codeword is used to distinguish between the different TBs.

A similar operation occurs for each of UEs 1 to N.

Figure 11:
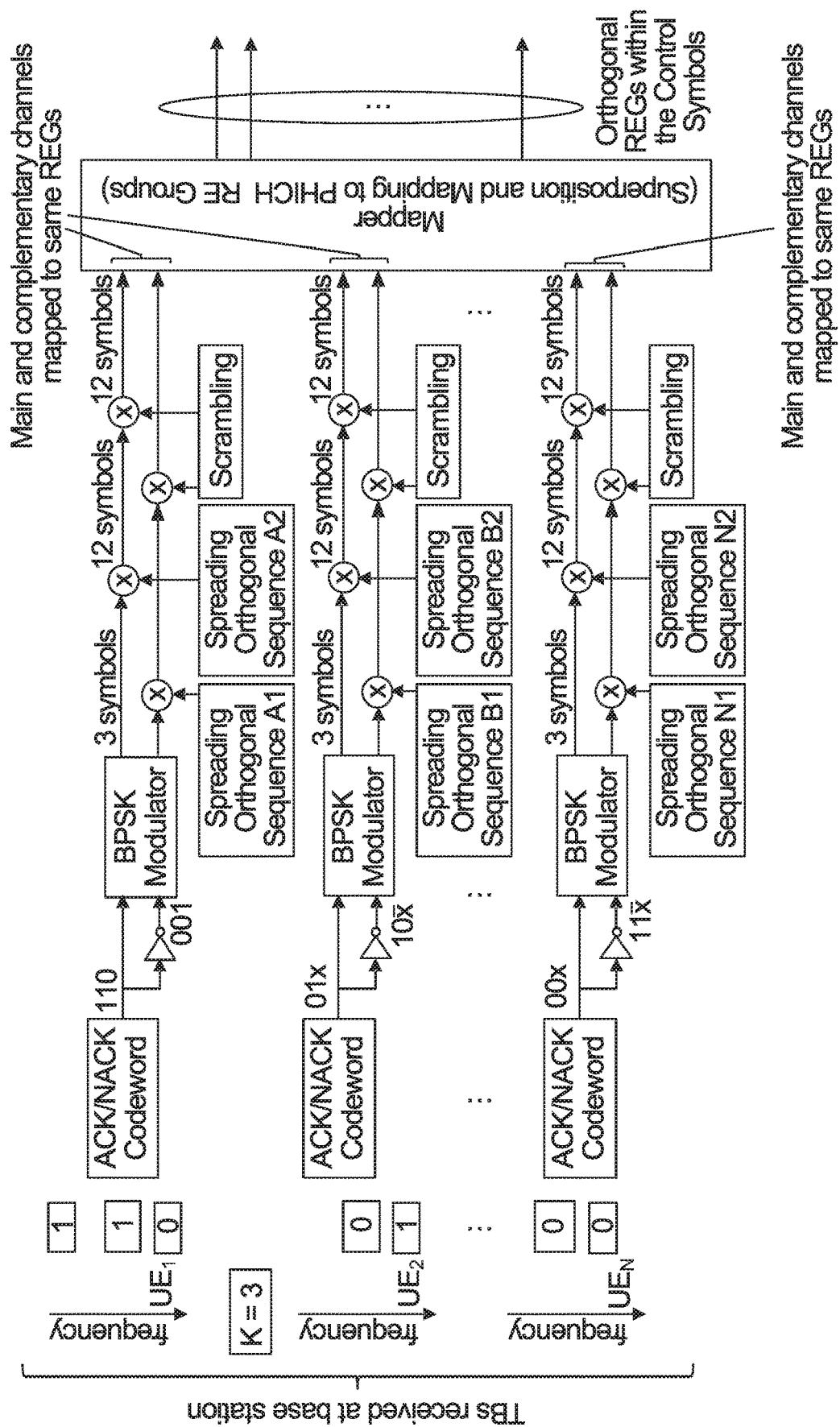

FIG. 11 is a variation of FIG. 10 in which for each ACK/NACK codeword, the spreading sequence used for the ACK/NACK codeword is orthogonal to the spreading sequence used for the complement of that ACK/NACK codeword. That is, spreading sequence A1 is orthogonal to spreading sequence A2, spreading sequence B1 is orthogonal to spreading sequence B2, and spreading sequence N1 is orthogonal to spreading sequence N2. However, each ACK/NACK codeword is mapped to the same REGs as its complement. Alternatively, the ACK/NACK codeword and its complement may be mapped to REGs that are orthogonal to each other, like in FIG. 10. It should be noted that in both examples of FIG. 10 and FIG. 11, any two ACK/NACK bits of the same codeword are not code multiplexed on the same REGs. That is, because the same orthogonal spreading sequence is used for every bit of an ACK/NACK codeword, bits of the same ACK/NACK are not mapped to the same REGs.

Figure 12:
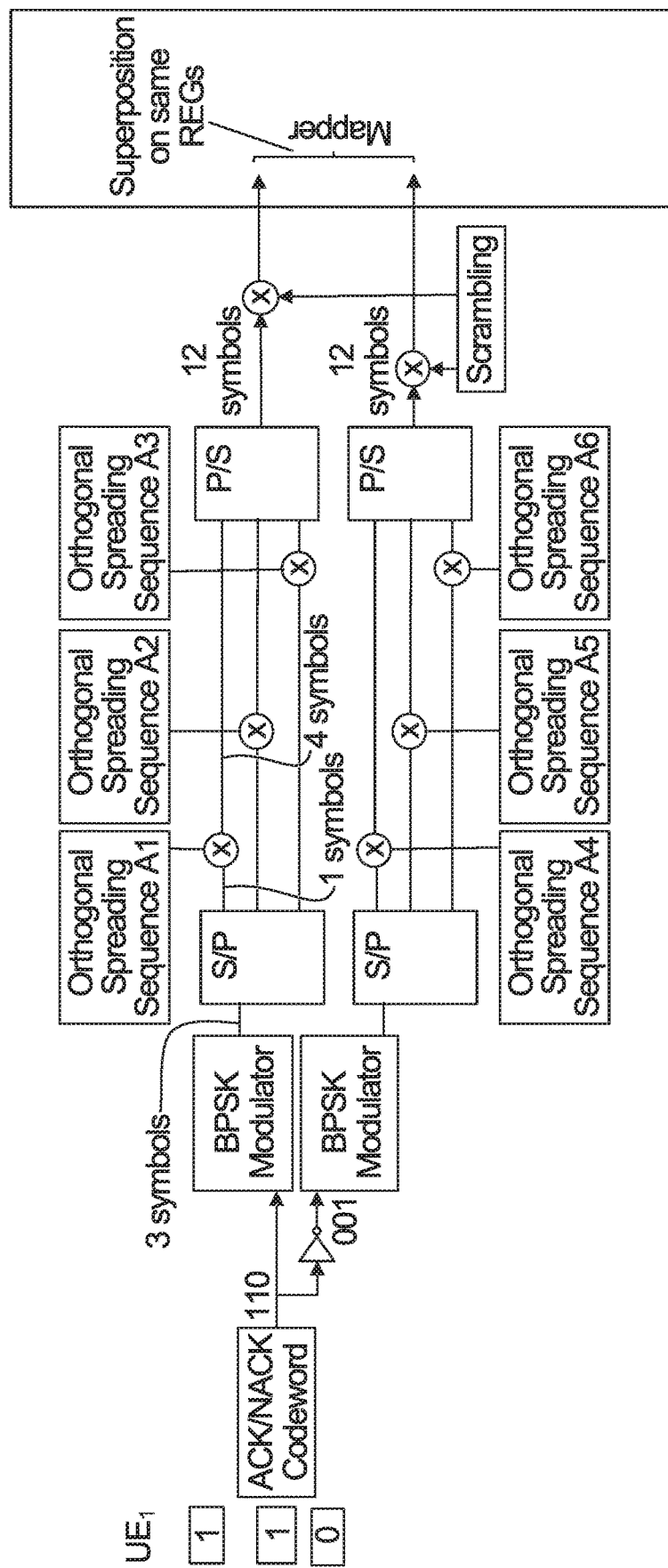

FIG. 12 is a variation of FIG. 11, illustrating that in some embodiments individual bits of an ACK/NACK codeword may be spread by different orthogonal spreading sequences. Only the top branch corresponding to UE 1 is shown, and spreading sequences A1 to A6 are orthogonal to each other. Each spread bit is mapped to the same REGs, although this is not necessary. Note that in FIG. 12, the scrambling may instead be applied after the addition of the complementary and main channel. The same applies to FIGS. 10, 11, 13, and 14. Scrambling is cell-specific, not UE specific.

It will be appreciated that many different variations of FIGS. 10 to 12 are possible, e.g. certain bits in an ACK/NACK codeword being spread by the same spreading sequence and other bits being spread by different spreading sequences, and some spread symbols being mapped to the same or different REGs. However, implementations would be avoided in which the same spreading sequence and REGs were used such that the UE could not distinguish between the ACK/NACK for two different TBs sent by the UE in the same uplink subframe.

Figure 13:
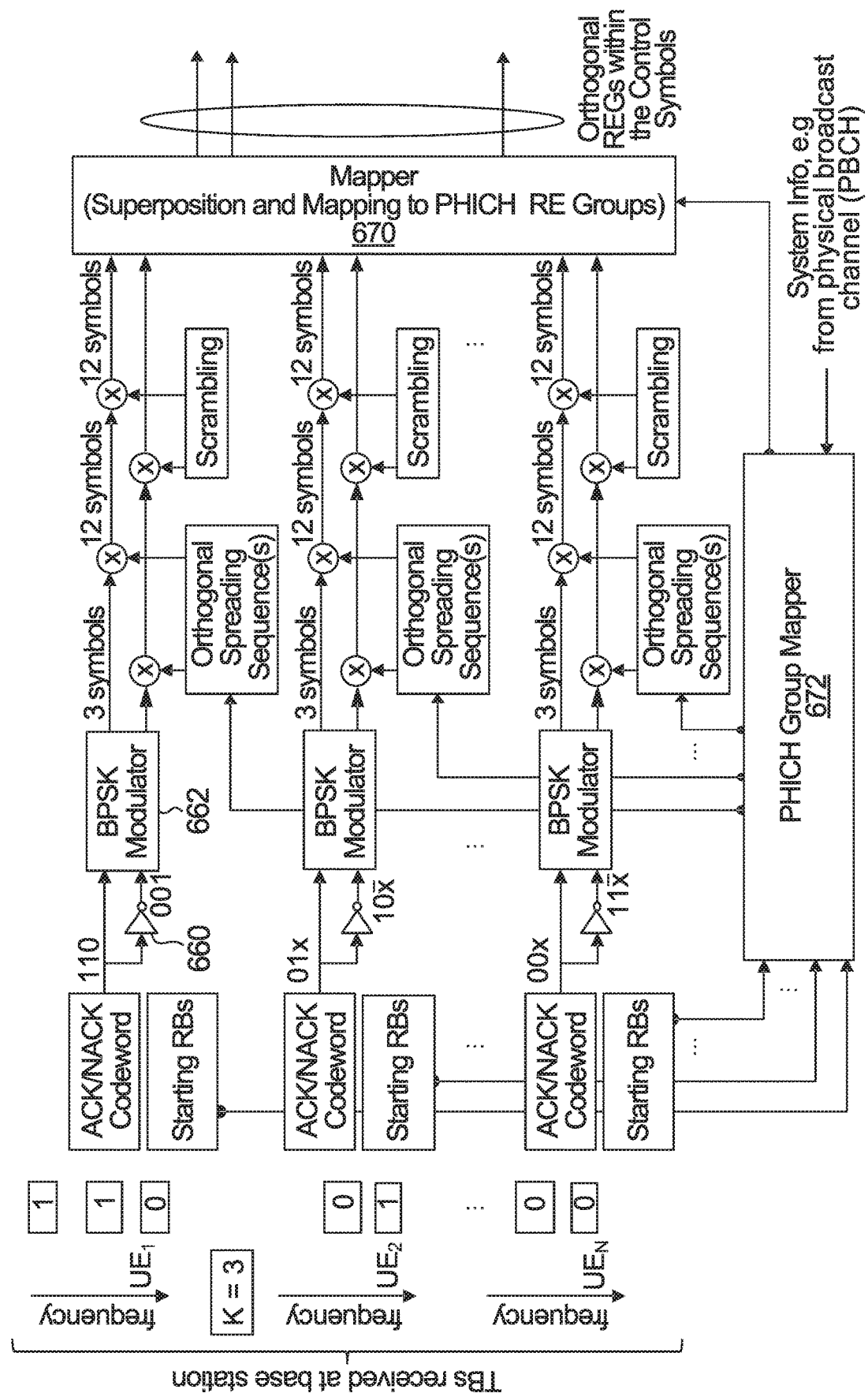

FIG. 13 illustrates a generalization of FIGS. 10 to 12. In general, every UE and every TB may be preconfigured differently. For example, the following may be preconfigured: for UE 1, the ACK/NACK codeword and its complement are both spread using the same spreading sequence, but the ACK/NACK codeword and its complement are mapped to orthogonal REGs; for UE 2, the ACK/NACK codeword and its complement are each spread using a different orthogonal spreading sequence, and the ACK/NACK codeword and its complement are mapped to the same REGs; for UE N, each bit of the ACK/NACK codeword and its complement are each spread using a different orthogonal spreading sequence, and the ACK/NACK codeword and its complement are also mapped to orthogonal REGs. This is only an example. In any case, the base station and the UEs are preconfigured in advance to know which one of the possible implementations is to be used. A PHICH group mapper 672 sets which orthogonal spreading sequence(s) to use for each UE and sets the mapping to REGs by mapper 670 based on system information (e.g. from the physical broadcast channel (PBCH)) and information on the starting RB indices for the TBs being ACK/NACK'd.

Figure 14:
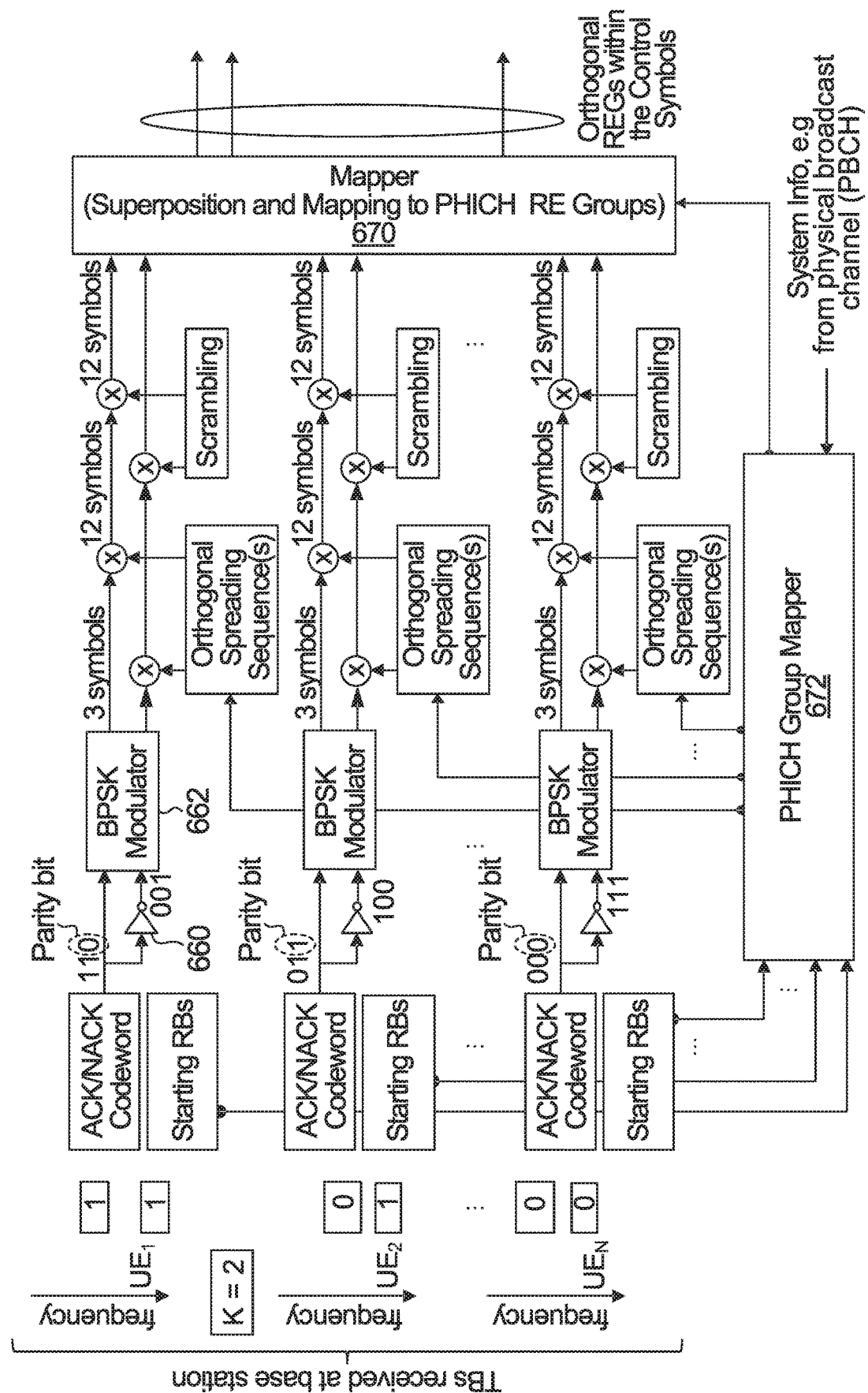

FIG. 14 is a variation of FIG. 13 in which each ACK/NACK codeword is still 3 bits, but there is one parity bit, such that K=2, P=1, and L=K+P=3. The use of a parity bit reduces the number of different TBs that can be sent by a UE in the same subframe (e.g. K is reduced to 2 in FIG. 14 compared to K=3 in FIG. 13). However, the use of a parity bit may increase reliability of the ACK/NACK codeword by the UE.

In the embodiments described above in relation to FIGS. 10 to 14, a possible drawback is that a single ACK/NACK bit for a TB is not repeated three times, e.g. like it is by repeaters 452a to 452k in FIG. 6. The lack of repetition of an ACK/NACK bit for a TB may reduce the reliability of detection of the ACK/NACK bit. However, to counteract this reduction in reliability, a complementary ACK/NACK codeword is also sent. Also, in some embodiments, like in FIG. 14, one or more parity bits may also be included in the ACK/NACK codeword to further increase detection reliability. A further possible benefit of the embodiments of FIGS. 10 to 13 is that control signaling overhead may be reduced because effectively only two ACK/NACK bits for a TB are used (one in the main ACK/NACK codeword and a corresponding one in the complementary ACK/NACK codeword), rather than 3 bits for a single ACK/NACK like in FIG. 6. In the embodiment of FIG. 14, 3 bits are effectively signalled for a single ACK/NACK bit as in LTE yet with increased reliability due to the parity and complementary bits. Also, there is a lot of flexibility possible in the embodiments in FIGS. 13 and 14, e.g. TBs of the same and/or different UEs could be mapped to the same and/or different REGs, different TBs may be spread using different spreading sequences, etc. However, implementations would be avoided in which the same spreading sequence and REGs were used such that the UE could not distinguish between the ACK/NACK for two different TBs sent by the UE in the same uplink subframe.

A UE receiving an ACK/NACK codeword may use the complement of the ACK/NACK codeword and any parity bits, if present, to try to more reliably detect the ACK/NACK codeword. For example, in one embodiment if a parity bit is sent and the parity check of the ACK/NACK codeword or its complement is not correct, then this indicates an error to the UE. As another example, if the decoded complement ACK/NACK codeword is not a complement of the decoded ACK/NACK codeword, then this indicates an error to the UE. Also, only certain ACK/NACK codewords are valid/expected at the UE, e.g. based on the uplink channel parameters for the uplink subframe being ACK/NACK'd. For example, if a UE only sends two TBs in an uplink subframe and there is no parity bits added to the ACK/NACK codeword, then the UE expects an ACK/NACK codeword of length two bits. If the ACK/NACK codeword is a different length, then this indicates an error to the UE. In this way, the UE performs regression on the detected ACK/NACK codeword to try further reduce the impact of a detection error. If parity bits are used, then further error detection/correction capability is exploited, e.g. performing a parity check on the received ACK/NACK codeword and its complement, as mentioned above.

In some embodiments, when the UE identifies an error in the received ACK/NACK codeword, the UE may act on the assumption that the ACK/NACK codeword is all NACKs because it is safer to assume a NACK than to incorrectly assume an ACK. Extra retransmissions are typically tolerable compared to radio link control (RLC) ARQ retransmissions, especially for delay sensitive applications. Therefore, more generally, whenever conflicting regressions occur regarding an ACK indication bit, the UE assumes it was a NACK to reduce the likelihood of NACK-to-ACK misdetection errors.

Assuming a REG has four REs, then in the embodiments of FIGS. 13 and 14 a PHICH group may be mapped to only one REG, rather than 3 REGs. This is because the ACK/NACK for one TB of one UE is only 1 bit, which maps to four symbols and therefore may be carried on four REs (one REG). If the main and complementary channels are assigned orthogonal REGs, then the calculation of the total number of PHICH groups $N_{PHICH}^{group}$ supported for frequency division duplex (FDD) is:

$$N_{PHICH}^{group} = \begin{cases} 2 \cdot \lceil 3N_g(N_{RB}^{DL}/16) \rceil & \text{for normal cyclic prefix} \\ 2 \cdot \lceil 3N_g(N_{RB}^{DL}/8) \rceil & \text{for extended cyclic prefix} \end{cases}$$

where $N_g$ is the same system special parameter mentioned earlier and $N_{RB}^{DL}$ is also a system parameter corresponding to the number of available downlink RBs.

In time division duplex (TDD), the total number of PHICH groups can be different from one subframe to another based on the uplink-downlink configuration for the radio frame, as follows: $m_i \cdot N_{PHICH}^{group}$, where the multiplier $m_i$ can be obtained from the following table:

| Uplink-Downlink Configuration | Subframe Number | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Source: Release 9, 3GPP TS 36.211 V9.1.0 (2010-03)

In the embodiments of FIGS. 13 and 14, the number of PHICH groups used to send an ACK/NACK codeword for a UE can vary dynamically based on the number of TBs being ACK/NACK'd in the subframe. For example, in the example shown in FIG. 13, UE 1 has 3 different TBs being ACK/NACK'd for an uplink subframe, which is why the ACK/NACK codeword has 3 bits. Three PHICH groups are used to send the ACK/NACK codeword. If for a next uplink subframe UE 1 only had one TB being ACK/NACK'd, then the ACK/NACK codeword would only be one bit long and only one PHICH group would be needed.

Finally, in all of the embodiments described above in relation to FIGS. 10 to 14, the ACK/NACK codeword sent on the complement channel is an inverted version of the ACK/NACK codeword on the main channel. For example, the ACK/NACK codeword 110 for UE 1 in FIG. 13 is inverted by inverter 660 to result in the complement ACK/NACK codeword 001. However, in alternative embodiments, an all-parity codeword is instead transmitted on the complement channel. For example, the input to the BPSK modulator 662 in FIG. 13 on the complement channel is not the inversion of the main ACK/NACK codeword, but is instead an all-parity codeword generated from the main ACK/NACK codeword, e.g., using linear block codes or convolutional codes, and transmitted over the complementary channel to further exploit the coding gain. The inverter 660 would instead be replaced with an encoder that encodes the ACK/NACK codeword to generate parity bits.

B. Individual PHICH Per TB

Figure 15:
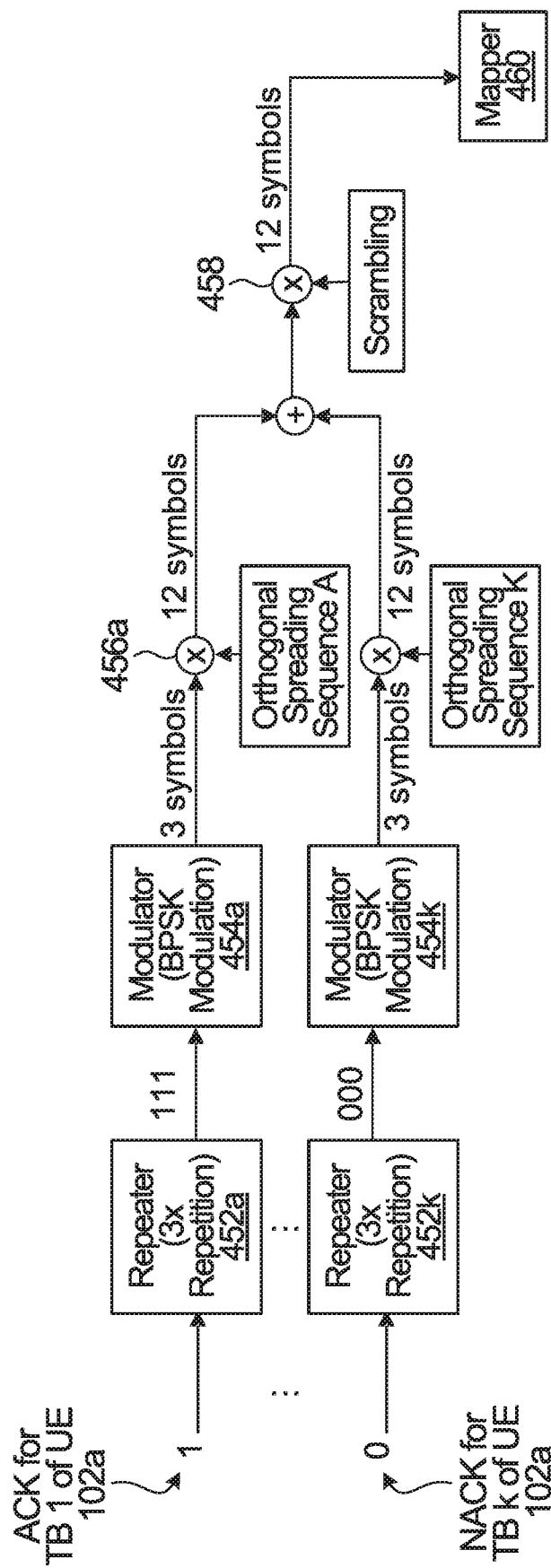

Rather than using the main and complementary PHICH channels described above in relation to FIGS. 10 to 14, instead the ACK/NACK feedback may be sent using the legacy PHICH format, like that shown in FIG. 6. In any given subframe, every transmitted TB from the UE uses the legacy PHICH format. An example is shown in FIG. 15, which is an embodiment of a system for generating and sending multiple ACK/NACKs for multiple uplink transmissions from the same UE in the same subframe. In FIG. 15, UE 102a sends k TBs in a subframe. Either an ACK or a NACK is sent as feedback for each TB. In the example shown in FIG. 15, an ACK is sent for TB 1 and a NACK is sent for TB k. The same repetition, modulating, spreading, scrambling, and mapping is performed as that described earlier in relation to FIG. 6. Although not shown in FIG. 15, the same structure is used for the ACK/NACKs of other TBs of other UEs sent in the same uplink subframe. In an alternative embodiment, the ACK for TB 1, . . . , NACK for TB k are not mapped to the same legacy PHICH group as shown in FIG. 15. Each could be mapped to a different legacy PHICH group instead, e.g., depending on starting RB indices.

UE 102a knows the downlink subframe in which to find the ACK/NACK feedback for each TB based on a preconfigured timing relationship. For example, for grant-based embodiments, the location of the downlink acknowledgement channel in which to find the ACK/NACK feedback may be based on the timing of the original grant for the uplink transmissions, e.g. if the grant to send a TB is received in downlink subframe w, then ACK/NACK feedback for the granted uplink transmission of the TB will be at downlink subframe w+x. As another example, for grant-free embodiments, the location of the downlink acknowledgement channel in which to find the ACK/NACK feedback may be based on the grant-free resource access timing, e.g, if a UE sends a grant-free uplink transmission for a TB in subframe w, then the ACK/NACK for the TB is sent in subframe w+n. UE 102a knows which REGs to find its ACK/NACK for a TB based on the uplink resources used by UE 102a to send the TB, e.g. based on the starting RB index of the TB. UE 102a knows which spreading sequence to use to decode the ACK/NACK based on the reference signal sequence used by UE 102a to send the TB.

If the starting RB indices of two TBs from different UEs or the same UEs are mapped to the same REGs, then orthogonal reference signal sequences are used.

For grant-based embodiments, the starting RB index of the TB and the reference signal sequence are granted by the base station, e.g. in DCI.

A possible benefit of the FIG. 15 embodiment compared to the embodiments of FIGS. 10 to 14 is that in the FIG. 15 embodiment the legacy PHICH reliability is maintained. A possible downfall of the FIG. 15 embodiment is that there is more control signal overhead because a set of 12 symbols is being mapped to the control channel and sent for each TB sent by each UE in the corresponding uplink subframe. The embodiment of FIG. 15 may not be scalable for large numbers of UEs sending large numbers of TBs per UE in the same uplink subframe.

C. Hybrid Design

Two designs are described above: (1) sending an ACK/NACK codeword on a main and complimentary channel, which is described in relation to FIGS. 10 to 14 and will be called "Design I"; (2) sending ACK/NACK feedback using the legacy PHICH format, which is described in relation to FIG. 15 and will be called "Design II".

Design II supports the simultaneous transmission, combining, and feedback indication of multiple TBs at the same reliability level intended for the legacy PHICH design in LTE at the expense of increased control signaling overhead. Design I supports the simultaneous transmission, combining, and feedback indication of multiple TBs with less signaling overhead/increased PHICH capacity, but employs a complementary augmented PHICH channel to overcome the potential reliability loss in detecting the main augmented PHICH channel.

In order to try to strike an efficient tradeoff between the PHICH reliability and overhead, a hybrid design can be employed in which Design II is the default up to a preset maximum number of simultaneous TBs supported per UE e.g., L≤2; then Design I is used beyond that operating point.

When to switch from Design II to Design I may depend on one, or some of the following factors, which is a non-exhaustive list: RLC packet arrival rate; preconfigured grant-free resources per subframe less the DMRS REs; MCS configuration/link adaptation; RLC packet size and whether fragmentation is required.

D. Preconfigured Mapping Rules

In some embodiments, the UEs may know where to locate their ACK/NACK feedback in the downlink acknowledgment channel based on other information, e.g. the UE ID (or group ID) and/or the HARQ process ID for a TB. For example, instead of using the starting RB indices and/or DMRS sequences, mapping of HARQ process IDs to PHICH resources can be preconfigured. Different HARQ processes of a UE may be mapped to the same or different PHICH group, and/or the mapping may be UE-specific or UE-group specific and may be obtained from system information.

UEs operating in grant-free mode may know how many PHICH groups there will be from system information for a given cell. For example, assume that there are $N_{PHICH}^{group}$ PHICH groups, and that each PHICH group can support up to K TBs. Further assume that there are M registered UEs operating in grant-free mode, and that each of the M UEs can support up to j HARQ processes. A mapping rule may then be set up, e.g. possibly via a look up table, in which a UE can determine the location of ACK/NACK feedback based on its UE ID and/or HARQ process ID. More generally, the mapping rule may be a function of $N_{PHICH}^{group}$, K, M, and/or J, e.g. $f(N_{PHICH}^{group}, K, M, J)$.

Figure 16:
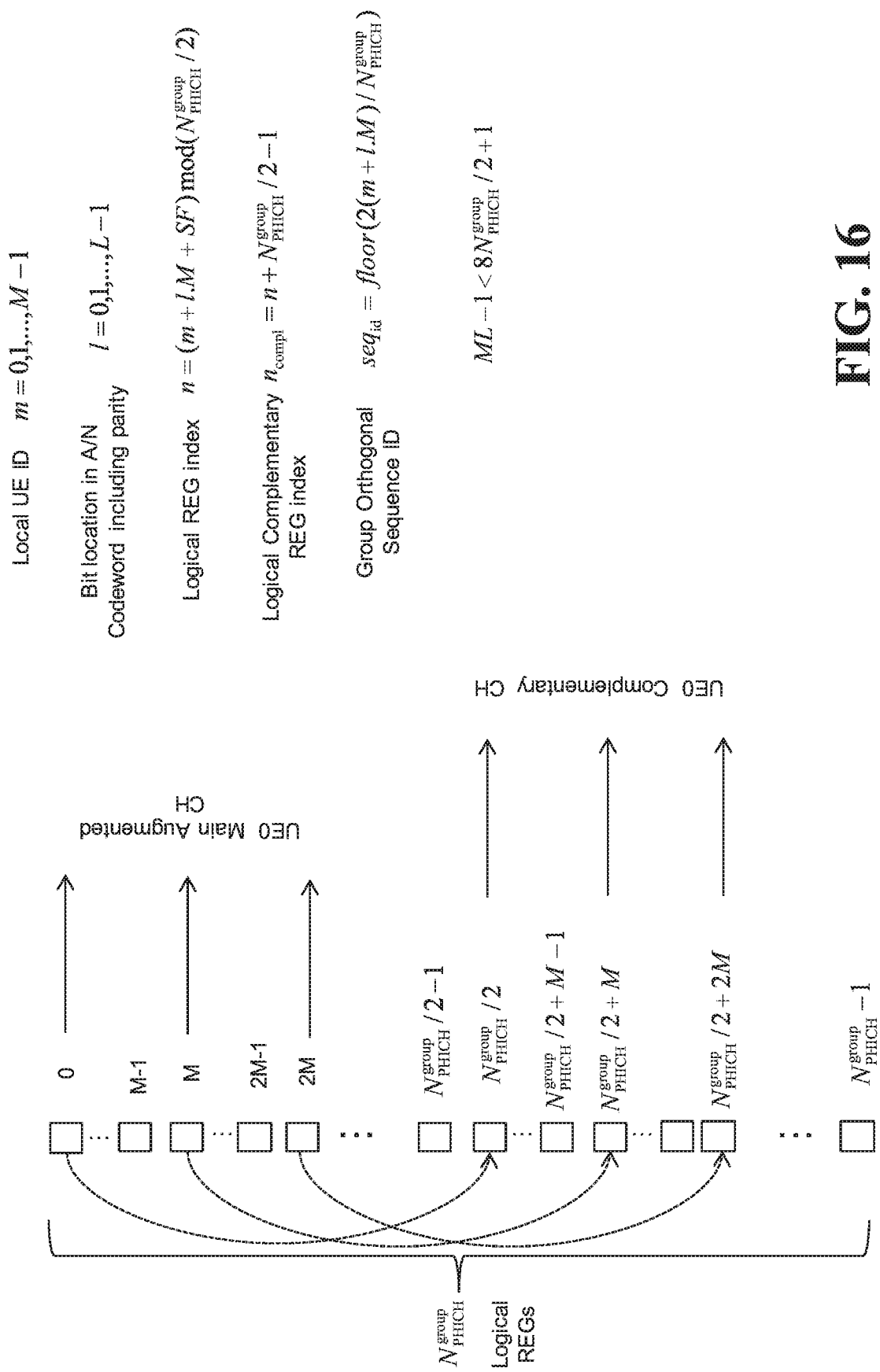
FIGS. 16 and 17 illustrate examples of a resource mapping functions.
Figure 17:
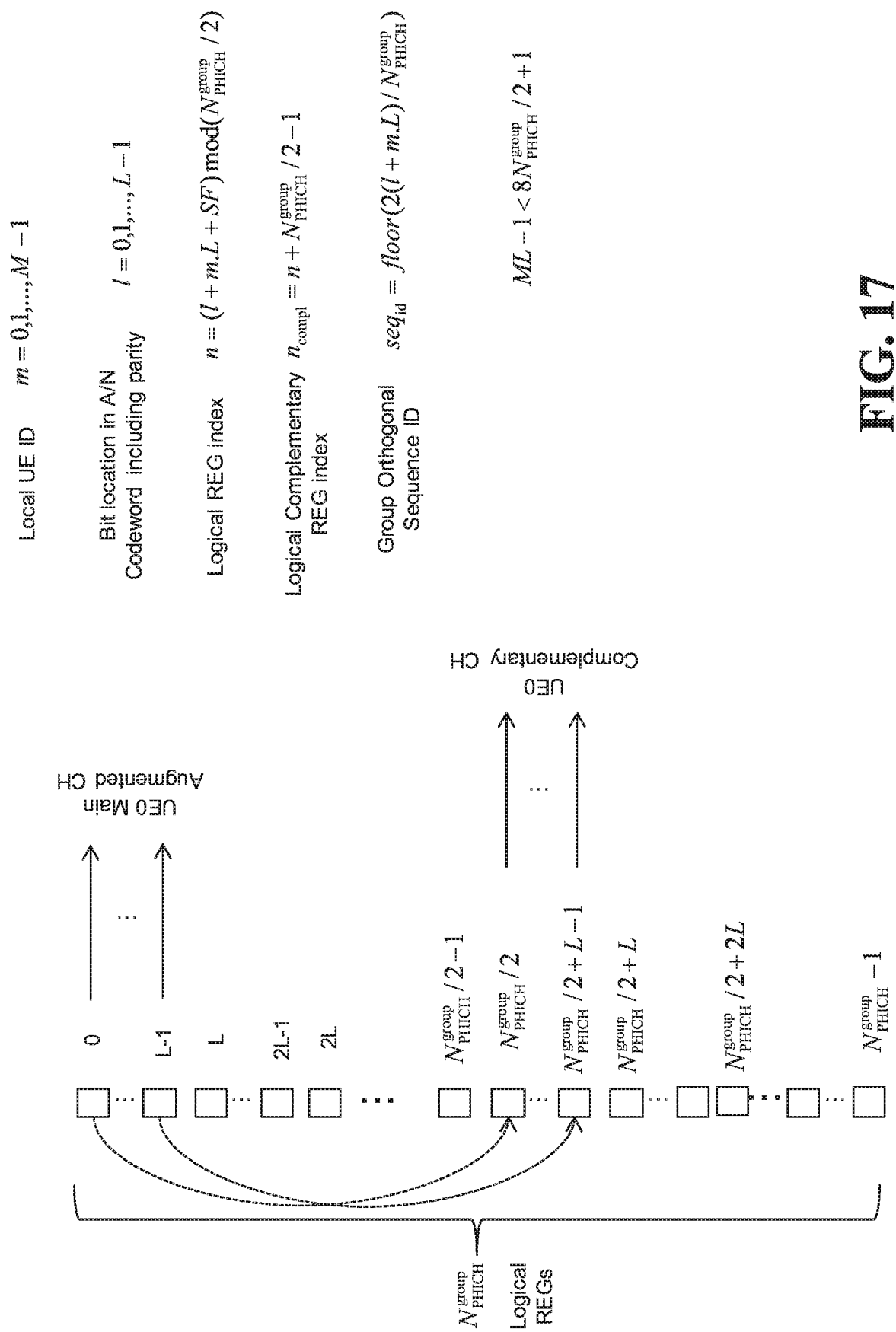

Two examples of a resource mapping function, e.g. a PHICH resource mapping function, are respectively illustrated in FIGS. 16 and 17. The mapping functions in FIGS. 16 and 17 may be used for preconfigured mapping or for dynamic mapping at both the UE and the base station. Starting RBs are not factored into the mapping examples. The examples of FIGS. 16 and 17 use a main and augmented acknowledgement channel and an ACK/NACK codeword, e.g. as described above in relation to FIGS. 13 and 14.

The first example is shown in FIG. 16. Each of the M UEs has a local ID m=0, 1, . . . , M−1. The value l=0, 1, . . . , L−1 represents the bit location in an ACK/NACK codeword of L bits. The ACK/NACK codeword may include one or more parity bits. The logical REG index n is determined by: $n=(m+l\times M+SF) \bmod (N_{PHICH}^{group}/2)$, where m, l, and M are defined above, SF is the uplink subframe index, and $N_{PHICH}^{group}$ is the number of PHICH groups. The logical complementary REG index is $n_{compt}=n+N_{PHICH}^{group}/2-1$. The group orthogonal sequence ID, i.e. the index of the orthogonal spreading sequence used with bit l of the ACK/NACK codeword for user m, is $$seq_{id} = \text{floor}\left(\frac{2(m+l\times M)}{N_{PHICH}^{group}}\right).$$

Note that $seq_{id}=0, 1, 2, \ldots, 7$ assuming eight indications can be multiplexed per REG (one PHICH group in that case). Also note that the total capacity (in terms of M and L) of the PHICH resources under such a mapping function is subject to the constraint $$M \times L - 1 < \frac{8 N_{PHICH}^{group}}{2} + 1.$$

The second example is shown in FIG. 17. Again, each of the M UEs has a local ID m=0, 1, . . . , M−1. The value l=0, 1, . . . , L−1 represents the bit location in an ACK/NACK codeword of L bits. The ACK/NACK codeword may include one or more parity bits. The logical REG index n is determined by: $n=(l+m\times L+SF) \bmod (N_{PHICH}^{group}/2)$, where m, l, and L are defined above, SF is the uplink subframe index, and $N_{PHICH}^{group}$ is the number of PHICH groups. The logical complementary REG index is $n_{compt}=n+N_{PHICH}^{group}/2-1$. The group orthogonal sequence ID is $$seq_{id} = \text{floor}\left(\frac{2(l+m\times L)}{N_{PHICH}^{group}}\right).$$

Note that the total capacity (in terms of M and L) of the PHICH resources under such a mapping function is subject to the constraint $$M \times L - 1 < \frac{8 N_{PHICH}^{group}}{2} + 1.$$

In the examples of FIGS. 16 and 17, to exploit frequency diversity, dynamic rotation can be added to the mapping functions using the subframe index SF. Note that SF can be set to zero if locations of mapping resources are meant to be static for the given set of arguments, i.e., dynamic rotation is not desired. In other examples, complementary channel REGs can be located in an interleaved manner with the main channel REGs.

In a cell or hypercell, PHICH resources may be preconfigured for grant-free uplink transmissions, and ACK/NACK feedback for both grant-free and grant-based transmissions may or may not occur in the same PHICH group. A PHICH transmission carrying ACK/NACK feedback based on an initial grant-free uplink transmission may occur in resources having the same or different numerology as the grant-free uplink transmission, e.g. different subcarrier spacing (SCS) and/or different CP type.

When multiple HARQ processes are supported for a UE, the mapping of HARQ process IDs to PHICH groups may be pre-configured. For example, a UE may use the same reference signal for different HARQ processes IDs, which are transmitted over non-overlapping resources. Different HARQ processes of a UE may map to different PHICH groups, which may result in simpler detection if the same orthogonal sequence is used per UE. A rule can be used as f( ) of PHICH group index and UE HARQ process ID (e.g. modulo operation on inputs) to let the UE know where to find the ACK/NACK for the corresponding HARQ process ID. The rule may be configured semi-statically. In some embodiments, the rule may be initially set based on the reference signal sequence and/or RB indices that will be used by the UEs.

In some embodiments, the PHICH group may be mapped to a group ID assigned to a group of UEs. In some embodiments, the PHICH group may be mapped to a hopping pattern, e.g. for UEs in a group who all observe the same cyclic shift or hopping in subsequent subframes. The group of UEs may or may not transmit over the same time-frequency resources.

ACK/NACK Feedback for Simultaneous Uplink Transmission Using DCI

In some embodiments, the ACK/NACK feedback may not be sent in a dedicated downlink acknowledgement channel, such as a PHICH channel. Instead, the ACK/NACK feedback may be provided in DCI, e.g. a DCI 0 message. A message sent in DCI format may be unicast DCI or group common DCI.

A new DCI format may be used to carry multiple ACK/NACK indications for multiple transmissions in a given uplink subframe. The new DCI may be transmitted over the downlink control channel (e.g. the physical downlink control channel (PDCCH)) and may be mapped to one or more control channel elements (CCEs).

One possible key benefit of using a new unicast DCI is that it can be sent only if there is at least one successfully decoded TB in the respective uplink subframe. All-NACK codewords and single-TB NACKs may not be transmitted to a UE that is configured for NACK-less retransmissions.

In some embodiments, the DCI may be unicast to individual UEs and sent in a UE specific search space. The CCEs occupied in the downlink control channel may be selected based on the dynamic UE-specific search space at the DCI transmission subframe. CCEs occupied by different UEs may overlap in frequency domain at a given subframe based on the UE's ID (e.g. cell radio network temporary identifier (C-RNTI)), CCE aggregation levels, subframe index, and/or downlink bandwidth.

In some embodiments, the DCI may be sent in a common search space. The common search space may be configured through RRC signaling and may be common to all UEs. The DCI sent in the common search space may be unicast DCI for individual UEs. Alternatively, the DCI sent in the common search space may be group common DCI, e.g. a multicast message addressing a group of UEs using a group ID, such as a group RNTI. In some embodiments, the DCI carrying the ACK/NACK feedback may be sent in the common search space in case the UE-specific search space is already occupied by other control DCI signals.

If the ACK/NACK feedback is sent in DCI, then in one embodiment an ACK may be implicitly sent by using a DCI message (e.g. a grant) that indicates the HARQ process ID and also a void combination of MCS and assigned RBs which disables the TB. The disabling of the TB is interpreted by the UE as an ACK. In some embodiments, the TB may still be maintained in the UE's HARQ transmit buffer for potential granted retransmission.

In some embodiments, setting, e.g. toggling, the associated NDI flag in a synchronous uplink grant in DCI clears the HARQ transmit buffer for the corresponding TB. The UE will then have to utilize the grant for transmitting a new TB unless the new TB is disabled by the void combination of MCS and assigned RBs.

In some embodiments, detecting an ACK in DCI for a given TB results in terminating further retransmissions/repetitions of that TB. In some embodiments, explicit HARQ IDs of respective TBs may not need to be indicated in the new DCI format, e.g. if the DCI message delay is fixed from the end of the uplink transmissions being ACK'd/NACK'd. In some embodiments, the new DCI format at least contains the following: an ACK/NACK codeword of L bits (e.g. as discussed earlier in relation to FIGS. 10 to 14) for the respective uplink subframe, where L=1 is the fallback position of a single ACK/NACK bit rather than a codeword; and an identity of the UE. In some embodiments, the identity of the UE may be an implicit indication (e.g. of RNTI) through CRC calculation.

Group Common DCI

As mentioned above, a group common DCI format may be used in some embodiments. For example, a multicast message may be sent in DCI that addresses a group of UEs using a group ID, such as a group RNTI. The message carriers ACK/NACK indications for the group of UEs.

Figure 18:
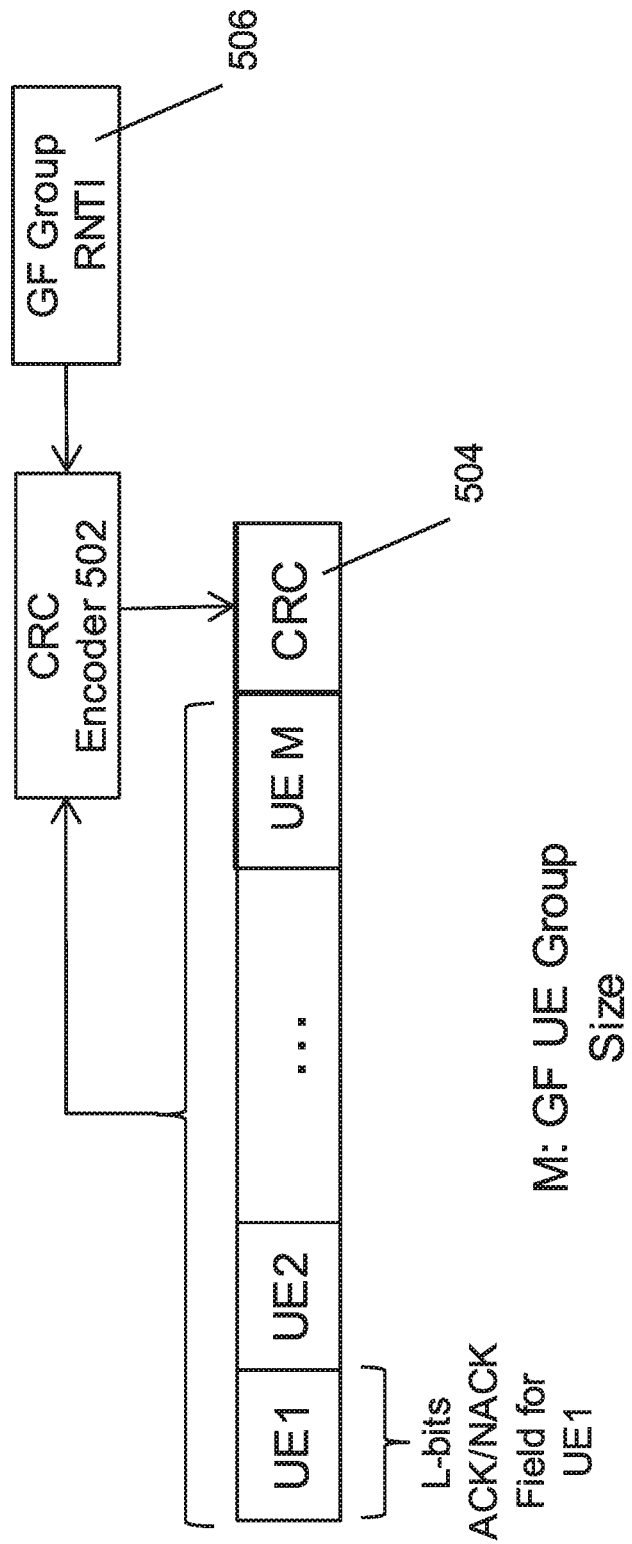
FIG. 18 illustrates an embodiment of a group common DCI is a message.

In some embodiments, the group common DCI is a message addressing a group of M UEs using a group RNTI and comprising M ACK/NACK fields of L bits each, as well as a CRC field encoded using the group RNTI. M may be a subset of the total number of UEs on the uplink resources, e.g. N UEs may be divided into different groups, and one of the groups may have M<N UEs. One example of a group common DCI message is illustrated in FIG. 18. A CRC encoder 502 in the base station 100 (e.g. part of the encoder 212) encodes the CRC 504 with the group RNTI 506. The group RNTI 506 may be called a "grant-free (GF) group RNTI" or "GF RNTI" if the UEs are operating in grant-free mode. The encoding may comprise masking the CRC 504 with the group RNTI 506, e.g. by scrambling the CRC 504 using the group RNTI 506. Each UE in the group would then unmask the CRC 504 using the group RNTI 506 when decoding the DCI. This implies that in the special case wherein M=1, the GF RNTI is UE-specific and the base station would be able to identify the grant-free UE from its data transmission if the grant-free UE indicates this GF RNTI in the data transmission or uses it to mask the data CRC similar to the respective group common DCIs at the base station.

In some embodiments, one GF RNTI may be used to let the GF UEs identify the common downlink control channel message. Alternatively, there could be one or multiple common downlink control channel messages targeting GF UEs in a cell. Common downlink control channel messages may be localized or distributed over cell bandwidth.

In some embodiments, a message is transmitted over the downlink control channel in a common search space by mapping to one or more CCEs based on its size. The common search space is configured through RRC signaling and is common to all UEs.

In some embodiments, all group UEs have to be addressed in a group common DCI to keep the size of the DCI message as expected by the group UEs. In such a case, all-NACKs codewords are still transmitted to some group UEs whenever the base station needs to send an ACK or more to some other group UEs.

There are different ways in which UEs may be grouped for sending an ACK/NACK in group common DCI. The following is a non-exhaustive list, and in some embodiments two or more criteria below may be combined:
  UEs configured with the same maximum number of supported simultaneous TBs per subframe, L; and/or
  UEs configured with the same maximum number of grant-free repetitions, k; and/or
  UEs configured with the same k and L; and/or
  UEs configured to apply the same grant-free hopping pattern; and/or
  UEs configured to transmit with same MCS; and/or
  UEs that share same the time-frequency region for a transmission in a slot. For example, there may be Q partitions and Q group common messages. Based on pre-configured resource mapping set via semi-static configuration and ACK/NACK timing relationship, the UE and network know which common PDCCH to check/use for which transmission. For example, if there are Q=5 partitions configured for grant-free resources and a UE transmits in a first partition in slot #n and it expects ACK/NACK feedback in slot #n+j, where j≥1 is a positive integer, then in slot #n+j, the UE will check for group common PDCCH sent for the first partition. This method does not depend on how many HARQ processes are supported by the UE. If a UE transmits multiple TBs in different partitions, it checks the corresponding group common PDCCH.

If the transmission/system/carrier bandwidth (BW) is large, there can be multiple group common messages sent by the network. In one embodiment, the whole grant-free resources in frequency can be partitioned into I sub-bands or BW partitions. Note that here sub-band or BW partition identified can be same or larger than the grant-free resource partition used by a UE for a transmission. For each frequency sub-band (where the sub-bands/BW partitions can be of same size or different, same numerology or different), one group common PDCCH message can be sent. The grant-free UEs who transmit in sub-band i ∈I, will monitor the group common message targeted for sub-band i. In one embodiment, multiple group common PDCCHs are sent containing same information. This can be useful when UE BW is not large and if only one group common message is sent in a configured region, either collocated or distributed, and it could be outside UE BW. Note that the UE grouping rule discussed above can still apply if there are multiple group common PDCCH messages sent. One UE can monitor multiple group common PDCCH. This can be useful when one TB is transmitted in one sub-band/BW partition and another TB is sent in another non-overlapping sub-band/BW partition.

In one embodiment, if there are multiple group common PDCCH resource sets that are configured, RRC signaling can inform the UE which group common PDCCH(s) to monitor.

Methods

FIG. 19 is a flowchart of a method performed by base station 100, according to one embodiment. In step 802, the base station 100 receives a plurality of uplink transmissions from a UE in the same uplink subframe. The uplink transmissions comprise a first uplink transmission and a second uplink transmission. The first uplink transmission carries first data corresponding to a first transport block of a first HARQ process. The second uplink transmission carries second data corresponding to a second transport block of a second HARQ process. In step 804, the base station 100 attempts to decode the first transport block and generates first feedback representing an ACK or NACK. In step 806, the base station 100 attempts to decode the second transport block and generates second feedback representing another ACK or NACK. Steps 804 and 806 may be performed in parallel or in any order. In step 808, the base station transmits both the first feedback and the second feedback in a downlink acknowledgement channel.

FIG. 20 is a flowchart of a method performed by a UE 102a, according to one embodiment. In step 852, the UE 102a transmits a plurality of uplink transmissions to a base station in the same uplink subframe. The plurality of uplink transmissions comprises a first uplink transmission and a second uplink transmission. The first uplink transmission carries first data corresponding to a first transport block of a first HARQ process. The second uplink transmission carries second data corresponding to a second transport block of a second HARQ process. In step 854, the UE 102a decodes first feedback and second feedback in a downlink acknowledgement channel. The first feedback represents an ACK or NACK for the first transport block. The second feedback represents another ACK or NACK for the second transport block.

EXAMPLES

In view of, and in addition to the above, the following examples are disclosed.

Example 1

A method performed by a base station comprising: receiving a plurality of uplink transmissions from a user equipment (UE) in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding the first transport block and generating a first feedback representing an ACK or NACK; decoding the second transport block and generating a second feedback representing another ACK or NACK; transmitting both the first feedback and the second feedback in a downlink acknowledgement channel.

Example 2

The method of example 1, wherein the first feedback and the second feedback are both in a same ACK/NACK codeword.

Example 3

The method of example 2, wherein the first feedback is one bit of the ACK/NACK codeword and the second feedback is another bit of the ACK/NACK codeword.

Example 4

The method of any one of examples 2 to 3, further comprising generating a complement of the ACK/NACK codeword, and transmitting both the ACK/NACK codeword and the complement of the ACK/NACK codeword in the downlink acknowledgement channel.

Example 5

The method of example 4, wherein symbols corresponding to the ACK/NACK codeword and other symbols corresponding to the complement of the ACK/NACK codeword are both spread using a same spreading sequence, and spread symbols of the ACK/NACK codeword are mapped to resource elements different from spread symbols of the complement of the ACK/NACK codeword.

Example 6

The method of example 4, wherein symbols corresponding to the ACK/NACK codeword and other symbols corresponding to the complement of the ACK/NACK codeword are spread using different spreading sequences, and spread symbols of the ACK/NACK codeword are mapped to at least some of the same resource elements as spread symbols of the complement of the ACK/NACK codeword.

Example 7

The method of example 4, wherein the ACK/NACK codeword includes at least one parity bit.

Example 8

The method of any one of examples 1 to 7 wherein the first uplink transmission includes a first reference signal sequence and the second uplink transmission includes a second reference signal sequence, and the base station distinguishes the first HARQ process from the second HARQ process based on the reference signal sequence.

Example 9

The method of example 1, wherein the first feedback comprises a first bit and the second feedback comprises a second bit, and the method further comprises: repeating the first bit to obtain a first plurality of bits, modulating the first plurality of bits to obtain a first plurality of symbols, spreading the first plurality of symbols using a first spreading sequence to obtain a first set of spread symbols, and mapping the first set of spread symbols to a first set of resource elements; repeating the second bit to obtain a second plurality of bits, modulating the second plurality of bits to obtain a second plurality of symbols, spreading the second plurality of symbols using a second spreading sequence to obtain a second set of spread symbols, and mapping the second set of spread symbols to a second set of resource elements; wherein the first spreading sequence is orthogonal to the second spreading sequence.

Example 10

The method of example 9, wherein the first set of resource elements at least partially overlap with the second set of resource elements.

Example 11

A base station comprising: a processor; and a computer readable storage medium storing programming for execution by the processor, the programming including instructions to perform steps in accordance with a method in any one of examples 1 to 10.

Example 12

A base station comprising: a receiver to receive a plurality of uplink transmissions from a user equipment (UE) in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; an uplink message processor to decode the first transport block and generate first feedback representing an ACK or NACK, and to decode the second transport block and generate second feedback representing another ACK or NACK; a transmitter to transmit both the first feedback and the second feedback in a downlink acknowledgement channel.

Example 13

A method performed by a user equipment (UE) comprising: transmitting a plurality of uplink transmissions to a base station in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding first feedback and second feedback in a downlink acknowledgement channel, the first feedback representing an ACK or NACK for the first transport block, and the second feedback representing another ACK or NACK for the second transport block.

Example 14

The method of example 13, wherein the first uplink transmission includes a reference signal sequence that is different from the reference signal sequence used in the second uplink transmission.

Example 15

The method of example 13 or example 14, wherein the first feedback and the second feedback are both in a same ACK/NACK codeword.

Example 16

The method of example 15, wherein one bit of the ACK/NACK codeword represents the ACK or NACK for the first transport block, and wherein another bit of the ACK/NACK codeword represents the other ACK or NACK for the second transport block.

Example 17

The method of example 15 or example 16, further comprising also decoding a complement of the ACK/NACK codeword, and using the ACK/NACK codeword and the complement of the ACK/NACK codeword to determine whether the ACK/NACK codeword may be corrupted.

Example 18

The method of example 17, wherein the ACK/NACK codeword and the complement of the ACK/NACK codeword both include at least one parity bit.

Example 19

The method of example 17 or example 18, further comprising using a resource block index of the first uplink transmission and/or a resource block index of the second uplink transmission to locate the ACK/NACK codeword in the downlink acknowledgement channel.

Example 20

The method of example 17 or example 18, further comprising: using a resource block index of the first uplink transmission to locate resource elements in the downlink acknowledgement channel carrying the first feedback in the ACK/NACK codeword; using a resource block index of the second uplink transmission to locate resource elements in the downlink acknowledgement channel carrying the second feedback in the ACK/NACK codeword.

Example 21

The method of example 13, further comprising: using a resource block index of the first uplink transmission to locate resource elements in the downlink acknowledgement channel carrying the first feedback; using another resource block index of the second uplink transmission to locate resource elements in the downlink acknowledgement channel carrying the second feedback.

Example 22

A user equipment (UE) comprising: a processor; and a computer readable storage medium storing programming for execution by the processor, the programming including instructions to perform steps in accordance with a method in any one of examples 13 to 21.

Example 23

A user equipment (UE) comprising: a transmitter to transmit a plurality of uplink transmissions to a base station in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; a decoder to decode first feedback and second feedback in a downlink acknowledgement channel, the first feedback representing an ACK or NACK for the first transport block, and the second feedback representing another ACK or NACK for the second transport block.

Example 24

A method performed by a base station, the method comprising: receiving a plurality of uplink transmissions from a user equipment (UE) in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding the first transport block and generating first feedback representing an ACK or a NACK, the first feedback corresponding to the first transport block; decoding the second transport block and generating second feedback representing another ACK or NACK, the second feedback corresponding to the second transport block; transmitting both the first feedback and the second feedback in a downlink acknowledgement channel.

Example 25

The method of example 24, further comprising: identifying the UE from at least one of the first uplink transmission and the second uplink transmission; identifying the first HARQ process based on a first reference signal sequence in the first uplink transmission; identifying the second HARQ process based on a second reference signal sequence in the second uplink transmission.

Example 26

The method of example 25, wherein identifying the UE comprises identifying a radio network temporary identifier (RNTI) corresponding to the UE.

Example 27

The method of any one of examples 24 to 26, wherein the first feedback and the second feedback are both in a same ACK/NACK codeword.

Example 28

The method of example 27, wherein the first feedback is one bit of the ACK/NACK codeword and the second feedback is another bit of the ACK/NACK codeword.

Example 29

The method of example 27, further comprising generating a complement of the ACK/NACK codeword, and transmitting both the ACK/NACK codeword and the complement of the ACK/NACK codeword in the downlink acknowledgement channel.

Example 30

The method of example 29, wherein symbols corresponding to the ACK/NACK codeword and other symbols corresponding to the complement of the ACK/NACK codeword are both spread using a same spreading sequence, and spread symbols of the ACK/NACK codeword are mapped to resource elements different from spread symbols of the complement of the ACK/NACK codeword.

Example 31

The method of example 29, wherein symbols corresponding to the ACK/NACK codeword and other symbols corresponding to the complement of the ACK/NACK codeword are spread using different spreading sequences, and spread symbols of the ACK/NACK codeword are mapped to at least some of the same resource elements as spread symbols of the complement of the ACK/NACK codeword.

Example 32

The method of example 29, wherein the ACK/NACK codeword includes at least one parity bit.

Example 33

The method of any one of examples 24 to 32, wherein the first uplink transmission includes a first reference signal sequence and the second uplink transmission includes a second reference signal sequence, and the base station distinguishes the first HARQ process from the second HARQ process based on a difference between the first reference signal sequence and the second reference signal sequence.

Example 34

The method of example 33, wherein the first reference signal sequence is assigned to the UE by the base station on a static or semi-static basis.

Example 35

The method of example 34, further comprising the base station assigning the first reference signal sequence to the UE using higher layer signaling.

Example 36

The method of example 35, wherein the higher layer signaling is radio resource control (RRC) signaling.

Example 37

The method of any one of examples 24 to 36, wherein the first uplink transmission is a grant-free uplink transmission that includes a reference signal sequence, and wherein the reference signal sequence uniquely identifies both the UE and a HARQ process ID that corresponds to the first HARQ process.

Example 38

The method of example 24, wherein the first feedback comprises a first bit and the second feedback comprises a second bit, and the method further comprises: repeating the first bit to obtain a first plurality of bits, modulating the first plurality of bits to obtain a first plurality of symbols, spreading the first plurality of symbols using a first spreading sequence to obtain a first set of spread symbols, and mapping the first set of spread symbols to a first set of resource elements; repeating the second bit to obtain a second plurality of bits, modulating the second plurality of bits to obtain a second plurality of symbols, spreading the second plurality of symbols using a second spreading sequence to obtain a second set of spread symbols, and mapping the second set of spread symbols to a second set of resource elements; wherein the first spreading sequence is orthogonal to the second spreading sequence.

Example 39

The method of example 38, wherein the first set of resource elements at least partially overlap with the second set of resource elements.

Example 40

The method of any one of examples 24 to 39 further comprising: transmitting a grant in downlink control information, the grant granting an uplink retransmission corresponding to the first transport block, the uplink retransmission to occur in an uplink subframe subsequent to the one in which decoding of the first transport block failed.

Example 41

The method of example 40, wherein a HARQ process ID identifying the first HARQ process is indicated in the grant.

Example 42

The method of example 41, wherein the HARQ process ID is explicitly indicated in the grant.

Example 43

The method of example 41, wherein the HARQ process ID is implicitly indicated in the grant by indicating both: (i) the subframe in which the decoding of the first transport block failed, and (ii) a frequency-domain order or index of a resource block occupied by the first transport block in the subframe in which the decoding of the first transport block failed.

Example 44

The method of any one of examples 24 to 43, wherein the first uplink transmission indicates to the base station that the first transport block is a new transport block, and the base station determines a HARQ process ID corresponding to the new transport block using a same rule as that used by the UE to determine the HARQ process ID.

Example 45

The method of example 44, wherein the first uplink transmission includes a reference signal sequence that indicates to the base station that the first transport block is the new transport block.

Example 46

The method of example 44, wherein the HARQ process ID is $ID_{i+1}$, and wherein the base station determines the HARQ process ID according to the following formula: $ID_{i+1}=(ID_i+1) \bmod N_{HARQ}$, wherein $ID_i$ is the HARQ process ID used for a previous TB from the UE, "mod" is the modulo operation, and $N_{HARQ}$ is a total number of HARQ process IDs available.

Example 47

The method of any one of examples 24 to 43, wherein the first uplink transmission is a retransmission of the first transport block, and wherein decoding the first transport block comprises combining the retransmission with at least one earlier revision of the first transport block.

Example 48

The method of example 47, wherein a reference signal sequence in the first uplink transmission is used by the base station to determine that the first uplink transmission is the retransmission of the first transport block.

Example 49

The method of example 48, wherein the reference signal sequence is the same as a previous reference signal sequence used by the UE in a previous transmission.

Example 50

The method of example 47, further comprising associating the retransmission with a HARQ process ID that corresponds to the at least one earlier revision of the first transport block.

Example 51

The method of any one of examples 24 to 50, wherein the base station keeps track of a mapping between (i) actively ongoing HARQ processes of the UE, and (ii) used uplink channel parameters for the ongoing HARQ processes.

Example 52

The method of example 51, wherein the used uplink channel parameters comprise starting resource block (RB) indices and demodulation reference signal (DMRS) cyclic shifts, for a number of subframes greater than or equal to ACK/NACK feedback delay.

Example 53

The method of any one of examples 24 to 43, wherein the first uplink transmission is a grant-free uplink transmission, wherein the first feedback represents a NACK, wherein after the first feedback is transmitted a grant-free uplink retransmission corresponding to the first transport block is received, and wherein the first uplink transmission and retransmission are received on a resource allocation pattern known in advance to the base station and the UE.

Example 54

The method of example 53, wherein the first uplink transmission is an initial transmission of the first transport block, and wherein a starting resource block (RB) index of the first uplink transmission identifies the resource allocation pattern.

Example 55

The method of example 53, wherein the resource allocation pattern partially overlaps in time-frequency resources with another resource allocation pattern.

Example 56

The method of example 53, wherein the resource allocation pattern is selected by the UE and is different from any other resource allocation pattern being used by the UE.

Example 57

The method of example 56, wherein when the UE has more than one ongoing HARQ process, then the UE selects different resource allocation patterns, for each process, that do not overlap in time-frequency resources.

Example 58

The method of example 53, wherein the resource allocation pattern uniquely identifies the first HARQ process to the base station.

Example 59

The method of any one of examples 24 to 58, wherein the first uplink transmission includes a reference signal sequence, and wherein the reference signal sequence uniquely identifies the UE.

Example 60

The method of example 59, wherein the base station assigns different reference signal sequences to different UEs for particular uplink resources so that there is a unique mapping between a reference signal sequence and a corresponding UE.

Example 61

The method of example 59, further comprising identifying the UE using the reference signal sequence, and identifying the first HARQ process using a resource allocation pattern on which the first uplink transmission is sent.

Example 62

The method of any one of examples 24 to 61, wherein the first HARQ process is associated with a particular hopping pattern, and the method further comprising the base station identifying the first HARQ process based on a starting resource block (RB) index of the first uplink transmission.

Example 63

The method of any one of examples 24 to 43, wherein the first uplink transmission is a retransmission of the first transport block, and the method further comprises: determining that the first uplink transmission is the retransmission based on the first uplink transmission being received on a particular resource allocation pattern; associating the retransmission with the first HARQ process; and combining retransmission data with an earlier revision of the first transport block.

Example 64

The method of any one of examples 24 to 63, further comprising assigning the UE a group of resource allocation patterns that are different from resource allocation patterns assigned to other UEs, and wherein a resource allocation pattern on which the first uplink transmission is received uniquely identifies the UE.

Example 65

The method of example 40, wherein the first HARQ process is identified in the grant using a local index that indicates the first HARQ process within a sorted list of active HARQ processes.

Example 66

The method of any one of examples 24 to 65, wherein the first uplink transmission and the second uplink transmission are both grant-free uplink transmissions.

Example 67

The method of example 66, wherein the downlink acknowledgement channel comprises a physical HARQ indicator channel (PHICH).

Example 68

The method of example 66, wherein timing of the first feedback has a predetermined relationship with a time at which the first uplink transmission was sent.

Example 69

The method of example 66, wherein there is a known mapping between a reference signal sequence used by the UE to send the first uplink transmission and an orthogonal spreading sequence used by the base station to send the first feedback.

Example 70

The method of example 66, wherein there is a known mapping between a starting resource block (RB) index of the first uplink transmission and a location of one or more resource element groups (REGs) in the downlink acknowledgement channel carrying the first feedback.

Example 71

The method of any one of examples 24 to 70, wherein the first uplink transmission uses a first reference signal sequence and the second uplink transmission uses a second reference signal sequence that is different from the first reference signal sequence, wherein the first uplink transmission and the second uplink transmission are both sent in uplink subframe w, and wherein the first feedback and the second feedback are both sent in subframe w+n.

Example 72

The method of example 71, wherein a starting resource block (RB) index of the first uplink transmission maps to a particular resource element group in the downlink acknowledgement channel.

Example 73

The method of example 71, wherein the first reference signal sequence maps to a respective orthogonal spreading sequence used by the base station to spread the first feedback.

Example 74

The method of example 27, wherein the ACK/NACK codeword is L bits and L=K+P, where K is a maximum number of supported simultaneously transmitted TBs per UE per subframe, and P is a number of parity bits added to the ACK/NACK codeword.

Example 75

The method of example 74, wherein L is an integer multiple of three.

Example 76

The method of example 40, wherein the grant includes a starting resource block (RB) index of the uplink retransmission and a reference signal sequence to be used in the retransmission.

Example 77

The method of example 29, further comprising applying scrambling to the addition of the ACK/NACK codeword and the complement of the ACK/NACK codeword.

Example 78

The method of example 77, wherein the scrambling is cell-specific.

Example 79

The method of example 31, wherein the spreading sequences to use for the UE are set by the base station, and wherein mapping of the first feedback and the second feedback to resource elements is set by the base station based on system information and information on starting resource block (RB) indices for the first uplink transmission and the second uplink transmission.

Example 80

The method of example 24, wherein the first feedback and the second feedback are transmitted in one or more physical HARQ indicator channel (PHICH) groups, and wherein a total number of PHICH groups $N_{PHICH}^{group}$ supported for frequency division duplex (FDD) is:

$$N_{PHICH}^{group} = \begin{cases} 2 \cdot \lceil 3N_g(N_{RB}^{DL}/16) \rceil & \text{for normal cyclic prefix} \\ 2 \cdot \lceil 3N_g(N_{RB}^{DL}/8) \rceil & \text{for extended cyclic prefix} \end{cases}$$

where $N_g$ is a first system parameter, and NR is a second system parameter that corresponds to a number of available downlink resource blocks.

Example 81

The method of example 27, further comprising generating an all-parity codeword from the ACK/NACK codeword, and transmitting both the ACK/NACK codeword and the all-parity codeword in the downlink acknowledgement channel.

Example 82

The method of example 24, wherein the first feedback and the second feedback are transmitted on a physical HARQ indicator channel (PHICH), and wherein there is a preconfigured mapping between a process ID of the first HARQ process and PHICH resources on which the first feedback is transmitted.

Example 83

The method of example 82, wherein the first feedback and the second feedback are mapped to a same PHICH group.

Example 84

The method of example 82, wherein the first feedback and the second feedback are mapped to a different PHICH group.

Example 85

The method of example 82, wherein the preconfigured mapping is UE-specific.

Example 86

The method of example 82, wherein the preconfigured mapping is UE-group specific.

Example 87

The method of example 82, wherein the preconfigured mapping is obtained from system information.

Example 88

The method of example 24, wherein the first feedback and the second feedback are transmitted on a physical HARQ indicator channel (PHICH), and wherein the first feedback and the second feedback are transmitted in different PHICH groups.

Example 89

The method of example 88, wherein the first feedback and the second feedback are spread using a same orthogonal sequence.

Example 90

The method of example 88, wherein the UE knows where to find the ACK or NACK of the first feedback according to a rule, and wherein the rule is based on a PHICH group index and a process ID of the first HARQ process.

Example 91

The method of example 90, wherein the rule is configured semi-statically.

Example 92

The method of example 90, wherein the rule is initially set based on a reference signal sequence and/or a resource block (RB) index.

Example 93

The method of example 24, wherein the downlink acknowledgement channel is part of a downlink control information (DCI) channel.

Example 94

The method of example 93, wherein the first feedback and the second feedback are sent in a DCI 0 message.

Example 95

The method of example 93, wherein the first feedback and the second feedback are sent in unicast DCI.

Example 96

The method of example 93, wherein the first feedback and the second feedback are sent in group common DCI.

Example 97

The method of example 96, wherein the group common DCI is a multicast message addressing a group of UEs using a group ID.

Example 98

The method of example 93, wherein the first feedback and the second feedback are sent in a DCI format used to carry multiple ACK/NACK indications for multiple transmissions in a given uplink subframe.

Example 99

The method of example 98, wherein the DCI format is transmitted over a downlink control channel.

Example 100

The method of example 98, wherein the DCI format is mapped to one or more control channel elements (CCEs).

Example 101

The method of example 98, wherein the UE is configured for NACK-less retransmissions, and wherein all-NACK codewords and single-TB NACKs are not transmitted to the UE.

Example 102

The method of example 93, wherein the first feedback indicates an ACK, and the ACK is implicitly indicated by indicating in the first feedback: (i) a HARQ process ID of the first HARQ process, and (ii) a void combination of: modulation and coding scheme (MCS) and at least one assigned resource block (RB).

Example 103

The method of example 102, wherein the first feedback is sent using a grant.

Example 104

The method of example 96, wherein the group common DCI comprises a message addressing a group of M UEs using a group RNTI, and wherein the group common DCI comprises M ACK/NACK fields of L bits each, as well as a CRC field encoded using the group RNTI.

Example 105

The method of example 104, wherein M=1 such that the group of M UEs only contains the UE, and the group RNTI is specific to the UE, and the group RNTI is used by the base station to identify the UE when the base station receives an uplink transmission from the UE.

Example 106

The method of example 105, wherein the group RNTI is present in the uplink transmission from the UE or is used to mask a CRC in the uplink transmission from the UE.

Example 107

The method of example 96, wherein the group common DCI includes feedback for a plurality of UEs, and the plurality of UEs are grouped based on one or more of the following criteria: the plurality of UEs are configured with a same maximum number of supported simultaneous TBs per subframe L; and/or the plurality of UEs are configured with a same maximum number of grant-free repetitions k; and/or the plurality of UEs are configured with the same k and L; and/or the plurality of UEs are configured to apply a same grant-free hopping pattern; and/or the plurality of UEs are configured to transmit with a same modulation and coding scheme (MCS); and/or the plurality of UEs share a same time-frequency region for a transmission in a slot.

Example 108

The method of example 107, wherein based on a preconfigured resource mapping and ACK/NACK timing relationship, the base station knows which common downlink control channel to use for which transmission.

Example 109

The method of example 93, wherein the first uplink transmission is a grant-free uplink transmission received on a first partition of grant-free uplink resources, and wherein the first feedback is sent in a first group common downlink control channel that corresponds to the first partition.

Example 110

The method of example 109, wherein the second uplink transmission is a grant-free uplink transmission received on a second partition of grant-free uplink resources that is different from the first partition of grant-free uplink resources, and wherein the second feedback is sent in a second group common downlink control channel that corresponds to the second partition and that is different from the first group common downlink control channel.

Example 111

The method of example 110, wherein the first uplink transmission is received in a first bandwidth partition, and the second uplink transmission is received in a second bandwidth partition that is non-overlapping with the first bandwidth partition.

Example 112

A method performed by a base station, the method comprising: receiving a plurality of uplink transmissions from a user equipment (UE) in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding the first transport block and generating first feedback representing an ACK or a NACK, the first feedback corresponding to the first transport block; decoding the second transport block and generating second feedback representing another ACK or NACK, the second feedback corresponding to the second transport block; transmitting both the first feedback and the second feedback in downlink control information (DCI).

Example 113

The method of example 112, wherein the first feedback and the second feedback are sent in a DCI 0 message.

Example 114

The method of example 112, wherein the first feedback and the second feedback are sent in unicast DCI.

Example 115

The method of example 112, wherein the first feedback and the second feedback are sent in group common DCI.

Example 116

The method of example 115, wherein the group common DCI is a multicast message addressing a group of UEs using a group ID.

Example 117

The method of example 112, wherein the first feedback and the second feedback are sent in a DCI format used to carry multiple ACK/NACK indications for multiple transmissions in a given uplink subframe.

Example 118

The method of example 117, wherein the DCI format is transmitted over a downlink control channel.

Example 119

The method of example 117, wherein the DCI format is mapped to one or more control channel elements (CCEs).

Example 120

The method of example 117, wherein the UE is configured for NACK-less retransmissions, and wherein all-NACK codewords and single-TB NACKs are not transmitted to the UE.

Example 121

The method of example 112, wherein the first feedback indicates an ACK, and the ACK is implicitly indicated by indicating in the first feedback: (i) a HARQ process ID of the first HARQ process, and (ii) a void combination of: modulation and coding scheme (MCS) and at least one assigned resource block (RB).

Example 122

The method of example 121, wherein the first feedback is sent using a grant.

Example 123

The method of example 115, wherein the group common DCI comprises a message addressing a group of M UEs using a group RNTI, and wherein the group common DCI comprises M ACK/NACK fields of L bits each, as well as a CRC field encoded using the group RNTI.

Example 124

The method of example 123, wherein M=1 such that the group of M UEs only contains the UE, and the group RNTI is specific to the UE, and the group RNTI is used by the base station to identify the UE when the base station receives an uplink transmission from the UE.

Example 125

The method of example 124, wherein the group RNTI is present in the uplink transmission from the UE or is used to mask a CRC in the uplink transmission from the UE.

Example 126

The method of example 115, wherein the group common DCI includes feedback for a plurality of UEs, and the plurality of UEs are grouped based on one or more of the following criteria: the plurality of UEs are configured with a same maximum number of supported simultaneous TBs per subframe L; and/or the plurality of UEs are configured with a same maximum number of grant-free repetitions k; and/or the plurality of UEs are configured with the same k and L; and/or the plurality of UEs are configured to apply a same grant-free hopping pattern; and/or the plurality of UEs are configured to transmit with a same modulation and coding scheme (MCS); and/or the plurality of UEs share a same time-frequency region for a transmission in a slot.

Example 127

The method of example 126, wherein based on a pre-configured resource mapping and ACK/NACK timing relationship, the base station knows which common downlink control channel to use for which transmission.

Example 128

The method of example 112, wherein the first uplink transmission is a grant-free uplink transmission received on a first partition of grant-free uplink resources, and wherein the first feedback is sent in a first group common downlink control channel that corresponds to the first partition.

Example 129

The method of example 128, wherein the second uplink transmission is a grant-free uplink transmission received on a second partition of grant-free uplink resources that is different from the first partition of grant-free uplink resources, and wherein the second feedback is sent in a second group common downlink control channel that corresponds to the second partition and that is different from the first group common downlink control channel.

Example 130

The method of example 129, wherein the first uplink transmission is received in a first bandwidth partition, and the second uplink transmission is received in a second bandwidth partition that is non-overlapping with the first bandwidth partition.

Example 131

A base station comprising: a processor; and a computer readable storage medium storing programming for execution by the processor, the programming including instructions that, when executed by the processor, cause the base station to perform operations including: receiving a plurality of uplink transmissions from a user equipment (UE) in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding the first transport block and generating first feedback representing an ACK or a NACK, the first feedback corresponding to the first transport block; decoding the second transport block and generating second feedback representing another ACK or NACK, the second feedback corresponding to the second transport block; transmitting both the first feedback and the second feedback in a downlink acknowledgement channel.

Example 132

The base station of example 131, further comprising: identifying the UE from at least one of the first uplink transmission and the second uplink transmission; identifying the first HARQ process based on a first reference signal sequence in the first uplink transmission; identifying the second HARQ process based on a second reference signal sequence in the second uplink transmission.

Example 133

The base station of example 132, wherein identifying the UE comprises identifying a radio network temporary identifier (RNTI) corresponding to the UE.

Example 134

The base station of example 131, wherein the first feedback and the second feedback are both in a same ACK/NACK codeword.

Example 135

The base station of example 134, wherein the first feedback is one bit of the ACK/NACK codeword and the second feedback is another bit of the ACK/NACK codeword.

Example 136

The base station of example 134, further comprising generating a complement of the ACK/NACK codeword, and transmitting both the ACK/NACK codeword and the complement of the ACK/NACK codeword in the downlink acknowledgement channel.

Example 137

The base station of example 136, wherein symbols corresponding to the ACK/NACK codeword and other symbols corresponding to the complement of the ACK/NACK codeword are both spread using a same spreading sequence, and spread symbols of the ACK/NACK codeword are mapped to resource elements different from spread symbols of the complement of the ACK/NACK codeword.

Example 138

The base station of example 136, wherein symbols corresponding to the ACK/NACK codeword and other symbols corresponding to the complement of the ACK/NACK codeword are spread using different spreading sequences, and spread symbols of the ACK/NACK codeword are mapped to at least some of the same resource elements as spread symbols of the complement of the ACK/NACK codeword.

Example 139

The base station of example 136, wherein the ACK/NACK codeword includes at least one parity bit.

Example 140

The base station of example 131, wherein the first uplink transmission includes a first reference signal sequence and the second uplink transmission includes a second reference signal sequence, and the base station distinguishes the first HARQ process from the second HARQ process based on a difference between the first reference signal sequence and the second reference signal sequence.

Example 141

The base station of example 140, wherein the first reference signal sequence is assigned to the UE by the base station on a static or semi-static basis.

Example 142

The base station of example 141, further comprising the base station assigning the first reference signal sequence to the UE using higher layer signaling.

Example 143

The base station of example 142, wherein the higher layer signaling is radio resource control (RRC) signaling.

Example 144

The base station of example 131, wherein the first uplink transmission is a grant-free uplink transmission that includes a reference signal sequence, and wherein the reference signal sequence uniquely identifies both the UE and a HARQ process ID that corresponds to the first HARQ process.

Example 145

The base station of example 131, wherein the first feedback comprises a first bit and the second feedback comprises a second bit, and the method further comprises: repeating the first bit to obtain a first plurality of bits, modulating the first plurality of bits to obtain a first plurality of symbols, spreading the first plurality of symbols using a first spreading sequence to obtain a first set of spread symbols, and mapping the first set of spread symbols to a first set of resource elements; repeating the second bit to obtain a second plurality of bits, modulating the second plurality of bits to obtain a second plurality of symbols, spreading the second plurality of symbols using a second spreading sequence to obtain a second set of spread symbols, and mapping the second set of spread symbols to a second set of resource elements; wherein the first spreading sequence is orthogonal to the second spreading sequence.

Example 146

The base station of example 145, wherein the first set of resource elements at least partially overlap with the second set of resource elements.

Example 147

The base station of example 131 further comprising: transmitting a grant in downlink control information, the grant granting an uplink retransmission corresponding to the first transport block, the uplink retransmission to occur in an uplink subframe subsequent to the one in which decoding of the first transport block failed.

Example 148

The base station of example 147, wherein a HARQ process ID identifying the first HARQ process is indicated in the grant.

Example 149

The base station of example 148, wherein the HARQ process ID is explicitly indicated in the grant.

Example 150

The base station of example 148, wherein the HARQ process ID is implicitly indicated in the grant by indicating both: (i) the subframe in which the decoding of the first transport block failed, and (ii) a frequency-domain order or index of a resource block occupied by the first transport block in the subframe in which the decoding of the first transport block failed.

Example 151

The base station of example 131, wherein the first uplink transmission indicates to the base station that the first transport block is a new transport block, and the base station determines a HARQ process ID corresponding to the new transport block using a same rule as that used by the UE to determine the HARQ process ID.

Example 152

The base station of example 151, wherein the first uplink transmission includes a reference signal sequence that indicates to the base station that the first transport block is the new transport block.

Example 153

The base station of example 151, wherein the HARQ process ID is $ID_{i+1}$, and wherein the base station determines the HARQ process ID according to the following formula: $ID_{i+1}=(ID_i+1) \bmod N_{HARQ}$, wherein $ID_i$ is the HARQ process ID used for a previous TB from the UE, "mod" is the modulo operation, and $N_{HARQ}$ is a total number of HARQ process IDs available.

Example 154

The base station of example 131, wherein the first uplink transmission is a retransmission of the first transport block, and wherein decoding the first transport block comprises combining the retransmission with at least one earlier revision of the first transport block.

Example 155

The base station of example 154, wherein a reference signal sequence in the first uplink transmission is used by the base station to determine that the first uplink transmission is the retransmission of the first transport block.

Example 156

The base station of example 155, wherein the reference signal sequence is the same as a previous reference signal sequence used by the UE in a previous transmission.

Example 157

The base station of example 154, further comprising associating the retransmission with a HARQ process ID that corresponds to the at least one earlier revision of the first transport block.

Example 158

The base station of example 131, wherein the base station keeps track of a mapping between (i) actively ongoing HARQ processes of the UE, and (ii) used uplink channel parameters for the ongoing HARQ processes.

Example 159

The base station of example 158, wherein the used uplink channel parameters comprise starting resource block (RB) indices and demodulation reference signal (DMRS) cyclic shifts, for a number of subframes greater than or equal to ACK/NACK feedback delay.

Example 160

The base station of example 131, wherein the first uplink transmission is a grant-free uplink transmission, wherein the first feedback represents a NACK, wherein after the first feedback is transmitted a grant-free uplink retransmission corresponding to the first transport block is received, and wherein the first uplink transmission and retransmission are received on a resource allocation pattern known in advance to the base station and the UE.

Example 161

The base station of example 160, wherein the first uplink transmission is an initial transmission of the first transport block, and wherein a starting resource block (RB) index of the first uplink transmission identifies the resource allocation pattern.

Example 162

The base station of example 160, wherein the resource allocation pattern partially overlaps in time-frequency resources with another resource allocation pattern.

Example 163

The base station of example 160, wherein the resource allocation pattern is selected by the UE and is different from any other resource allocation pattern being used by the UE.

Example 164

The base station of example 163, wherein when the UE has more than one ongoing HARQ process, then the UE selects different resource allocation patterns, for each process, that do not overlap in time-frequency resources.

Example 165

The base station of example 160, wherein the resource allocation pattern uniquely identifies the first HARQ process to the base station.

Example 166

The base station of example 131, wherein the first uplink transmission includes a reference signal sequence, and wherein the reference signal sequence uniquely identifies the UE.

Example 167

The base station of example 166, wherein the base station assigns different reference signal sequences to different UEs for particular uplink resources so that there is a unique mapping between a reference signal sequence and a corresponding UE.

Example 168

The base station of example 166, further comprising identifying the UE using the reference signal sequence, and identifying the first HARQ process using a resource allocation pattern on which the first uplink transmission is sent.

Example 169

The base station of example 131, wherein the first HARQ process is associated with a particular hopping pattern, and the method further comprising the base station identifying the first HARQ process based on a starting resource block (RB) index of the first uplink transmission.

Example 170

The base station of example 131, wherein the first uplink transmission is a retransmission of the first transport block, and the method further comprises: determining that the first uplink transmission is the retransmission based on the first uplink transmission being received on a particular resource allocation pattern; associating the retransmission with the first HARQ process; and combining retransmission data with an earlier revision of the first transport block.

Example 171

The base station of example 131, further comprising assigning the UE a group of resource allocation patterns that are different from resource allocation patterns assigned to other UEs, and wherein a resource allocation pattern on which the first uplink transmission is received uniquely identifies the UE.

Example 172

The base station of example 147, wherein the first HARQ process is identified in the grant using a local index that indicates the first HARQ process within a sorted list of active HARQ processes.

Example 173

The base station of example 131, wherein the first uplink transmission and the second uplink transmission are both grant-free uplink transmissions.

Example 174

The base station of example 173, wherein the downlink acknowledgement channel comprises a physical HARQ indicator channel (PHICH).

Example 175

The base station of example 173, wherein timing of the first feedback has a predetermined relationship with a time at which the first uplink transmission was sent.

Example 176

The base station of example 173, wherein there is a known mapping between a reference signal sequence used by the UE to send the first uplink transmission and an orthogonal spreading sequence used by the base station to send the first feedback.

Example 177

The base station of example 173, wherein there is a known mapping between a starting resource block (RB) index of the first uplink transmission and a location of one or more resource element groups (REGs) in the downlink acknowledgement channel carrying the first feedback.

Example 178

The base station of example 131, wherein the first uplink transmission uses a first reference signal sequence and the second uplink transmission uses a second reference signal sequence that is different from the first reference signal sequence, wherein the first uplink transmission and the second uplink transmission are both sent in uplink subframe w, and wherein the first feedback and the second feedback are both sent in subframe w+n.

Example 179

The base station of example 178, wherein a starting resource block (RB) index of the first uplink transmission maps to a particular resource element group in the downlink acknowledgement channel.

Example 180

The base station of example 178, wherein the first reference signal sequence maps to a respective orthogonal spreading sequence used by the base station to spread the first feedback.

Example 181

The base station of example 134, wherein the ACK/NACK codeword is L bits and L=K+P, where K is a maximum number of supported simultaneously transmitted TBs per UE per subframe, and P is a number of parity bits added to the ACK/NACK codeword.

Example 182

The base station of example 181, wherein L is an integer multiple of three.

Example 183

The base station of example 147, wherein the grant includes a starting resource block (RB) index of the uplink retransmission and a reference signal sequence to be used in the retransmission.

Example 184

The base station of example 136, further comprising applying scrambling to the addition of the ACK/NACK codeword and the complement of the ACK/NACK codeword.

Example 185

The base station of example 184, wherein the scrambling is cell-specific.

Example 186

The base station of example 138, wherein the spreading sequences to use for the UE are set by the base station, and wherein mapping of the first feedback and the second feedback to resource elements is set by the base station based on system information and information on starting resource block (RB) indices for the first uplink transmission and the second uplink transmission.

Example 187

The base station of example 131, wherein the first feedback and the second feedback are transmitted in one or more physical HARQ indicator channel (PHICH) groups, and wherein a total number of PHICH groups $N_{PHICH}^{group}$ supported for frequency division duplex (FDD) is:

$$N_{PHICH}^{group} = \begin{cases} 2 \cdot \lceil 3N_g(N_{RB}^{DL}/16) \rceil & \text{for normal cyclic prefix} \\ 2 \cdot \lceil 3N_g(N_{RB}^{DL}/8) \rceil & \text{for extended cyclic prefix} \end{cases}$$

where $N_g$ is a first system parameter, and $N_{RB}^{DL}$ is a second system parameter that corresponds to a number of available downlink resource blocks.

Example 188

The base station of example 134, further comprising generating an all-parity codeword from the ACK/NACK codeword, and transmitting both the ACK/NACK codeword and the all-parity codeword in the downlink acknowledgement channel.

Example 189

The base station of example 131, wherein the first feedback and the second feedback are transmitted on a physical HARQ indicator channel (PHICH), and wherein there is a preconfigured mapping between a process ID of the first HARQ process and PHICH resources on which the first feedback is transmitted.

Example 190

The base station of example 189, wherein the first feedback and the second feedback are mapped to a same PHICH group.

Example 191

The base station of example 189, wherein the first feedback and the second feedback are mapped to a different PHICH group.

Example 192

The base station of example 189, wherein the preconfigured mapping is UE-specific.

Example 193

The base station of example 189, wherein the preconfigured mapping is UE-group specific.

Example 194

The base station of example 189, wherein the preconfigured mapping is obtained from system information.

Example 195

The base station of example 131, wherein the first feedback and the second feedback are transmitted on a physical HARQ indicator channel (PHICH), and wherein the first feedback and the second feedback are transmitted in different PHICH groups.

Example 196

The base station of example 195, wherein the first feedback and the second feedback are spread using a same orthogonal sequence.

Example 197

The base station of example 195, wherein the UE knows where to find the ACK or NACK of the first feedback according to a rule, and wherein the rule is based on a PHICH group index and a process ID of the first HARQ process.

Example 198

The base station of example 197, wherein the rule is configured semi-statically.

Example 199

The base station of example 197, wherein the rule is initially set based on a reference signal sequence and/or a resource block (RB) index.

Example 200

The base station of example 131, wherein the downlink acknowledgement channel is part of a downlink control information (DCI) channel.

Example 201

The base station of example 200, wherein the first feedback and the second feedback are sent in a DCI 0 message.

Example 202

The base station of example 200, wherein the first feedback and the second feedback are sent in unicast DCI.

Example 203

The base station of example 200, wherein the first feedback and the second feedback are sent in group common DCI.

Example 204

The base station of example 203, wherein the group common DCI is a multicast message addressing a group of UEs using a group ID.

Example 205

The base station of example 200, wherein the first feedback and the second feedback are sent in a DCI format used to carry multiple ACK/NACK indications for multiple transmissions in a given uplink subframe.

Example 206

The base station of example 205, wherein the DCI format is transmitted over a downlink control channel.

Example 207

The base station of example 205, wherein the DCI format is mapped to one or more control channel elements (CCEs).

Example 208

The base station of example 205, wherein the UE is configured for NACK-less retransmissions, and wherein all-NACK codewords and single-TB NACKs are not transmitted to the UE.

Example 209

The base station of example 200, wherein the first feedback indicates an ACK, and the ACK is implicitly indicated by indicating in the first feedback: (i) a HARQ process ID of the first HARQ process, and (ii) a void combination of: modulation and coding scheme (MCS) and at least one assigned resource block (RB).

Example 210

The base station of example 209, wherein the first feedback is sent using a grant.

Example 211

The base station of example 203, wherein the group common DCI comprises a message addressing a group of M UEs using a group RNTI, and wherein the group common DCI comprises M ACK/NACK fields of L bits each, as well as a CRC field encoded using the group RNTI.

Example 212

The base station of example 211, wherein M=1 such that the group of M UEs only contains the UE, and the group RNTI is specific to the UE, and the group RNTI is used by the base station to identify the UE when the base station receives an uplink transmission from the UE.

Example 213

The base station of example 212, wherein the group RNTI is present in the uplink transmission from the UE or is used to mask a CRC in the uplink transmission from the UE.

Example 214

The base station of example 203, wherein the group common DCI includes feedback for a plurality of UEs, and the plurality of UEs are grouped based on one or more of the following criteria: the plurality of UEs are configured with a same maximum number of supported simultaneous TBs per subframe L; and/or the plurality of UEs are configured with a same maximum number of grant-free repetitions k; and/or the plurality of UEs are configured with the same k and L; and/or the plurality of UEs are configured to apply a same grant-free hopping pattern; and/or the plurality of UEs are configured to transmit with a same modulation and coding scheme (MCS); and/or the plurality of UEs share a same time-frequency region for a transmission in a slot.

Example 215

The base station of example 214, wherein based on a pre-configured resource mapping and ACK/NACK timing relationship, the base station knows which common downlink control channel to use for which transmission.

Example 216

The base station of example 200, wherein the first uplink transmission is a grant-free uplink transmission received on a first partition of grant-free uplink resources, and wherein the first feedback is sent in a first group common downlink control channel that corresponds to the first partition.

Example 217

The base station of example 216, wherein the second uplink transmission is a grant-free uplink transmission received on a second partition of grant-free uplink resources that is different from the first partition of grant-free uplink resources, and wherein the second feedback is sent in a second group common downlink control channel that corresponds to the second partition and that is different from the first group common downlink control channel.

Example 218

The base station of example 217, wherein the first uplink transmission is received in a first bandwidth partition, and the second uplink transmission is received in a second bandwidth partition that is non-overlapping with the first bandwidth partition.

Example 219

A base station comprising: a processor; and a computer readable storage medium storing programming for execution by the processor, the programming including instructions that, when executed by the processor, cause the base station to perform operations including: receiving a plurality of uplink transmissions from a user equipment (UE) in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding the first transport block and generating first feedback representing an ACK or a NACK, the first feedback corresponding to the first transport block; decoding the second transport block and generating second feedback representing another ACK or NACK, the second feedback corresponding to the second transport block; transmitting both the first feedback and the second feedback in downlink control information (DCI).

Example 220

The base station of example 219, wherein the first feedback and the second feedback are sent in a DCI 0 message.

Example 221

The base station of example 219, wherein the first feedback and the second feedback are sent in unicast DCI.

Example 222

The base station of example 219, wherein the first feedback and the second feedback are sent in group common DCI.

Example 223

The base station of example 222, wherein the group common DCI is a multicast message addressing a group of UEs using a group ID.

Example 224

The base station of example 219, wherein the first feedback and the second feedback are sent in a DCI format used to carry multiple ACK/NACK indications for multiple transmissions in a given uplink subframe.

Example 225

The base station of example 224, wherein the DCI format is transmitted over a downlink control channel.

Example 226

The base station of example 224, wherein the DCI format is mapped to one or more control channel elements (CCEs).

Example 227

The base station of example 224, wherein the UE is configured for NACK-less retransmissions, and wherein all-NACK codewords and single-TB NACKs are not transmitted to the UE.

Example 228

The base station of example 219, wherein the first feedback indicates an ACK, and the ACK is implicitly indicated by indicating in the first feedback: (i) a HARQ process ID of the first HARQ process, and (ii) a void combination of: modulation and coding scheme (MCS) and at least one assigned resource block (RB).

Example 229

The base station of example 228, wherein the first feedback is sent using a grant.

Example 230

The base station of example 222, wherein the group common DCI comprises a message addressing a group of M UEs using a group RNTI, and wherein the group common DCI comprises M ACK/NACK fields of L bits each, as well as a CRC field encoded using the group RNTI.

Example 231

The base station of example 230, wherein M=1 such that the group of M UEs only contains the UE, and the group RNTI is specific to the UE, and the group RNTI is used by the base station to identify the UE when the base station receives an uplink transmission from the UE.

Example 232

The base station of example 231, wherein the group RNTI is present in the uplink transmission from the UE or is used to mask a CRC in the uplink transmission from the UE.

Example 233

The base station of example 222, wherein the group common DCI includes feedback for a plurality of UEs, and the plurality of UEs are grouped based on one or more of the following criteria: the plurality of UEs are configured with a same maximum number of supported simultaneous TBs per subframe L; and/or the plurality of UEs are configured with a same maximum number of grant-free repetitions k; and/or the plurality of UEs are configured with the same k and L; and/or the plurality of UEs are configured to apply a same grant-free hopping pattern; and/or the plurality of UEs are configured to transmit with a same modulation and coding scheme (MCS); and/or the plurality of UEs share a same time-frequency region for a transmission in a slot.

Example 234

The base station of example 233, wherein based on a pre-configured resource mapping and ACK/NACK timing relationship, the base station knows which common downlink control channel to use for which transmission.

Example 235

The base station of example 219, wherein the first uplink transmission is a grant-free uplink transmission received on a first partition of grant-free uplink resources, and wherein the first feedback is sent in a first group common downlink control channel that corresponds to the first partition.

Example 236

The base station of example 235, wherein the second uplink transmission is a grant-free uplink transmission received on a second partition of grant-free uplink resources that is different from the first partition of grant-free uplink resources, and wherein the second feedback is sent in a second group common downlink control channel that corresponds to the second partition and that is different from the first group common downlink control channel.

Example 237

The base station of example 236, wherein the first uplink transmission is received in a first bandwidth partition, and the second uplink transmission is received in a second bandwidth partition that is non-overlapping with the first bandwidth partition.

Example 238

A base station comprising: a receiver to receive a plurality of uplink transmissions from a user equipment (UE) in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; an uplink message processor to decode the first transport block and generate first feedback representing an ACK or NACK, the first feedback corresponding to the first transport block, and to decode the second transport block and generate second feedback representing another ACK or NACK, the second feedback corresponding to the second transport block; a transmitter to transmit both the first feedback and the second feedback in a downlink acknowledgement channel.

Example 239

A method performed by a user equipment (UE), the method comprising: transmitting a plurality of uplink transmissions to a base station in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding first feedback and second feedback in a downlink acknowledgement channel, the first feedback representing an ACK or NACK for the first transport block, and the second feedback representing another ACK or NACK for the second transport block.

Example 240

The method of example 239, wherein the first uplink transmission includes a reference signal sequence that is different from the reference signal sequence used in the second uplink transmission.

Example 241

The method of example 239 or example 240, wherein the first feedback and the second feedback are both in a same ACK/NACK codeword.

Example 242

The method of example 241, wherein one bit of the ACK/NACK codeword represents the ACK or NACK for the first transport block, and wherein another bit of the ACK/NACK codeword represents the other ACK or NACK for the second transport block.

Example 243

The method of example 241, further comprising also decoding a complement of the ACK/NACK codeword, and using the ACK/NACK codeword and the complement of the ACK/NACK codeword to determine whether the ACK/NACK codeword may be corrupted.

Example 244

The method of example 243, wherein the ACK/NACK codeword and the complement of the ACK/NACK codeword both include at least one parity bit.

Example 245

The method of example 243, further comprising using a resource block index of the first uplink transmission and/or a resource block index of the second uplink transmission to locate the ACK/NACK codeword in the downlink acknowledgement channel.

Example 246

The method of example 243, further comprising: using a resource block index of the first uplink transmission to locate resource elements in the downlink acknowledgement channel carrying the first feedback in the ACK/NACK codeword; using a resource block index of the second uplink transmission to locate resource elements in the downlink acknowledgement channel carrying the second feedback in the ACK/NACK codeword.

Example 247

The method of any one of examples 239 to 246, further comprising: using a resource block index of the first uplink transmission to locate resource elements in the downlink acknowledgement channel carrying the first feedback; using another resource block index of the second uplink transmission to locate resource elements in the downlink acknowledgement channel carrying the second feedback.

Example 248

The method of any one of examples 239 to 247, wherein the first uplink transmission is a grant-free uplink transmission that includes a reference signal sequence, and wherein the reference signal sequence uniquely identifies both the UE and a HARQ process ID that corresponds to the first HARQ process.

Example 249

The method of any one of examples 239 to 248, wherein the first uplink transmission includes a reference signal sequence, and wherein the reference signal sequence is assigned to the UE by the base station on a static or semi-static basis.

Example 250

The method of example 249, further comprising receiving the assignment of the reference signal sequence via higher layer signaling.

Example 251

The method of example 250, wherein the higher layer signaling is radio resource control (RRC) signaling.

Example 252

The method of any one of examples 239 to 252, further comprising the UE determining, from an idle HARQ list, a HARQ process ID corresponding to the first transport block.

Example 253

The method of example 252, wherein the HARQ process ID is $ID_{i+1}$, and wherein the UE determines the HARQ process ID according to the following formula: $ID_{i+1}=(ID_i+1) \bmod N_{HARQ}$, wherein $ID_i$ is the HARQ process ID chosen for a previous TB, "mod" is the modulo operation, and $N_{HARQ}$ is a total number of HARQ process IDs available.

Example 254

The method of any one of examples 239 to 254, wherein the UE keeps track of a mapping between (i) actively ongoing HARQ processes of the UE, and (ii) used uplink channel parameters for the ongoing HARQ processes.

Example 255

The method of example 254, wherein the used uplink channel parameters comprise starting resource block (RB) indices and demodulation reference signal (DMRS) cyclic shifts, for a number of subframes greater than or equal to ACK/NACK feedback delay.

Example 256

The method of any one of examples 239 to 255, wherein the first uplink transmission is a grant-free uplink transmission, wherein the first feedback represents a NACK, wherein after the first feedback is received the method further comprises transmitting a grant-free uplink retransmission corresponding to the first transport block, and wherein the first uplink transmission and retransmission are transmitted on a resource allocation pattern known in advance to the base station and the UE.

Example 257

The method of example 256, wherein the first uplink transmission is an initial transmission of the first transport block, and wherein a starting resource block (RB) index of the first uplink transmission identifies the resource allocation pattern.

Example 258

The method of example 256, wherein the resource allocation pattern partially overlaps in time-frequency resources with another resource allocation pattern.

Example 259

The method of example 256, wherein the resource allocation pattern is selected by the UE and is different from any other resource allocation pattern being used by the UE.

Example 260

The method of example 259, wherein when the UE has more than one ongoing HARQ process, then the UE selects different resource allocation patterns, for each process, that do not overlap in time-frequency resources.

Example 261

The method of example 256, wherein the resource allocation pattern uniquely identifies the first HARQ process to the base station.

Example 262

The method of any one of examples 239 to 261, wherein the first uplink transmission includes a reference signal sequence, and wherein the reference signal sequence uniquely identifies the UE.

Example 263

The method of example 262, further comprising the UE transmitting the first uplink transmission and the second uplink transmission on two different resource allocation patterns that do not overlap in time-frequency resources, and the UE using the reference signal sequence for both the first uplink transmission and the second uplink transmission.

Example 264

The method of any one of examples 239 to 263, wherein the first HARQ process is associated with a particular hopping pattern so that the base station can identify the first HARQ process based on a starting resource block (RB) index of the first uplink transmission.

Example 265

The method of any one of examples 239 to 264 further comprising receiving a grant that grants an uplink retransmission corresponding to the first transport block, and wherein the first HARQ process is identified in the grant using a local index that indicates the first HARQ process within a sorted list of active HARQ processes.

Example 266

The method of any one of examples 239 to 266, wherein the first uplink transmission and the second uplink transmission are both grant-free uplink transmissions.

Example 267

The method of example 266, wherein the downlink acknowledgement channel is a physical HARQ indicator channel (PHICH).

Example 268

The method of example 266, wherein timing of the first feedback has a predetermined relationship with a time at which the first uplink transmission was sent.

Example 269

The method of example 266, wherein there is a known mapping between a reference signal sequence used by the UE to send the first uplink transmission and an orthogonal spreading sequence used by the base station to send the first feedback.

Example 270

The method of any one of examples 239 to 269, wherein there is a known mapping between a starting resource block (RB) index of the first uplink transmission and a location of one or more resource element groups (REGs) in the downlink acknowledgement channel carrying the first feedback.

Example 271

The method of any one of examples 239 to 270, wherein the first uplink transmission uses a first reference signal sequence and the second uplink transmission uses a second reference signal sequence that is different from the first reference signal sequence, wherein the first uplink transmission and the second uplink transmission are both sent in uplink subframe w, and where in the first feedback and the second feedback are both received in subframe w+n.

Example 272

The method of example 271, wherein a starting resource block (RB) index of the first uplink transmission maps to a particular resource element group in the downlink acknowledgement channel.

Example 273

The method of example 271, wherein the first reference signal sequence maps to a respective orthogonal spreading sequence used by the base station to spread the first feedback.

Example 274

The method of example 241, wherein the ACK/NACK codeword is L bits and L=K+P, where K is a maximum number of supported simultaneously transmitted TBs per UE per subframe, and P is a number of parity bits in the ACK/NACK codeword.

Example 275

The method of example 274, wherein L is an integer multiple of three.

Example 276

The method of any one of examples 239 to 275 further comprising receiving a grant that grants an uplink retransmission corresponding to the first transport block, and wherein the grant includes a starting resource block (RB) index of the uplink retransmission and a reference signal sequence to be used in the retransmission.

Example 277

The method of example 241, wherein the ACK/NACK codeword is decoded, and the method further comprising identifying an error in the decoded ACK/NACK codeword, and based on identifying the error: deciding that the ACK/NACK codeword is all NACKs.

Example 278

The method of example 239, wherein the first feedback and the second feedback are received on a physical HARQ indicator channel (PHICH), and wherein there is a preconfigured mapping between a process ID of the first HARQ process and PHICH resources on which the first feedback is received.

Example 279

The method of example 278, wherein the first feedback and the second feedback are mapped to a same PHICH group.

Example 280

The method of example 278, wherein the first feedback and the second feedback are mapped to a different PHICH group.

Example 281

The method of example 278, wherein the preconfigured mapping is UE-specific.

Example 282

The method of example 278, wherein the preconfigured mapping is UE-group specific.

Example 283

The method of example 278, wherein the preconfigured mapping is obtained from system information.

Example 284

The method of any one of examples 239 to 283, further comprising determining a location of the first feedback based on an ID of the UE and/or a HARQ process ID of the first HARQ process.

Example 285

The method of example 239, wherein the first uplink transmission is a grant-free uplink transmission, and wherein the method further comprises determining a location of the first feedback based on a function of $N_{PHICH}^{group}$, K, M, and/or J; wherein $N_{PHICH}^{group}$ is a number of PHICH groups in the downlink acknowledgement channel, wherein K is a number of transport blocks supported by each PHICH group, wherein there are M UEs operating in grant-free mode, and wherein up to J HARQ processes are supported by the UE.

Example 286

The method of example 239, wherein the first feedback and the second feedback are received on a physical HARQ indicator channel (PHICH), and wherein the first feedback and the second feedback are received in different PHICH groups.

Example 287

The method of example 286, wherein the first feedback and the second feedback are spread using a same orthogonal sequence.

Example 288

The method of example 286, wherein the UE knows where to find the ACK or NACK of the first feedback according to a rule, and wherein the rule is based on a PHICH group index and a process ID of the first HARQ process.

Example 289

The method of example 288, wherein the rule is configured semi-statically.

Example 290

The method of example 288, wherein the rule is initially set based on a reference signal sequence and/or a resource block (RB) index.

Example 291

The method of example 239, wherein the downlink acknowledgement channel is part of a downlink control information (DCI) channel.

Example 292

The method of example 291, wherein the first feedback and the second feedback are received in a DCI 0 message.

Example 293

The method of example 291, wherein the first feedback and the second feedback are received in unicast DCI.

Example 294

The method of example 291, wherein the first feedback and the second feedback are received in group common DCI.

Example 295

The method of example 294, wherein the group common DCI is a multicast message addressing a group of UEs using a group ID.

Example 296

The method of example 291, wherein the first feedback and the second feedback are received in a DCI format used to carry multiple ACK/NACK indications for multiple transmissions in a given uplink subframe.

Example 297

The method of example 296, wherein the DCI format is received over a downlink control channel.

Example 298

The method of example 296, wherein the DCI format is mapped to one or more control channel elements (CCEs).

Example 299

The method of example 296, wherein the UE is configured for NACK-less retransmissions, and wherein all-NACK codewords and single-TB NACKs are not transmitted to the UE.

Example 300

The method of example 291, wherein the first feedback indicates an ACK, and the ACK is implicitly indicated by receiving in the first feedback: (i) a HARQ process ID of the first HARQ process, and (ii) a void combination of: modulation and coding scheme (MCS) and at least one assigned resource block (RB).

Example 301

The method of example 300, wherein the first feedback is received in a grant.

Example 302

The method of example 300, wherein subsequent to receiving the first feedback, the first transport block is still maintained in the UE's HARQ transmit buffer for potential granted retransmission.

Example 303

The method of example 294, wherein the group common DCI is a message addressing a group of M UEs using a group RNTI, and wherein the group common DCI comprises M ACK/NACK fields of L bits each, as well as a CRC field encoded using the group RNTI.

Example 304

The method of example 303, wherein M=1 such that the group of M UEs only contains the UE, and the group RNTI is specific to the UE, and the group RNTI is for use by the base station to identify the UE when an uplink transmission is sent from the UE to the base station.

Example 305

The method of example 304, wherein the group RNTI is present in the uplink transmission sent from the UE to the base station, or the group RNTI is used to mask a CRC in the uplink transmission sent from the UE to the base station.

Example 306

The method of example 294, wherein the group common DCI includes feedback for a plurality of UEs, and the plurality of UEs are grouped based on one or more of the following criteria: the plurality of UEs are configured with a same maximum number of supported simultaneous TBs per subframe L; and/or the plurality of UEs are configured with a same maximum number of grant-free repetitions k; and/or the plurality of UEs are configured with the same k and L; and/or the plurality of UEs are configured to apply a same grant-free hopping pattern; and/or the plurality of UEs are configured to transmit with a same modulation and coding scheme (MCS); and/or the plurality of UEs share a same time-frequency region for a transmission in a slot.

Example 307

The method of example 306, wherein based on a pre-configured resource mapping and ACK/NACK timing relationship, the UE knows which common downlink control channel to check for which transmission.

Example 308

The method of example 291, wherein the first uplink transmission is a grant-free uplink transmission sent on a first partition of grant-free uplink resources, and wherein the first feedback is received in a first group common downlink control channel that corresponds to the first partition.

Example 309

The method of example 308, wherein the second uplink transmission is a grant-free uplink transmission sent on a second partition of grant-free uplink resources that is different from the first partition of grant-free uplink resources, and wherein the second feedback is received in a second group common downlink control channel that corresponds to the second partition and that is different from the first group common downlink control channel.

Example 310

The method of example 309, wherein the first uplink transmission is sent in a first bandwidth partition, and the second uplink transmission is sent in a second bandwidth partition that is non-overlapping with the first bandwidth partition.

Example 311

A method performed by a user equipment (UE), the method comprising: transmitting a plurality of uplink transmissions to a base station in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding first feedback and second feedback in downlink control information, the first feedback representing an ACK or NACK for the first transport block, and the second feedback representing another ACK or NACK for the second transport block.

Example 312

The method of example 311, wherein the first feedback and the second feedback are received in a DCI 0 message.

Example 313

The method of example 311, wherein the first feedback and the second feedback are received in unicast DCI.

Example 314

The method of example 311, wherein the first feedback and the second feedback are received in group common DCI.

Example 315

The method of example 314, wherein the group common DCI is a multicast message addressing a group of UEs using a group ID.

Example 316

The method of example 311, wherein the first feedback and the second feedback are received in a DCI format used to carry multiple ACK/NACK indications for multiple transmissions in a given uplink subframe.

Example 317

The method of example 316, wherein the DCI format is received over a downlink control channel.

Example 318

The method of example 316, wherein the DCI format is mapped to one or more control channel elements (CCEs).

Example 319

The method of example 316, wherein the UE is configured for NACK-less retransmissions, and wherein all-NACK codewords and single-TB NACKs are not transmitted to the UE.

Example 320

The method of example 311, wherein the first feedback indicates an ACK, and the ACK is implicitly indicated by receiving in the first feedback: (i) a HARQ process ID of the first HARQ process, and (ii) a void combination of: modulation and coding scheme (MCS) and at least one assigned resource block (RB).

Example 321

The method of example 320, wherein the first feedback is received in a grant.

Example 322

The method of example 320, wherein subsequent to receiving the first feedback, the first transport block is still maintained in the UE's HARQ transmit buffer for potential granted retransmission.

Example 323

The method of example 314, wherein the group common DCI is a message addressing a group of M UEs using a group RNTI, and wherein the group common DCI comprises M ACK/NACK fields of L bits each, as well as a CRC field encoded using the group RNTI.

Example 324

The method of example 323, wherein M=1 such that the group of M UEs only contains the UE, and the group RNTI is specific to the UE, and the group RNTI is for use by the base station to identify the UE when an uplink transmission is sent from the UE to the base station.

Example 325

The method of example 324, wherein the group RNTI is present in the uplink transmission sent from the UE to the base station, or the group RNTI is used to mask a CRC in the uplink transmission sent from the UE to the base station.

Example 326

The method of example 314, wherein the group common DCI includes feedback for a plurality of UEs, and the plurality of UEs are grouped based on one or more of the following criteria: the plurality of UEs are configured with a same maximum number of supported simultaneous TBs per subframe L; and/or the plurality of UEs are configured with a same maximum number of grant-free repetitions k; and/or the plurality of UEs are configured with the same k and L; and/or the plurality of UEs are configured to apply a same grant-free hopping pattern; and/or the plurality of UEs are configured to transmit with a same modulation and coding scheme (MCS); and/or the plurality of UEs share a same time-frequency region for a transmission in a slot.

Example 327

The method of example 326, wherein based on a pre-configured resource mapping and ACK/NACK timing relationship, the UE knows which common downlink control channel to check for which transmission.

Example 328

The method of example 311, wherein the first uplink transmission is a grant-free uplink transmission sent on a first partition of grant-free uplink resources, and wherein the first feedback is received in a first group common downlink control channel that corresponds to the first partition.

Example 329

The method of example 328, wherein the second uplink transmission is a grant-free uplink transmission sent on a second partition of grant-free uplink resources that is different from the first partition of grant-free uplink resources, and wherein the second feedback is received in a second group common downlink control channel that corresponds to the second partition and that is different from the first group common downlink control channel.

Example 330

The method of example 329, wherein the first uplink transmission is sent in a first bandwidth partition, and the second uplink transmission is sent in a second bandwidth partition that is non-overlapping with the first bandwidth partition.

Example 331

A user equipment (UE) comprising: a processor; and a computer readable storage medium storing programming for execution by the processor, the programming including instructions that, when executed by the processor, cause the UE to perform operations including: transmitting a plurality of uplink transmissions to a base station in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding first feedback and second feedback in a downlink acknowledgement channel, the first feedback representing an ACK or NACK for the first transport block, and the second feedback representing another ACK or NACK for the second transport block.

Example 332

The UE of example 331, wherein the first uplink transmission includes a reference signal sequence that is different from the reference signal sequence used in the second uplink transmission.

Example 333

The UE of example 331, wherein the first feedback and the second feedback are both in a same ACK/NACK codeword.

Example 334

The UE of example 333, wherein one bit of the ACK/NACK codeword represents the ACK or NACK for the first transport block, and wherein another bit of the ACK/NACK codeword represents the other ACK or NACK for the second transport block.

Example 335

The UE of example 333, further comprising also decoding a complement of the ACK/NACK codeword, and using the ACK/NACK codeword and the complement of the ACK/NACK codeword to determine whether the ACK/NACK codeword may be corrupted.

Example 336

The UE of example 335, wherein the ACK/NACK codeword and the complement of the ACK/NACK codeword both include at least one parity bit.

Example 337

The UE of example 335, further comprising using a resource block index of the first uplink transmission and/or a resource block index of the second uplink transmission to locate the ACK/NACK codeword in the downlink acknowledgement channel.

Example 338

The UE of example 335, further comprising: using a resource block index of the first uplink transmission to locate resource elements in the downlink acknowledgement channel carrying the first feedback in the ACK/NACK codeword; using a resource block index of the second uplink transmission to locate resource elements in the downlink acknowledgement channel carrying the second feedback in the ACK/NACK codeword.

Example 339

The UE of example 331, further comprising: using a resource block index of the first uplink transmission to locate resource elements in the downlink acknowledgement channel carrying the first feedback; using another resource block index of the second uplink transmission to locate resource elements in the downlink acknowledgement channel carrying the second feedback.

Example 340

The UE of example 331, wherein the first uplink transmission is a grant-free uplink transmission that includes a reference signal sequence, and wherein the reference signal sequence uniquely identifies both the UE and a HARQ process ID that corresponds to the first HARQ process.

Example 341

The UE of example 331, wherein the first uplink transmission includes a reference signal sequence, and wherein the reference signal sequence is assigned to the UE by the base station on a static or semi-static basis.

Example 342

The UE of example 341, further comprising receiving the assignment of the reference signal sequence via higher layer signaling.

Example 343

The UE of example 342, wherein the higher layer signaling is radio resource control (RRC) signaling.

Example 344

The UE of example 331, further comprising the UE determining, from an idle HARQ list, a HARQ process ID corresponding to the first transport block.

Example 345

The UE of example 344, wherein the HARQ process ID is $ID_{i+1}$, and wherein the UE determines the HARQ process ID according to the following formula: $ID_{i+1}=(ID_i+1) \mod N_{HARQ}$, wherein $ID_i$ is the HARQ process ID chosen for a previous TB, "mod" is the modulo operation, and $N_{HARQ}$ is a total number of HARQ process IDs available.

Example 346

The UE of example 331, wherein the UE keeps track of a mapping between (i) actively ongoing HARQ processes of the UE, and (ii) used uplink channel parameters for the ongoing HARQ processes.

Example 347

The UE of example 346, wherein the used uplink channel parameters comprise starting resource block (RB) indices and demodulation reference signal (DMRS) cyclic shifts, for a number of subframes greater than or equal to ACK/NACK feedback delay.

Example 348

The UE of example 331, wherein the first uplink transmission is a grant-free uplink transmission, wherein the first feedback represents a NACK, wherein after the first feedback is received the method further comprises transmitting a grant-free uplink retransmission corresponding to the first transport block, and wherein the first uplink transmission and retransmission are transmitted on a resource allocation pattern known in advance to the base station and the UE.

Example 349

The UE of example 348, wherein the first uplink transmission is an initial transmission of the first transport block, and wherein a starting resource block (RB) index of the first uplink transmission identifies the resource allocation pattern.

Example 350

The UE of example 348, wherein the resource allocation pattern partially overlaps in time-frequency resources with another resource allocation pattern.

Example 351

The UE of example 348, wherein the resource allocation pattern is selected by the UE and is different from any other resource allocation pattern being used by the UE.

Example 352

The UE of example 351, wherein when the UE has more than one ongoing HARQ process, then the UE selects different resource allocation patterns, for each process, that do not overlap in time-frequency resources.

Example 353

The UE of example 348, wherein the resource allocation pattern uniquely identifies the first HARQ process to the base station.

Example 354

The UE of example 331, wherein the first uplink transmission includes a reference signal sequence, and wherein the reference signal sequence uniquely identifies the UE.

Example 355

The UE of example 354, further comprising the UE transmitting the first uplink transmission and the second uplink transmission on two different resource allocation patterns that do not overlap in time-frequency resources, and the UE using the reference signal sequence for both the first uplink transmission and the second uplink transmission.

Example 356

The UE of example 331, wherein the first HARQ process is associated with a particular hopping pattern so that the base station can identify the first HARQ process based on a starting resource block (RB) index of the first uplink transmission.

Example 357

The UE of example 331 further comprising receiving a grant that grants an uplink retransmission corresponding to the first transport block, and wherein the first HARQ process is identified in the grant using a local index that indicates the first HARQ process within a sorted list of active HARQ processes.

Example 358

The UE of example 331, wherein the first uplink transmission and the second uplink transmission are both grant-free uplink transmissions.

Example 359

The UE of example 358, wherein the downlink acknowledgement channel is a physical HARQ indicator channel (PHICH).

Example 360

The UE of example 358, wherein timing of the first feedback has a predetermined relationship with a time at which the first uplink transmission was sent.

Example 361

The UE of example 358, wherein there is a known mapping between a reference signal sequence used by the UE to send the first uplink transmission and an orthogonal spreading sequence used by the base station to send the first feedback.

Example 362

The UE of example 331, wherein there is a known mapping between a starting resource block (RB) index of the first uplink transmission and a location of one or more resource element groups (REGs) in the downlink acknowledgement channel carrying the first feedback.

Example 363

The UE of example 331, wherein the first uplink transmission uses a first reference signal sequence and the second uplink transmission uses a second reference signal sequence that is different from the first reference signal sequence, wherein the first uplink transmission and the second uplink transmission are both sent in uplink subframe w, and wherein the first feedback and the second feedback are both received in subframe w+n.

Example 364

The UE of example 363, wherein a starting resource block (RB) index of the first uplink transmission maps to a particular resource element group in the downlink acknowledgement channel.

Example 365

The UE of example 363, wherein the first reference signal sequence maps to a respective orthogonal spreading sequence used by the base station to spread the first feedback.

Example 366

The UE of example 333, wherein the ACK/NACK codeword is L bits and L=K+P, where K is a maximum number of supported simultaneously transmitted TBs per UE per subframe, and P is a number of parity bits in the ACK/NACK codeword.

Example 367

The UE of example 366, wherein L is an integer multiple of three.

Example 368

The UE of example 331 further comprising receiving a grant that grants an uplink retransmission corresponding to the first transport block, and wherein the grant includes a starting resource block (RB) index of the uplink retransmission and a reference signal sequence to be used in the retransmission.

Example 369

The UE of example 333, wherein the ACK/NACK codeword is decoded, and the method further comprising identifying an error in the decoded ACK/NACK codeword, and based on identifying the error: deciding that the ACK/NACK codeword is all NACKs.

Example 370

The UE of example 331, wherein the first feedback and the second feedback are received on a physical HARQ indicator channel (PHICH), and wherein there is a preconfigured mapping between a process ID of the first HARQ process and PHICH resources on which the first feedback is received.

Example 371

The UE of example 370, wherein the first feedback and the second feedback are mapped to a same PHICH group.

Example 372

The UE of example 370, wherein the first feedback and the second feedback are mapped to a different PHICH group.

Example 373

The UE of example 370, wherein the preconfigured mapping is UE-specific.

Example 374

The UE of example 370, wherein the preconfigured mapping is UE-group specific.

Example 375

The UE of example 370, wherein the preconfigured mapping is obtained from system information.

Example 376

The UE of example 331, further comprising determining a location of the first feedback based on an ID of the UE and/or a HARQ process ID of the first HARQ process.

Example 377

The UE of example 331, wherein the first uplink transmission is a grant-free uplink transmission, and wherein the method further comprises determining a location of the first feedback based on a function of $N_{PHICH}^{group}$, K, M, and/or; wherein $N_{PHICH}^{group}$ is a number of PHICH groups in the downlink acknowledgement channel, wherein K is a number of transport blocks supported by each PHICH group, wherein there are M UEs operating in grant-free mode, and wherein up to J HARQ processes are supported by the UE.

Example 378

The UE of example 331, wherein the first feedback and the second feedback are received on a physical HARQ indicator channel (PHICH), and wherein the first feedback and the second feedback are received in different PHICH groups.

Example 379

The UE of example 378, wherein the first feedback and the second feedback are spread using a same orthogonal sequence.

Example 380

The UE of example 378, wherein the UE knows where to find the ACK or NACK of the first feedback according to a rule, and wherein the rule is based on a PHICH group index and a process ID of the first HARQ process.

Example 381

The UE of example 380, wherein the rule is configured semi-statically.

Example 382

The UE of example 380, wherein the rule is initially set based on a reference signal sequence and/or a resource block (RB) index.

Example 383

The UE of example 331, wherein the downlink acknowledgement channel is part of a downlink control information (DCI) channel.

Example 384

The UE of example 383, wherein the first feedback and the second feedback are received in a DCI 0 message.

Example 385

The UE of example 383, wherein the first feedback and the second feedback are received in unicast DCI.

Example 386

The UE of example 383, wherein the first feedback and the second feedback are received in group common DCI.

Example 387

The UE of example 386, wherein the group common DCI is a multicast message addressing a group of UEs using a group ID.

Example 388

The UE of example 383, wherein the first feedback and the second feedback are received in a DCI format used to carry multiple ACK/NACK indications for multiple transmissions in a given uplink subframe.

Example 389

The UE of example 388, wherein the DCI format is received over a downlink control channel.

Example 390

The UE of example 388, wherein the DCI format is mapped to one or more control channel elements (CCEs).

Example 391

The UE of example 388, wherein the UE is configured for NACK-less retransmissions, and wherein all-NACK codewords and single-TB NACKs are not transmitted to the UE.

Example 392

The UE of example 383, wherein the first feedback indicates an ACK, and the ACK is implicitly indicated by receiving in the first feedback: (i) a HARQ process ID of the first HARQ process, and (ii) a void combination of: modulation and coding scheme (MCS) and at least one assigned resource block (RB).

Example 393

The UE of example 392, wherein the first feedback is received in a grant.

Example 394

The UE of example 392, wherein subsequent to receiving the first feedback, the first transport block is still maintained in the UE's HARQ transmit buffer for potential granted retransmission.

Example 395

The UE of example 386, wherein the group common DCI is a message addressing a group of M UEs using a group RNTI, and wherein the group common DCI comprises M ACK/NACK fields of L bits each, as well as a CRC field encoded using the group RNTI.

Example 396

The UE of example 395, wherein M=1 such that the group of M UEs only contains the UE, and the group RNTI is specific to the UE, and the group RNTI is for use by the base station to identify the UE when an uplink transmission is sent from the UE to the base station.

Example 397

The UE of example 396, wherein the group RNTI is present in the uplink transmission sent from the UE to the base station, or the group RNTI is used to mask a CRC in the uplink transmission sent from the UE to the base station.

Example 398

The UE of example 386, wherein the group common DCI includes feedback for a plurality of UEs, and the plurality of UEs are grouped based on one or more of the following criteria: the plurality of UEs are configured with a same maximum number of supported simultaneous TBs per subframe L; and/or the plurality of UEs are configured with a same maximum number of grant-free repetitions k; and/or the plurality of UEs are configured with the same k and L; and/or the plurality of UEs are configured to apply a same grant-free hopping pattern; and/or the plurality of UEs are configured to transmit with a same modulation and coding scheme (MCS); and/or the plurality of UEs share a same time-frequency region for a transmission in a slot.

Example 399

The UE of example 398, wherein based on a pre-configured resource mapping and ACK/NACK timing relationship, the UE knows which common downlink control channel to check for which transmission.

Example 400

The UE of example 383, wherein the first uplink transmission is a grant-free uplink transmission sent on a first partition of grant-free uplink resources, and wherein the first feedback is received in a first group common downlink control channel that corresponds to the first partition.

Example 401

The UE of example 400, wherein the second uplink transmission is a grant-free uplink transmission sent on a second partition of grant-free uplink resources that is different from the first partition of grant-free uplink resources, and wherein the second feedback is received in a second group common downlink control channel that corresponds to the second partition and that is different from the first group common downlink control channel.

Example 402

The UE of example 401, wherein the first uplink transmission is sent in a first bandwidth partition, and the second uplink transmission is sent in a second bandwidth partition that is non-overlapping with the first bandwidth partition.

Example 403

A UE comprising: a processor; and a computer readable storage medium storing programming for execution by the processor, the programming including instructions that, when executed by the processor, cause the UE to perform operations including: transmitting a plurality of uplink transmissions to a base station in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; decoding first feedback and second feedback in downlink control information, the first feedback representing an ACK or NACK for the first transport block, and the second feedback representing another ACK or NACK for the second transport block.

Example 404

The UE of example 403, wherein the first feedback and the second feedback are received in a DCI 0 message.

Example 405

The UE of example 403, wherein the first feedback and the second feedback are received in unicast DCI.

Example 406

The UE of example 403, wherein the first feedback and the second feedback are received in group common DCI.

Example 407

The UE of example 406, wherein the group common DCI is a multicast message addressing a group of UEs using a group ID.

Example 408

The UE of example 403, wherein the first feedback and the second feedback are received in a DCI format used to carry multiple ACK/NACK indications for multiple transmissions in a given uplink subframe.

Example 409

The UE of example 408, wherein the DCI format is received over a downlink control channel.

Example 410

The UE of example 408, wherein the DCI format is mapped to one or more control channel elements (CCEs).

Example 411

The UE of example 408, wherein the UE is configured for NACK-less retransmissions, and wherein all-NACK codewords and single-TB NACKs are not transmitted to the UE.

Example 412

The UE of example 403, wherein the first feedback indicates an ACK, and the ACK is implicitly indicated by receiving in the first feedback: (i) a HARQ process ID of the first HARQ process, and (ii) a void combination of: modulation and coding scheme (MCS) and at least one assigned resource block (RB).

Example 413

The UE of example 412, wherein the first feedback is received in a grant.

Example 414

The UE of example 412, wherein subsequent to receiving the first feedback, the first transport block is still maintained in the UE's HARQ transmit buffer for potential granted retransmission.

Example 415

The UE of example 406, wherein the group common DCI is a message addressing a group of M UEs using a group RNTI, and wherein the group common DCI comprises M ACK/NACK fields of L bits each, as well as a CRC field encoded using the group RNTI.

Example 416

The UE of example 415, wherein M=1 such that the group of M UEs only contains the UE, and the group RNTI is specific to the UE, and the group RNTI is for use by the base station to identify the UE when an uplink transmission is sent from the UE to the base station.

Example 417

The UE of example 416, wherein the group RNTI is present in the uplink transmission sent from the UE to the base station, or the group RNTI is used to mask a CRC in the uplink transmission sent from the UE to the base station.

Example 418

The UE of example 406, wherein the group common DCI includes feedback for a plurality of UEs, and the plurality of UEs are grouped based on one or more of the following criteria: the plurality of UEs are configured with a same maximum number of supported simultaneous TBs per subframe L; and/or the plurality of UEs are configured with a same maximum number of grant-free repetitions k; and/or the plurality of UEs are configured with the same k and L; and/or the plurality of UEs are configured to apply a same grant-free hopping pattern; and/or the plurality of UEs are configured to transmit with a same modulation and coding scheme (MCS); and/or the plurality of UEs share a same time-frequency region for a transmission in a slot.

Example 419

The UE of example 418, wherein based on a pre-configured resource mapping and ACK/NACK timing relationship, the UE knows which common downlink control channel to check for which transmission.

Example 420

The UE of example 403, wherein the first uplink transmission is a grant-free uplink transmission sent on a first partition of grant-free uplink resources, and wherein the first feedback is received in a first group common downlink control channel that corresponds to the first partition.

Example 421

The UE of example 420, wherein the second uplink transmission is a grant-free uplink transmission sent on a second partition of grant-free uplink resources that is different from the first partition of grant-free uplink resources, and wherein the second feedback is received in a second group common downlink control channel that corresponds to the second partition and that is different from the first group common downlink control channel.

Example 422

The UE of example 421, wherein the first uplink transmission is sent in a first bandwidth partition, and the second uplink transmission is sent in a second bandwidth partition that is non-overlapping with the first bandwidth partition.

Example 423

A UE comprising: a transmitter to transmit a plurality of uplink transmissions to a base station in a same uplink subframe, the plurality of uplink transmissions comprising a first uplink transmission and a second uplink transmission, the first uplink transmission carrying first data corresponding to a first transport block of a first HARQ process, and the second uplink transmission carrying second data corresponding to a second transport block of a second HARQ process; a decoder to decode first feedback and second feedback in a downlink acknowledgement channel, the first feedback representing an ACK or NACK for the first transport block, and the second feedback representing another ACK or NACK for the second transport block.

Example 424

A method for uplink data transmission, the method performed by a UE, and the method comprising: transmitting, to a base station, a first uplink data transmission including a first transport block, wherein the first transport block is associated with a first HARQ process, wherein the first uplink data transmission includes a first reference signal sequence, and wherein the first uplink data transmission is sent using first time-frequency resources in an uplink subframe; transmitting, to the base station, a second uplink data transmission including a second transport block, wherein the second transport block is associated with a second HARQ process, wherein the second uplink data transmission includes a second reference signal sequence, and wherein the second uplink data transmission is sent using second time-frequency resources in the uplink subframe; decoding first feedback and second feedback received from the base station in a downlink acknowledgement channel, the first feedback representing a first ACK or first NACK for the first transport block, and the second feedback representing a second ACK or a second NACK for the second transport block; wherein at least one of the first time-frequency resources and first reference signal sequence identifies the first UE and the first HARQ process, and wherein at least one of the second time-frequency resources and the second reference signal sequence identifies the second UE and the second HARQ process. In this example, the first uplink data transmission and the second uplink data transmission may each be grant-free uplink transmissions, although this is not necessary.

Example 425

The method of example 424, further comprising: receiving, via the base station, an assignment in downlink control information, wherein the assignment indicates at least one of: a first HARQ process ID associated with the first HARQ process and a second HARQ process ID associated with the second HARQ process.

Example 426

The method of example 425, further comprising: receiving in higher layer signaling, via the base station, an indication of the first reference signal sequence and the second reference signal sequence. The first reference signal sequence may be different from the second reference signal sequence.

Example 427

The method of example 425 or 426, wherein the assignment grants a retransmission of the first HARQ process, and the first HARQ process ID is implicitly indicated in the assignment by indicating both: (i) a subframe in which decoding of the first transport block failed, and (ii) a frequency-domain resource occupied by the first transport block in the subframe in which the decoding of the first transport block failed.

Example 428

The method of any one of examples 424 to 427, wherein at least one of the first HARQ process and the second HARQ process is asynchronous.

Example 429

A UE comprising: a transmitter to: transmit, to a base station, a first uplink data transmission including a first transport block, wherein the first transport block is associated with a first HARQ process, wherein the first uplink data transmission includes a first reference signal sequence, and wherein the first uplink data transmission is sent using first time-frequency resources in an uplink subframe; and transmit, to the base station, a second uplink data transmission including a second transport block, wherein the second transport block is associated with a second HARQ process, wherein the second uplink data transmission includes a second reference signal sequence, and wherein the second uplink data transmission is sent using second time-frequency resources in the uplink subframe; a receiver to receive first feedback and second feedback from the base station in a downlink acknowledgement channel, the first feedback representing a first ACK or first NACK for the first transport block, and the second feedback representing a second ACK or a second NACK for the second transport block; a decoder to decode the first feedback and the second feedback; wherein at least one of the first time-frequency resources and first reference signal sequence identifies the first UE and the first HARQ process, and wherein at least one of the second time-frequency resources and the second reference signal sequence identifies the second UE and the second HARQ process. In this example, the first uplink data transmission and the second uplink data transmission may each be grant-free uplink transmissions, although this is not necessary.

Example 430

The UE of example 429, wherein the receiver is further to receive, via the base station, an assignment in downlink control information, wherein the assignment indicates at least one of: a first HARQ process ID associated with the first HARQ process and a second HARQ process ID associated with the second HARQ process.

Example 431

The UE of example 430, wherein the receiver is further to receive in higher layer signaling, via the base station, an indication of the first reference signal sequence and the second reference signal sequence. The first reference signal sequence may be different from the second reference signal sequence.

Example 432

The UE of example 430 or 431, wherein the assignment grants a retransmission of the first HARQ process, and the first HARQ process ID is implicitly indicated in the assignment by indicating both: (i) a subframe in which decoding of the first transport block failed, and (ii) a frequency-domain resource occupied by the first transport block in the subframe in which the decoding of the first transport block failed.

Example 433

The UE of any one of examples 429 to 432, wherein at least one of the first HARQ process and the second HARQ process is asynchronous.

Example 434

A method performed by a base station, the method comprising: receiving, from a UE, a first uplink data transmission including a first transport block, wherein the first transport block is associated with a first HARQ process, wherein the first uplink data transmission includes a first reference signal sequence, and wherein the first uplink data transmission is received using first time-frequency resources in an uplink subframe; receiving, from the UE, a second uplink data transmission including a second transport block, wherein the second transport block is associated with a second HARQ process, wherein the second uplink data transmission includes a second reference signal sequence, and wherein the second uplink data transmission is received using second time-frequency resources in the uplink subframe; decoding the first transport block and generating first feedback representing a first ACK or first NACK for the first transport block; decoding the second transport block and generating second feedback representing a second ACK or second NACK for the second transport block; transmitting, to the UE, the first feedback and the second feedback in a downlink acknowledgement channel; wherein at least one of the first time-frequency resources and first reference signal sequence identifies the first UE and the first HARQ process, and wherein at least one of the second time-frequency resources and the second reference signal sequence identifies the second UE and the second HARQ process. In this example, the first uplink data transmission and the second uplink data transmission may each be grant-free uplink transmissions, although this is not necessary.

Example 435

The method of example 434, further comprising: transmitting, to the UE, an assignment in downlink control information, wherein the assignment indicates at least one of: a first HARQ process ID associated with the first HARQ process and a second HARQ process ID associated with the second HARQ process.

Example 436

The method of example 435, further comprising: transmitting, to the UE, in higher layer signaling, an indication of the first reference signal sequence and the second reference signal sequence. The first reference signal sequence may be different from the second reference signal sequence.

Example 437

The method of example 435 or 436, wherein the assignment grants a retransmission of the first HARQ process, and the first HARQ process ID is implicitly indicated in the assignment by indicating both: (i) a subframe in which decoding of the first transport block failed, and (ii) a frequency-domain resource occupied by the first transport block in the subframe in which the decoding of the first transport block failed.

Example 438

The method of any one of examples 434 to 437, wherein at least one of the first HARQ process and the second HARQ process is asynchronous.

Example 439

A base station comprising: a receiver to: receive, from a UE, a first uplink data transmission including a first transport block, wherein the first transport block is associated with a first HARQ process, wherein the first uplink data transmission includes a first reference signal sequence, and wherein the first uplink data transmission is received using first time-frequency resources in an uplink subframe; receive, from the UE, a second uplink data transmission including a second transport block, wherein the second transport block is associated with a second HARQ process, wherein the second uplink data transmission includes a second reference signal sequence, and wherein the second uplink data transmission is received using second time-frequency resources in the uplink subframe; a decoder to: decode the first transport block and generate first feedback representing a first ACK or first NACK for the first transport block; decode the second transport block and generate second feedback representing a second ACK or second NACK for the second transport block; a transmitter to transmit, to the UE, the first feedback and the second feedback in a downlink acknowledgement channel; wherein at least one of the first time-frequency resources and first reference signal sequence identifies the first UE and the first HARQ process, and wherein at least one of the second time-frequency resources and the second reference signal sequence identifies the second UE and the second HARQ process. In this example, the first uplink data transmission and the second uplink data transmission may each be grant-free uplink transmissions, although this is not necessary.

Example 440

The base station of example 439, wherein the transmitter is to transmit, to the UE, an assignment in downlink control information, wherein the assignment indicates at least one of: a first HARQ process ID associated with the first HARQ process and a second HARQ process ID associated with the second HARQ process.

Example 441

The base station of example 440, wherein the transmitter is to transmit, to the UE, in higher layer signaling, an indication of the first reference signal sequence and the second reference signal sequence. The first reference signal sequence may be different from the second reference signal sequence.

Example 442

The base station of example 440 or 441, wherein the assignment grants a retransmission of the first HARQ process, and the first HARQ process ID is implicitly indicated in the assignment by indicating both: (i) a subframe in which decoding of the first transport block failed, and (ii) a frequency-domain resource occupied by the first transport block in the subframe in which the decoding of the first transport block failed.

Example 443

The base station of any one of examples 439 to 442, wherein at least one of the first HARQ process and the second HARQ process is asynchronous.

Example 444

A base station comprising a memory and at least one processor, wherein instructions are stored in the memory that, when executed by the at least one processor, cause the base station to perform any one of the base station method examples outlined above.

Example 445

A UE comprising a memory and at least one processor, wherein instructions are stored in the memory that, when executed by the at least one processor, cause the UE to perform any one of the UE method examples outlined above.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:

1. A method for uplink data transmission, the method performed by an apparatus, and the method comprising:
    transmitting, to a base station, a first grant-free uplink data transmission including a first transport block, wherein the first transport block is associated with a first HARQ process, wherein the first grant-free uplink data transmission includes a first reference signal sequence, and wherein the first grant-free uplink data transmission is sent using first time-frequency resources in an uplink slot of a carrier; and receiving, via the base station, an assignment in downlink control information after transmitting the first grant-free uplink data transmission, wherein the assignment indicates a first HARQ process ID associated with the first HARQ process, and wherein the assignment schedules a grant-based uplink data transmission in a frequency region not overlapping with any frequency resource configured for grant-free uplink data transmission;

wherein the first time-frequency resources identify the first HARQ process.

2. The method of claim 1, further comprising:

transmitting, to the base station, a second grant-free uplink data transmission including a second transport block, wherein the second transport block is associated with a second HARQ process, wherein the second grant-free uplink data transmission includes a second reference signal sequence, and wherein the second grant-free uplink data transmission is sent using second time-frequency resources in the uplink slot of the carrier; and wherein the assignment further indicates a second HARQ process ID associated with the second HARQ process; and wherein the second time-frequency resources identify the second HARQ process.

3. The method of claim 2, wherein at least one of the first HARQ process and the second HARQ process is asynchronous.

4. The method of claim 1, further comprising:

receiving in higher layer signaling, via the base station, an indication of the first reference signal sequence and a second reference signal sequence, wherein the first reference signal sequence is different from the second reference signal sequence.

5. The method of claim 1, further comprising:

transmitting, to the base station, a second grant-free uplink data transmission including a second transport block, wherein the second transport block is associated with a second HARQ process, wherein the second grant-free uplink data transmission includes a second reference signal sequence, wherein the second grant-free uplink data transmission is sent using second time-frequency resources in the uplink slot of the carrier, and wherein the second time-frequency resources identify the second HARQ process; and receiving, via the base station, a second assignment in downlink control information, the second assignment indicating a second HARQ process ID associated with the second HARQ process.

6. An apparatus comprising:

a transmitter to transmit, to a base station, a first grant-free uplink data transmission including a first transport block, wherein the first transport block is associated with a first HARQ process, wherein the first grant-free uplink data transmission includes a first reference signal sequence, and wherein the first grant-free uplink data transmission is sent using first time-frequency resources in an uplink slot of a carrier; and a receiver to receive, via the base station, an assignment in downlink control information after transmitting the first grant-free uplink data transmission, wherein the assignment indicates a first HARQ process ID associated with the first HARQ process, and wherein the assignment schedules a grant-based uplink data transmission in a frequency region not overlapping with any frequency resource configured for grant-free uplink data transmission;

wherein the first time-frequency resources identify the first HARQ process.

7. The apparatus of claim 6, wherein the transmitter is further to transmit to the base station, a second grant-free uplink data transmission including a second transport block, wherein the second transport block is associated with a second HARQ process, wherein the second grant-free uplink data transmission includes a second reference signal sequence, and wherein the second grant-free uplink data transmission is sent using second time-frequency resources in the uplink slot of the carrier; and wherein the assignment further indicates a second HARQ process ID associated with the second HARQ process; and wherein the second time-frequency resources identify the second HARQ process.

8. The apparatus of claim 7, wherein at least one of the first HARQ process and the second HARQ process is asynchronous.

9. The apparatus of claim 6, wherein the receiver is further to receive in higher layer signaling, via the base station, an indication of the first reference signal sequence and a second reference signal sequence, wherein the first reference signal sequence is different from the second reference signal sequence.

10. The apparatus of claim 6, wherein the transmitter is further to transmit to the base station, a second grant-free uplink data transmission including a second transport block, wherein the second transport block is associated with a second HARQ process, wherein the second grant-free uplink data transmission includes a second reference signal sequence, wherein the second grant-free uplink data transmission is sent using second time-frequency resources in the uplink slot of the carrier, and wherein the second time-frequency resources identify the second HARQ process; and wherein the receiver is further to receive, via the base station, a second assignment in downlink control information, the second assignment indicating a second HARQ process ID associated with the second HARQ process.

11. A method performed by an apparatus, the method comprising:

receiving, from a user equipment (UE), a first grant-free uplink data transmission including a first transport block, wherein the first transport block is associated with a first HARQ process, wherein the first grant-free uplink data transmission includes a first reference signal sequence, and wherein the first grant-free uplink data transmission is received using first time-frequency resources in an uplink slot of a carrier; and transmitting, to the UE, an assignment in downlink control information after receiving the first grant-free uplink data transmission, wherein the assignment indicates a first HARQ process ID associated with the first HARQ process, and wherein the assignment schedules a grant-based uplink data transmission in a frequency region not overlapping with any frequency resource configured for grant-free uplink data transmission;

wherein the first time-frequency resources identify the first HARQ process.

12. The method of claim 11, further comprising:

receiving, from the UE, a second grant-free uplink data transmission including a second transport block, wherein the second transport block is associated with a second HARQ process, wherein the second grant-free uplink data transmission includes a second reference signal sequence, and wherein the second grant-free uplink data transmission is sent using second time-frequency resources in the uplink slot of the carrier; and wherein the assignment further indicates a second HARQ process ID associated with the second HARQ process; and wherein the second time-frequency resources identify the second HARQ process.

13. The method of claim 12, wherein at least one of the first HARQ process and the second HARQ process is asynchronous.

14. The method of claim 11, further comprising:
transmitting, to the UE, in higher layer signaling, an indication of the first reference signal sequence and a second reference signal sequence, wherein the first reference signal sequence is different from the second reference signal sequence.

15. The method of claim 11, further comprising:
receiving, from the UE, a second grant-free uplink data transmission including a second transport block, wherein the second transport block is associated with a second HARQ process, wherein the second grant-free uplink data transmission includes a second reference signal sequence, wherein the second grant-free uplink data transmission is sent using second time-frequency resources in the uplink slot of the carrier, and wherein the second time-frequency resources identify the second HARQ process; and
transmitting, to the UE, a second assignment in downlink control information, the second assignment indicating a second HARQ process ID associated with the second HARQ process.

16. An apparatus comprising:
a receiver to receive, from a user equipment (UE), a first grant-free uplink data transmission including a first transport block, wherein the first transport block is associated with a first HARQ process, wherein the first grant-free uplink data transmission includes a first reference signal sequence, and wherein the first grant-free uplink data transmission is sent using first time-frequency resources in an uplink slot of a carrier; and
a transmitter to transmit, to the UE, an assignment in downlink control information after receiving the first grant-free uplink data transmission, wherein the assignment indicates a first HARQ process ID associated with the first HARQ process, and wherein the assignment schedules a grant-based uplink data transmission in a frequency region not overlapping with any frequency resource configured for grant-free uplink data transmission;
wherein the first time-frequency resources identify the first HARQ process.

17. The apparatus of claim 16, wherein the receiver is further to receive from the UE, a second grant-free uplink data transmission including a second transport block, wherein the second transport block is associated with a second HARQ process, wherein the second grant-free uplink data transmission includes a second reference signal sequence, and wherein the second grant-free uplink data transmission is sent using second time-frequency resources in the uplink slot of the carrier; and
wherein the assignment further indicates a second HARQ process ID associated with the second HARQ process; and
wherein the second time-frequency resources identify the second HARQ process.

18. The apparatus of claim 17, wherein at least one of the first HARQ process and the second HARQ process is asynchronous.

19. The apparatus of claim 16, wherein the transmitter is further to transmit, to the UE, in higher layer signaling, an indication of the first reference signal sequence and a second reference signal sequence, wherein the first reference signal sequence is different from the second reference signal sequence.

20. The apparatus of claim 16, wherein the receiver is further to receive from the UE, a second grant-free uplink data transmission including a second transport block, wherein the second transport block is associated with a second HARQ process, wherein the second grant-free uplink data transmission includes a second reference signal sequence, wherein the second grant-free uplink data transmission is sent using second time-frequency resources in the uplink slot of the carrier, and wherein the second time-frequency resources identify the second HARQ process; and
wherein the transmitter is further to transmit, to the UE, a second assignment in downlink control information, the second assignment indicating a second HARQ process ID associated with the second HARQ process.

* * * * *